(12) United States Patent
Wiegand et al.

(10) Patent No.: US 7,102,334 B2
(45) Date of Patent: Sep. 5, 2006

(54) METHOD AND APPARATUS FOR ELECTRONIC POWER CONTROL

(75) Inventors: Gregory P. Wiegand, Poulsbo, WA (US); David F. Baretich, Lake Oswego, OR (US)

(73) Assignee: Microplanet Ltd., Seattle, WA (US)

( * ) Notice: Subject to any disclaimer, the term of this patent is extended or adjusted under 35 U.S.C. 154(b) by 0 days.

(21) Appl. No.: 10/658,589

(22) Filed: Sep. 8, 2003

(65) Prior Publication Data

US 2004/0119448 A1 Jun. 24, 2004

Related U.S. Application Data

(60) Division of application No. 10/068,287, filed on Feb. 6, 2002, which is a continuation-in-part of application No. 09/802,809, filed on Mar. 8, 2001, now Pat. No. 6,366,062, which is a division of application No. 09/241,831, filed on Feb. 1, 1999, now Pat. No. 6,229,288, which is a continuation-in-part of application No. 08/371,512, filed on Jan. 11, 1995, now Pat. No. 5,747,972.

(51) Int. Cl.
G05F 3/16 (2006.01)
G05F 1/44 (2006.01)
G05F 1/56 (2006.01)

(52) U.S. Cl. ............ 323/223; 323/225; 323/283; 323/285

(58) Field of Classification Search ........ 323/223, 323/283, 225, 224, 284, 285
See application file for complete search history.

(56) References Cited

U.S. PATENT DOCUMENTS 3,436,595 A * 4/1969 Kneisley et al. ......... 315/165
3,833,817 A * 9/1974 Patel ..................... 307/66
4,392,085 A * 7/1983 Knoll et al. ............ 315/173
5,714,845 A * 2/1998 Heering et al. ......... 315/174
5,901,056 A * 5/1999 Hung .................... 363/142
5,955,843 A * 9/1999 Nuckolls et al. ........ 315/86
6,225,708 B1 * 5/2001 Furukawa et al. ....... 307/66
6,297,972 B1 * 10/2001 Chen .................... 363/37
6,366,062 B1 * 4/2002 Baretich et al. ........ 323/223
6,650,560 B1 * 11/2003 MacDonald et al. ..... 363/142
6,700,808 B1 * 3/2004 MacDonald et al. ..... 363/142

* cited by examiner

Primary Examiner—Bao Q. Vu
(74) Attorney, Agent, or Firm—Preston Gates Ellis & Rouvelas Meeds LLP

(57) ABSTRACT

The method of the invention in one aspect involves electronic power control by varying the amplitude of an electrical power supply voltage, independent of frequency, whereby the output frequency will always be the same as the input frequency. An electrical circuit apparatus for accomplishing this function in a preferred embodiment is also disclosed herein. The preferred circuitry of this aspect of the invention uses four solid state switches, such as IGBT's, four diodes, an inductor, input and output filters and novel controlling circuitry. The controller apparatus and methods of the invention may be used to implement all otherwise conventional converter types, buck, boost, and inverting (and duals of these) versions to obtain different regulating characteristics, including galvanic isolation of the output from the input. The inventive methods and devices may be used in power factor correction, voltage and/or current harmonic filtering and neutralization, line and load conditioning, control of power transfer between two power grids, and programmable control of surges, sags, dropouts and most other voltage regulation problems.

1 Claim, 39 Drawing Sheets

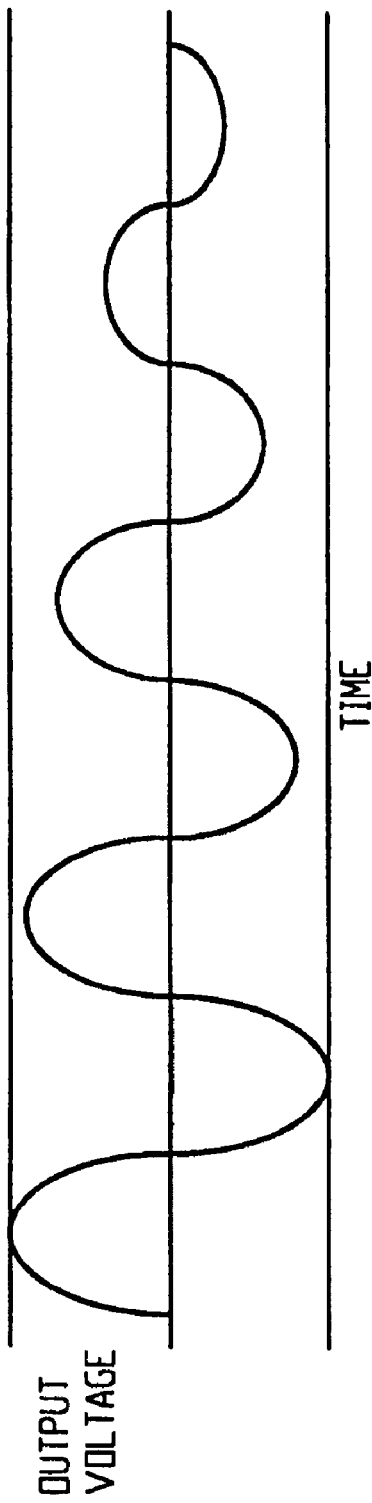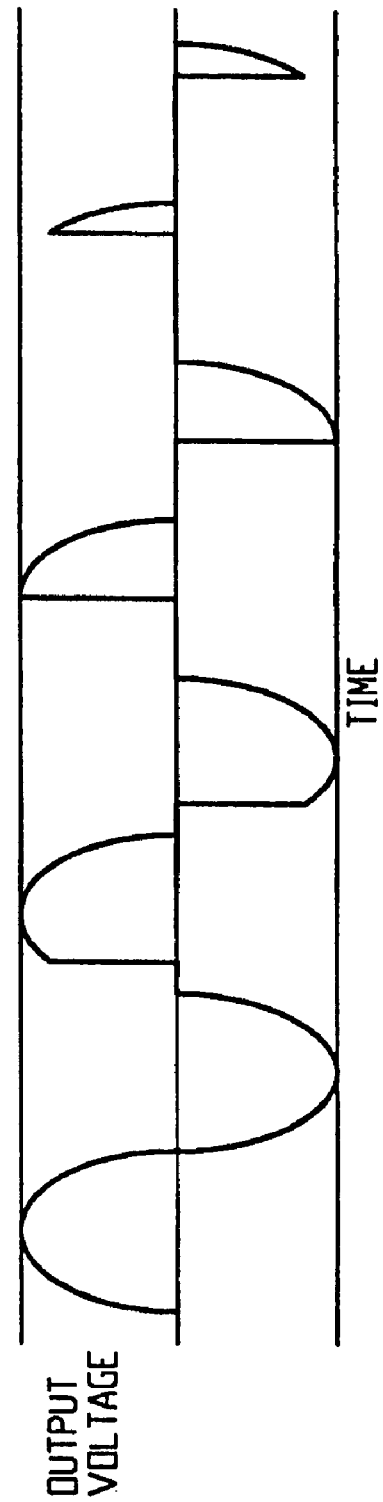

Fig. 27

| 120 | | Buck Mode | MPC | | | | | | Output | | | |
|---|---|---|---|---|---|---|---|---|---|---|---|---|
| V AC rms | % of range | KW Eff | KVA Eff | KW | KVA | FF | %THD-rmsA | KW | KVA | FF | %THD-rmsA |
| 120 | 100% | 95.92% | 94.00% | 4.9 | 5 | 0.97 | 3.8 | 4.7 | 4.7 | 1 | 1.85 |
| 108 | 90% | 95.65% | 91.67% | 4.6 | 4.8 | 0.97 | 4 | 4.4 | 4.4 | 1 | 1.85 |
| 96 | 80% | 94.74% | 92.31% | 3.8 | 3.9 | 0.97 | 4.2 | 3.6 | 3.6 | 1 | 1.85 |
| 84 | 70% | 93.75% | 90.91% | 3.2 | 3.3 | 0.96 | 4.7 | 3 | 3 | 1 | 1.9 |
| 72 | 60% | 92.31% | 88.89% | 2.6 | 2.7 | 0.95 | 5.5 | 2.4 | 2.4 | 1 | 1.9 |
| 60 | 50% | 89.00% | 80.91% | 2 | 2.2 | 0.93 | 6.5 | 1.78 | 1.78 | 1 | 1.95 |
| 48 | 40% | 85.71% | 76.36% | 1.47 | 1.65 | 0.89 | 8 | 1.26 | 1.26 | 1 | 2 |
| 36 | 30% | 82.65% | 66.94% | 0.98 | 1.21 | 0.81 | 10.3 | 0.81 | 0.81 | 1 | 2.2 |
| 24 | 20% | 74.58% | 48.89% | 0.59 | 0.9 | 0.65 | 13.2 | 0.44 | 0.44 | 1 | 2.3 |
| 12 | 10% | 53.45% | 21.53% | 0.29 | 0.72 | 0.4 | 15.8 | 0.155 | 0.155 | 1 | 3.4 |
| 0 | 0% | 0.00% | 0.00% | 0.1 | 0.66 | 0.15 | 16.7 | 0 | 0 | 0.85 | |

| | | | SCR | | | | | | | | | |
|---|---|---|---|---|---|---|---|---|---|---|---|---|
| V AC rms | % of range | KW Eff | KVA Eff | KW | KVA | FF | %THD-rmsA | KW | KVA | FF | %THD-rmsA |
| 120 | 100% | 98.04% | 98.04% | 5.1 | 5.1 | 0.99 | 12.4 | 5 | 5 | 0.99 | 11.5 |
| 108 | 90% | 97.87% | 98.00% | 4.7 | 5 | 0.94 | 27.9 | 4.6 | 4.9 | 0.94 | 27.7 |
| 96 | 80% | 97.44% | 97.87% | 3.9 | 4.7 | 0.84 | 42.5 | 3.8 | 4.6 | 0.83 | 42.9 |
| 84 | 70% | 96.88% | 97.67% | 3.2 | 4.3 | 0.73 | 52.7 | 3.1 | 4.2 | 0.73 | 52.7 |
| 72 | 60% | 96.15% | 97.50% | 2.6 | 4 | 0.63 | 60.3 | 2.5 | 3.9 | 0.63 | 60.2 |
| 60 | 50% | 94.74% | 97.22% | 1.9 | 3.6 | 0.54 | 66.4 | 1.8 | 3.5 | 0.52 | 66.5 |
| 48 | 40% | 92.86% | 96.88% | 1.4 | 3.2 | 0.43 | 72.1 | 1.3 | 3.1 | 0.42 | 72.4 |
| 36 | 30% | 100.00% | 96.43% | 0.9 | 2.8 | 0.34 | 77.5 | 0.9 | 2.7 | 0.32 | 77.9 |
| 24 | 20% | 100.00% | 100.00% | 0.5 | 2.2 | 0.24 | 84.2 | 0.5 | 2.2 | 0.22 | 84.4 |
| 12 | 10% | | | | Unstable | | | | Unstable | | |
| 0 | 0% | | | | | | | | | | |

METHOD AND APPARATUS FOR ELECTRONIC POWER CONTROL

This is a Divisional application of U.S. patent application Ser. No. 10/068,287 filed Feb. 6, 2002, which is a Continuation-in-Part of U.S. patent application Ser. No. 09/802,809 filed Mar. 8, 2001 now issued as U.S. Pat. No. 6,366,062, which is a Divisional application of U.S. patent application Ser. No. 09/241/831 filed Feb. 1, 1999, now issued as U.S. Pat. No. 6,229,288, which is a Continuation-in-Part of U.S. patent application Ser. No. 08/371,512 filed Jan. 11, 1995, now issued as U.S. Pat. No. 5,747,972.

TECHNICAL FIELD

The invention relates to the field of electrical power conversion and control, across a wide range of current and voltages; more particularly, it relates to method and apparatus for electronically implemented power control, more particularly, those implemented with switch mode power conversion techniques.

BACKGROUND OF THE INVENTION

An electrical power conversion circuit is a circuit in which electrical power is changed so that a power source with a voltage or current can serve a load requiring a predetermined voltage or current. In switch mode conversion circuits and power conversion techniques, power is typically changed from a supply that is higher in current or voltage to serve a load requiring lower current or voltage, or from a supply that is lower in voltage or current to a load requiring higher voltage or current. Where high conversion efficiency is made possible by design of the circuit, power output is substantially equal to power input. Where voltage-ampere products (VA) are close to the same at both output and input, and assuming a fixed VA at the input, a reduction in voltage at a resistive load is necessarily accompanied by an increase in load current, and vice-versa.

There are three basic classes of switch mode power converters. They include step-down (buck—see FIG. 1), step-up (boost), and inverting (including flyback) converters, and "duals" of these three. A "dual" version of any of the three basic class devices can sometimes be effected by a simple transform as follows:

Series inductors become parallel capacitors;
Parallel capacitors becomes series inductors.

Other transforms can be more involved, and the above transforms are provided as illustrative only, as will be appreciated by those skilled in the art. Dual topologies are known to have the following characteristics: a) discontinuous currents to and from the voltage sources become continuous currents to and from voltage sources; b) the DC transfer function (output voltage vs. input voltage vs. duty cycle) remains the same; and c) the dual input and output inductors can be combined together in one magnetic structure.

In all such topologies, at least with respect to DC functionality, each converter typically consists of two switches, an inductor, and input and output filters. Nearly all conventional converters are some derivation or combination of these topologies and their duals.

Output voltage regulation in these known converter topologies then is achieved by varying the duty cycle of the switches. FIG. 1 shows a simple buck converter with ideal switches. In DC conversion circuits of the type generally known as buck or boost regulators, the two solid state switches typically employed are reciprocally and cyclically operated so that when one switch is "on" or conducting, while the other is "off" or non-conducting, and vice-versa. Thus as the duty cycle of the modulation of the two switches is varied, so is the voltage (or current) conversion ratio varied between source and load. For example, in a buck topology, if S1 is modulated at a given duty cycle D and S2 is modulated exactly opposite S1 (S2 closed when S1 is open and vice versa) then output voltage is given by the formula:

$$V_{out} = V_{in} * D.$$

Other known formulae similarly apply to other respective known regulator classes, as will be appreciated by those skilled in the art. This relationship holds for either polarity of $V_{in}$. Theoretically then, alternating voltage on the input would manifest itself on the output according to the same relationship, assuming the use of "ideal" switches. However, as a matter of practice, in the absence of such ideal switches, conventional single stage converter implementations do not function in AC to AC conversions.

In conversion circuits used to drive reactive loads such as induction motors, bi-directional energy flows and other four quadrant operation must also be accommodated. Simple power transformers are in common usage, though necessarily restricted to AC power conversion; however, they grow heavy and bulky as power levels increase, and they are by nature not readily variable in their conversion ratios without some kind of tap changing modification.

There has been substantial work done in the area of AC converters, but known methods suffer for one or more reasons. For instance, some employ simplistic control schemes that lead to a variety of failure modes in the switches.

In all real world switches, there exist timing delays and finite rise/fall times, both of which vary from device to device and over varying operating conditions. If care is not taken in a conventional two switch converter as outlined above, both switches could conduct simultaneously, with attendant high currents and excessive power dissipation which can destroy the switches.

Power transistors of some of the types commonly employed as switches in converter topologies (and other semiconductors similarly employed) are known to store significant amounts of charge, and if a control voltage is applied to turn one transistor off as the control voltage is being applied to turn the other transistor on, the flow of current in the first transistor would continue for sometime after the turn off control, and simultaneous conduction in both transistors would occur to cause a short across the power source, with potentially damaging current flow through the switches.

A simultaneous "off" condition for both transistors is also a problem, for if the first transistor is turned off before the second transistor is turned on, the series inductor in such regulating circuits (in series with the opening switch) would discharge, or force current, through the opening switch and subject the switch to potentially damaging voltage.

One known technique for dealing with the first phenomenon is the addition of a switching delay, or dead time, into the turn-on of each switch, after turn-off of the other switch. Generally, a value for the length of the switching delay is chosen to insure that one switch is completely off before the other is enabled. But in the AC circuit supposed above, that then results in both switches being disabled at the same time. And as discussed above, if any current is flowing in the output inductor L1, then the result of both switches simultaneously disabled is a voltage spike across the switches which will likely destroy them. This spike typically has to be clamped via some snubber or clamping network, but that then results in excessive clamp power dissipation and excessive switching losses in the switches. For an example of a manifestation of this problem and an example of this limiting solution, see U.S. Pat. No. 4,947,311 to Peterson, the disclosure of which is hereby incorporated by this reference into this disclosure as background as if fully set forth.

Another approach to the problems described above has been through the use of resonant switching circuits that employ zero voltage or current switching techniques. These are sometimes referred to as "soft switching", or zero voltage switched, techniques. Converters employing these techniques do tend to be more efficient in theory than the "hard" switching circuits using snubbers mentioned above, but some topologies have proven difficult to control, where the resonant circuit becomes increasingly unstable at lower power ranges. In addition, such resonant circuits also have more narrowly defined operating conditions (i.e., minimum and maximum current limitations), and are therefore less robust for industrial applications, and these circuits typically trade switch losses for increased conduction losses, and require bulky resonant componentry.

Switching losses into an inductive load, as encountered in conventional circuits, are generally proportional to the product of turnoff time, peak current, peak voltage, and switching frequency, and can be calculated from the well known formula:

$$P_{sw}=0.5 t_{off} * V_{peak} * I_{peak} * \text{Frequency}$$

where $P_{sw}$ is the switching loss expressed in units of power. In a snubbed or clamped circuit, there is always a voltage rise across the snubber during dead time as long as either current or voltage is non-zero. As a result, there is always a significant switch or snubber dissipation. In addition, during high current surge conditions, the snubber may not be able to adequately limit the voltage rise, leading to potentially catastrophic device failure.

These known circuits therefore have significant limits in capability of conversion, at least in terms of output power, efficiency, reliability and cost. This is especially the case with present high power semiconductor technology where higher power and lower cost devices are also generally the slowest, and therefore have inherent and unacceptably high switching losses.

Recently, a variety of other topologies have been suggested for direct AC/AC converters (also sometimes simply referred to as electronic transformers). These suggested topologies have generally fallen into two types: "zero voltage switched" (ZVS) a.k.a. "soft switched"; and traditional switchmode topologies, a.k.a. "hard switched". In those topologies suggested for use in hard switched converters, it appears that the power switches are implemented either as two bidirectional switches or as four unidirectional switches. A control scheme for a two switch converter referred to above is typically some form of simple modulation (such as pulse width modulation or PWM), which schemes make use of dead times, or delays, as discussed above.

Where these suggested topologies are implemented with four switches, it appears the corresponding suggested control schemes diverge from one another. Venturini describes a scheme for switch control as a "staggered commutation", while Lipo discusses a similar method. In both of these descriptions, all four switches are required to be controlled at high speed, with both critical timing (including dead times) and level shifting required from a common controller. Cho briefly describes a different scheme which modulates two switches at high speed, but does not define any required dead times or transitions (if any are needed). Villaca employs two bidirectional, zero voltage switching (ZVS) switches operating from a simple pulse width modulator.

These suggested control schemes have a number of points in common: 1) they all have multiple switches operating simultaneously at high frequencies; 2) the timing between these switches is highly critical in order to avoid cross conduction or voltage spikes from the output inductor; 3) maximum duty cycle may have to be limited to accommodate what may be required as fixed timing delays, and circuit response time to output overload can be consequently dangerously delayed; 4) they all apply high frequencies voltage waveforms to the output inductor, which frequencies are essentially the same from no load to full load, which results in a fixed core loss in the inductor with attendant significant power loss even at light load or no load operation, thus reducing conversion efficiency at light load with attendant increased electricity costs; 5) by employing an unchanging high frequency waveform, the switching frequency AC current component in the output inductor is also similar from no load to full load condition, so that at light load significant current is left circulating through power components like transistors, diodes, and filter capacitors, all with attendant significant power loss and reduced light load conversion efficiency and increased electricity costs; 6) they all modulate multiple switches at high frequencies, which leads to high average current requirements for control circuitry, especially with large semiconductor power devices like IGBT's MOSFET's, BJT's and MCT's.

In another vein, three phase power has been the mainstay of electrical power distribution for nearly a century, with three wire (also known as "delta") distribution being common for most situations.

Various methods are currently employed to regulate three phase power, including tap selection, magnetic synthesizers, ferroresonant transformers, inverters and the like. A circuit has been described by Mozdzer and Bose that is different from those listed above.

Other known uses for power controllers are so called static VAR compensators, which effectively add or subtract inductance or capacitance from a system, and also adaptive VAR compensators and "dynamic voltage restorers". These known devices have shortcomings in delivering a variable capacitance or variable inductance to a system, as has been reported in the literature.

AC power quality is best and electrical operating efficiency is greatest when the line current is sinusoidal in wave form and in phase with the line voltage. It is well known however that electrical elements such as reactive loads shift the line current in the mains out of phase with the line voltage. This phase shift is commonly defined in terms of "power factor", or more specifically, "displacement power factor", where displacement power factor (referred to hereafter for sake of simplicity as PF or as power factor) is given by the well known relationship:

$$PF=\cos\theta$$

where θ is the degree of phase shift "lead" (or "lag", as the case might be), also known as the phase angle, between the fundamental voltage and current. A perfect, or in-phase, relationship is equated to 1.0, while increasing degrees of phase shift are represented by power factors decreasing below unity. Power factor is also sometimes defined as the ratio of "true" power (in watts) to apparent power (in volt-amperes, or VA).

Power factor is therefore a measure of relative efficiency of power transfer and energy usage, and becomes more critical with the use of heavy draw machinery and the like, such as motors. Typical induction motor power factors can range from very low at no load to around 0.85 to 0.90 ("perfect" is 1.00) at full load. Electric utility services typically add surcharges to customers with power factors below 0.90. In addition, power factor can be highly variable, depending as it does on the instantaneous total load on the power supply. Power factor correction ("PFC") then is therefore routinely applied to compensate for bad power factor situations and, through better utilization of the existing power distribution system, to reduce the need for capital intensive additions to the power grid. Power factor correction is conventionally accomplished generally by having a series of capacitors across the line, and incrementally switching the various capacitors in and out with thyristors or relays.

Other conventional PFC techniques consist of a bridge of transistors that operate with a storage bank of capacitors or batteries (for example, see Wilkerson U.S. Pat. No. 5,283,726). A major disadvantage of this conventional PFC technique is that the output switches always switch to and from the DC storage bank voltage, which is above the peak power line voltage. As a result, switching losses are quite high.

Known automatic power factor correctors are bulky, slow and complex, and therefore only practical for large motors and groups of smaller motors. Even then, it is only the "system average" PF that is corrected, and studies show that it is preferable to correct PF at the load, rather than at the system level. For the above reasons, and other as will be appreciated by those skilled in the art, it is not practical to connect conventional PFC equipment at each load (motor). This is significant in that 60% of the electrical energy produced at this time is consumed by electric motors of 5 HP or greater in size (fully 80% of industrial consumption of electricity is for motors). And this at a time when annual electricity production is valued in excess of $52 billion! Any significant reduction in electrical consumption by these motors and/or increase in their efficiency of consumption would result in huge dollar savings.

In addition, other elements such as rectifying power supplies and SCR's, and other non-linear sources such as computers, switchmode power supplies, welders, inverters, controlled bridge rectifiers, fluorescent lights and other lights requiring a ballast, actually alter the sinusoidal waveform of the AC line current. These non-linear devices typically only draw current when the voltage is at its peak, thus causing the harmonic distortion. This is not how the power grid was designed to work.

The resulting non-sinusoidal current produced by these nonlinear loads can be mathematically resolved into a "fundamental" sine wave current at line frequency, with a number of harmonic waves at multiples of line frequency, with the fundamental producing the power in the load, while the so called "harmonics" only increase heat losses and decrease the system's power factor (that is, they generally lower the efficiency of the distribution system) with no net contribution to power in the load. EPRI (electrical Power Research Institute) estimates predict that by the year 2010, 60% of all electrical loads will be such nonlinear, solid state electronic loads, so that the majority of all future electrical loads will consist of unwanted harmonic generators.

This is already even true for conventional PFC techniques that, in addition to other noted disadvantages, also react themselves to exacerbate harmonic problems, amplify circuit resonances, and even cause "ringing" on the mains when capacitors are switched. This ringing can cause malfunctioning and shutdowns in adjustable speed motor drives and other electronic equipment.

As discussed above, each non-linear device produces its own distorted waveform composed of varying harmonic components. Each device allows current to pass during a portion of the voltage sine wave and blocks the flow of current during another portion of the sine wave. To make matters worse, phase controlled devices such as adjustable speed drives (SCR) generate harmonic currents with amplitudes varying as a function of load change. In addition, the continued trend in government regulation appears to be towards increasing energy efficiency, and is eventually expected to mandate harmonic cleanup at the source. All of this suggests that power quality (PQ) issues are a major concern, and that there is a clear need for PFC and PQ techniques that more efficiently use power without also generating harmonic distortion themselves.

It has been suggested that the variety of power quality problems, now extant and steadily growing in magnitude and variety, are all actually summed within a power distribution system, producing effects such as: deterioration of electronic equipment performance, and continuous or sporadic computer and other microprocessor malfunctions; tripping protection circuitry of adjustable speed drives; overheating of neutral in three phase systems, leading to neutral burnout; overheating and premature failure of transformers, even when the transformer rating appears otherwise adequate; overheating of motors; nuisance tripping of circuit breakers; telephone interference; and PFC capacitor fuse blowing.

In addition, the need for improved power regulation and/or power conversion is felt in other industries as well. For instance, in the motion picture and entertainment industries, conventional light source dimming technologies produce an audible 60 Hz hum in large studio lamps. The conventional technology generally applied is dimming by means of phase angle fired triacs, which limit the energy to the lamps by basically opening the circuit to the lamps for a given percentage of every half cycle (see example of resultant broken waveform in FIG. 2). This scheme is relatively simple to implement, but is electrically very noisy, which leads to additional design problems and additional implementation costs. A means of smoothly and quietly dimming such lamps would be of great use.

DISCLOSURE OF THE INVENTION

Accordingly, it is an object of the invention to provide a power controller that is low in electrical and audible noise, applicable to both low and high power applications, having high tolerance for inductive loads, light in weight, digitally controllable, and fast in response time.

It is a further object of the invention to provide a power converter having output power, efficiency, reliability and cost superior to known topologies.

It is another object of the invention to provide a power converter with reduced total switching losses.

It is another object of the invention to provide a power converter that during high current surge conditions and reactive currents is not subject to switch device failure due to voltage rise.

It is a further object of the invention to provide a power converter adapted for four quadrant operation and bi-directional power flow, with respect to input and output voltage and current.

It is another object of the invention to provide a converter/controller topology that addresses the disadvantages of conventional active PFC techniques.

It is another object of the invention to provide a controller topology that can be used as a continuously variable capacitive load.

It is another object of the invention to provide a controller topology that can be used as a continuously variable inductive load.

It is another object of the invention to provide a controller topology that can be used as a continuously variable resistive load.

It is another object of the invention to provide a relatively inexpensive, fast response, self-dampening power factor corrector of size and bulk sufficiently small to be practical for the majority of motors in current and future use, and which does not contribute to line harmonic problems or problems of system resonance and ringing caused by capacitor switching.

It is another object of the invention to provide a power controller for assuring best power quality and greatest electrical operating efficiency by controlling an AC source to provide current and/or voltage outputs that are sinusoidal in waveform and in phase with each other.

It is another object of the invention to provide a power controller for neutralizing line harmonics.

It is another object of the invention to provide a power controller for successfully addressing any one or more of the following power quality concerns: deterioration of electronic equipment performance, and continuous or sporadic computer and other microprocessor malfunctions; overheating and premature failure of transformers, even when the transformer rating appears otherwise adequate; overheating of motors; nuisance tripping of circuit breakers; telephone interference; and PFC capacitor fuse blowing.

It is another object of the invention to provide voltage regulation or a power line conditioner to mitigate voltage swells and sags, and overvoltage and under voltage conditions.

It is another object of the invention to provide a means of power regulation (voltage and/or current) that has the characteristic of being low impedance source with respect to a load.

It is another object of the invention to provide a means of controlling power on single or multiphase distribution systems, including the majority of known power system frequencies, such as 50, 60 and 400 Hz.

It is another object of the invention to provide a means of controlling a power converter which allows for nearly instantaneous regulation, among the benefits of which is that the device is non self destructive in overcurrent situations.

It is a further object of the invention to provide a means of dimming lamps in such a way as to produce no audible hum.

It is yet another object of the invention to provide a system meeting any one or a combination of all of the needs summarized above.

These and such other objects of the invention as will become evident from the disclosure below are met by the invention disclosed herein.

The invention addresses and provides such a system. The invention represents means to quickly, precisely, and remotely convert AC power with losses that are lower than conventionally available technology can provide. It also represents a compact, efficient, and low cost device for processing AC power, and that is simple and reliable and low in harmonic distortion; applicable to both low and high power applications, having high tolerance for reactive and bi-directional loads, light in weight, digitally controllable, and fast in response time.

Application of the invention to solutions to power quality problems, especially solutions requiring variable amplification, is especially beneficial in that the invention is the only system that effectively provides full four quadrant operation in a single stage AC to AC power conversion device, particularly with respect to reactive loads, and which utilizes four independently controllable switches.

The invention provides an electrical power controller (also sometimes referred to herein as a regulator or converter) apparatus or device for controlling or regulating an AC voltage or current to a load. The voltage may be in single or multiple phase (such as conventional three phase) configurations. The controller device has four independently controllable switches and at least one inductor for each input line (or phase) to be regulated, all in one of several otherwise conventional power regulator topologies, such as buck, boost, inverted or isolated converter/regulators or duals of these topologies. A corresponding regulation or conversion scheme may thus be implemented depending upon the position of the inductor with respect to the switches and the input voltage, as will be appreciated by those skilled in the art.

The controller also has a logic control block. The logic control block is comprised in part of a polarity detector preferably in parallel with the input voltage. The polarity detector preferably has two outputs, each of which is the reciprocal of the other (inverted with respect to each other), although this may be accomplished in a number of functionally equivalent ways, such as through use of one or more inverters, as will be appreciated by those skilled in the art. The logic control unit also has a duty cycle modulator with two reciprocal outputs. Each switch is then separately modulated by these detector and modulator outputs under logical control so that some combination of one or more switches is always electrically conducting, or "closed". In other words, so there is never a combination of all four switches that is open, except of course when the device is not in operation (turned off or out of the circuit).

Each switch thus turns off only into the instantaneous line voltage (ILV), rather than switching to a storage bank voltage or DC rail. Since the ILV can be as low as zero, losses are thereby reduced to the extent the ILV is lower than a storage bank voltage or that of a DC rail. Typically, this can save 36% or more in switching losses alone, even for resistive loads (with greater savings possible for reactive loads).

A variation of this device has OR gates fed by outputs from the polarity detector and the duty cycle modulator through turn off and turn on delays, respectively, such that first and third OR gates each receive as a first input a first output from the polarity detector, and second and fourth OR gates each receive as a first input a second output from the polarity detector; and such that first and second OR gates receive as a 2nd input a first output from the duty cycle modulator, and third and fourth OR gates receive as a 2nd input a second output from the duty cycle modulator. The output from each OR gate controls or modulates or drives one switch or gate each. Preferably, the switch sources of each pair of switches are tied together, but do not have to be in some alternate embodiments.

In preferred embodiments of the controller device, at least one of and preferably all of, the switches are electronically controllable, though alternate, non-electrical, implementations may occur to those skilled in the art, including partially or fully manual control schemes, and control schemes involving conducted light optics, such as fiber optical control means. Preferably each switch is a solid state switching device, with a diode poled to have a sense opposite to the switch, in parallel across the source and drain of the switch, and the diodes of a pair of such switches are opposite in sense to each other. The switches are preferably transistors, such as BJT (bipolar junction transistors), IGBT, or MOSFET transistors, or even thyristors such as MCT or GTO.

One embodiment of the controller device has two switches in series with each other, though preferably poled in the opposite sense from each other, and connected with the inductor to one input, and two switches in series with each other, also preferably poled in the opposite sense from each other, and connected with the inductor to the return. In other words, wherein a first pair of switches is connected between the input and the inductor, and a second pair of switches is connected between the inductor and return.

As employed in this disclosure, the term "poled in the opposite sense" when referring to electronic devices that resist or obstruct the flow of current in one direction (usually under a set of defined conditions), but not in the other, means they are placed so that current flow is not blocked in the same direction in both devices; in other words, their "poles" are oppositely arranged, as will be appreciated by those skilled in the art.

In another aspect of the invention, there is separately provided a logic controller for controlling the duty cycle of a power controller. The logic controller is particularly adapted for controlling a power controller device that has four independently controlled separate switches. The logic controller has a polarity detector in parallel with the input voltage that has two outputs, and it has a duty cycle modulator that also has two outputs. Each of the outputs of the polarity detector and of the duty cycle modulator are inverted with respect to one another (reciprocal). The controller is employed in such a way that each of the four switches to be controlled is separately modulated so that some combination of one or more switches is always closed. Turn off or turn on delays may optionally be employed.

Preferred embodiments of the controller device employ four OR gates fed by outputs from the polarity detector and the duty cycle modulator through optional turn off and turn on delays, respectively, such that first and third OR gates each receive as a first input a first output from the polarity detector, and second and fourth OR gates each receive as a first input a second output from the polarity detector; and such that first and second OR gates receive as a second input a first output from the duty cycle modulator, and third and fourth OR gates receive as a second input a second output from the duty cycle modulator. Output from each OR gate modulates or drives one switch or gate each.

In another aspect of the invention, a controller chooses its quadrant modes based upon input voltage and error circuit output. A positive input voltage determines that either Quadrant I or Quadrant II will be employed, while a negative input voltage determines that either Quadrant III or Quadrant IV will be employed. The selection of Quadrant I vs. Quadrant II or Quadrant III vs. Quadrant IV is dependent upon the error circuitry. The error circuitry compares output voltage to the reference and determines both the required direction of current flow and the required amount of modulation by way of the error amplitude output to maintain controller output regulation. Current can be in either direction for any particular Quadrant or transition without damaging the controller.

This AC electronic power controller is implemented in three parts: 1) a voltage polarity detector senses the polarity of the input voltage and feeds the signal into the Control Logic section; 2) a control input signal is fed into a modulator section (such as a PWM) which converts the input signal into a modulated digital pulse train which is in turn fed into the Control Logic section (this control input may be fixed, varied and/or sourced by either an external source or error amplifier or corrector of a such types as will be known to those skilled in the art); 3) the Control Logic then takes the polarity and control input signals and implements the control scheme tabularly summarized in Table 2.

In preferred embodiments, step 2) above is further particularized in that a control input is fed to a programmable reference which in turn produces a variable sine wave reference output (in phase with the input voltage) that is fed into an error correction circuit which compares the reference output to the converter output and provides a resulting signal to the modulator. The logic scheme may be implemented by any of a number of methods as will be appreciated by those skilled in the art, including microcontroller, PAL, or discrete logic. Output from the Control Logic section is then fed into the level shift circuits, which in turn interface the power switches.

This preferred control scheme has a number of advantages over known and suggested control schemes when applied to the power controller of the invention.

1. Since no more than one switch is in operation at high frequency in any given mode, critical timing between or among the various switches in controllers using other schemes is eliminated.
2. There is no need for any kind of delay or dead time to be implemented during high frequency switching operation, resulting in greater maximum duty cycle and/or smoother operation from 0% to 100% duty cycle. In addition, overload shutdown response is immediate (or at least substantially reduced), with no delays to step through before shutting down.
3. The power controller may be operated discontinuously during no load and light load conditions, resulting in reduced duty cycle for these conditions, with beneficially reduced core loss in the output filter inductor. Light load efficiency is significantly improved, with decreased electricity costs.
4. This same discontinuous operation capability also reduces the high frequency current component in the output filter inductor, in turn reducing the amount of recirculating current switched and conducted by the switches and diodes of the converter during light load operation, thus further reducing power loss and further enhancing light load efficiency.
5. Since no more than one switch is modulated at any given time, average total switch drive power is greatly reduced.

The invention also provides a variable inductor, a variable resistor and a variable capacitor. The variable capacitor of the invention can be made non-resonating, and implementation of these devices appear as linear loads and therefore do not degrade the power factor of the system in which they are employed (i.e., they are "transparent"). The variable capacitor is applicable to an automatic PFC system. These devices are novel with respect to known static VAR compensators, adaptive VAR compensators and dynamic voltage restorers, and implemented as a combination of the power controller of invention and a capacitor connected across an output and a return of the controller whereby the combination functions as a variable capacitor. The power controller of the invention may also be combined with an inductor connected across an output and a return of the controller whereby the combination of controller and inductor functions as a variable inductor.

The invention also provides several method aspects. In one embodiment, a low impedance method of power regulation or conversion is provided whereby an amplitude of an input voltage waveform is varied linearly, without respect to its frequency, with or without changing its characteristic waveform, to produce a proportional output voltage to a load, employing only a single stage conversion (i.e., no intermediate DC voltage or current link).

In a variation of this method, the above referred to voltage amplitude variation is accomplished by variable duty cycle modulation switching of an input voltage through an inductor in a manner otherwise consistent with conventional power regulation topology.

A preferred method for accomplishing the variable duty cycle modulation follows these steps: 1) sensing in real time a polarity of the input voltage to derive a pair of polarity signals that are inverted with respect to each other; 2) varying the duty cycle of a modulator, in accordance with and in proportion to the desired modification of the amplitude, the modulator having two outputs inverted with respect to each other; 3) feeding a polarity signal and a modulator output signal to an OR gate, where each signal has a duration, and the beginning of the duration of the duty cycle modulating output signal is delayed, and the end of the duration of the polarity signal is also delayed; 4) using the OR gate logical output to control a switching device for the variable duty cycle modulation of the input voltage. These method steps 1–4 are then preferably iterated separately for each of four OR gates, and the step of variable duty cycle modulation switching of the input voltage includes the step of modulating the switching during operation so that all of the switches in the controller of the invention are not ever electrically non-conducting (or "open") at the same time (except when there is no power applied to the circuit).

Another aspect of the invention is a variable power factor corrector that has a capacitor in parallel with the load to be corrected on an AC line, and a line driven variable voltage output in series with the capacitor for varying the voltage to the capacitor, so as to vary the amount of capacitance reflected through the power controller onto the AC line. In corresponding manner, a line driven variable voltage output is employed in conjunction with other appropriate components to create variable resistors, tuned LC circuits, and variable inductors.

Preferred embodiments of the power factor corrector have the variable voltage output implemented in an electrical power controller, regulator, or converter, for regulating an AC input voltage. Preferred embodiments of such a controller have two pairs of switches, for a total of four switches, and an inductor, and the pairs of switches and the inductor are preferably in one of several conventional power regulator topologies such as buck, boost, or inverted (or some dual). The controller also has a logic controller as described above, so that each switch is separately modulated in such a way that some combination of one or more switches is always closed, or in other words so there is never a combination of all four switches that is open.

A preferred power factor corrector also has a current sensor in series with a load on the AC line. Both line voltage and current sense signals are fed into a phase delay detector that determines the phase delay between the AC line voltage and the load current. A power factor error amplifier is employed that is fed by an output of the phase delay detector, and the amplifier feeds a signal to the power controller logic controller, to automatically maintain a selected power factor correction on the line.

The power factor corrector may also advantageously employ a current sensor in series between the power controller and the load, and a harmonic error amplifier fed by an output of the current sensor, so that the amplifier feeds a signal to the power controller logic controller for auto resonance suppression, harmonic dampening and/or load current shaping.

In a variation of the power factor corrector, a plurality of capacitors and a plurality of power controllers are employed for variable and automatic power factor correction in a multiphase AC system. In a three phase variation, a first power controller is preferably in parallel between a first AC line and a third AC line, and a second power controller in parallel between a second AC line and a third AC line. At the same time, a first capacitor is preferably connected between the output of the first power controller and the third AC line, a second capacitor is connected between the output of the second power controller and the third AC line, and a third capacitor is connected between the output of the first power controller and the output of the second power controller.

Another variation of the power factor corrector employs a first power controller in parallel between a second AC line and a third AC line, with the power controller fed by a signal derived from a first AC line. A second power controller is in parallel between the first AC line and the second AC line, with the power controller fed by a signal derived from the third AC line. A third power controller is in parallel between the first AC line and the third AC line, with the power controller fed by a signal derived from the second AC line.

Another method aspect of the invention provides for power factor correction by reflecting or introducing a continuously variable capacitance onto a power line to correct displacement power factor, where the capacitance is variable by means of a voltage from the power line varied by a power control methodology.

This method preferably employs a power control methodology based on variable duty cycle modulation with the following steps: 1) sensing in real time a polarity of the input voltage to derive a pair of polarity signals that are inverted with respect to each other; 2) varying the duty cycle of a modulator, in accordance with and in proportion to the desired modification of the amplitude, the modulator having two outputs inverted with respect to each other; 3) feeding a polarity signal and a modulator output signal to an OR gate, where each signal has a duration, and the beginning of the duration of the duty cycle modulating output signal is delayed, and the end of the duration of the polarity signal is also delayed; 4) using the OR gate logical output for the variable duty cycle modulation of the input voltage.

A variation of this method employs, before reflecting or introducing a variable capacitance onto a power line, these additional steps: 1) sensing in real time an amplitude of current on the power line; 2) detecting phase delay (such as by calculating phase delay of current relative to voltage) on the power line in conjunction with the current sense; 3) amplifying an output of the phase delay detection step; then 4) controlling a power factor correction power controller with the amplified output from step 3.

Another variation of this method employs, before reflecting or introducing a variable capacitance onto a power line, these additional steps: 1) sensing in real time an amplitude of current on a line between the power controller and the power factor correction capacitor; 2) amplifying an output of the current sense step; 3) controlling a power factor correction power controller with the amplified output.

The method of the invention in one aspect involves electronic power control by varying the amplitude of an electrical power supply voltage, independent of frequency, whereby the output frequency will always be the same as the input frequency. An electrical circuit apparatus for accomplishing this function in a preferred embodiment is also disclosed herein. The preferred circuitry of this aspect of the invention uses four solid state switches, such as IGBT's, four diodes, an inductor, input and output filters and novel controlling circuitry. The controller apparatus and methods of the invention may be used to implement all otherwise conventional converter types, buck, boost, and inverting (and duals of these) versions to obtain different regulating characteristics, including galvanic isolation of the output from the input.

The inventive methods and devices may be used in power factor correction, voltage and/or current harmonic filtering and neutralization, line and load conditioning, improving or changing impedance characteristics of electrical generators, control of power transfer between two power grids, and programmable control of surges, sags, dropouts and most other voltage or power regulation problems.

In another aspect of the invention, a method of power factor correction is disclosed employing essentially the same control circuitry in a different application. In essence, a method as disclosed above, preferably employing the control circuitry referred to above, is used to dynamically control the voltage to (and therefore the reflected capacitance of) a single large capacitor (or several if one large enough is not available) that is continuously adjustable with vastly fewer parts than previously thought possible, and all at correction speeds of under 1 second. The circuit can interface between the power line and a PFC capacitor, and/or reactor. As the duty cycle D is varied, the reflected capacitance onto the power line is:

$$C_{refl} = D^2 * C_{PFC}$$

Thus, the capacitor can be continuously controlled between 0 and its given value, and the corrective load presented to the power line can be continuously controlled between 0 and unity times the corrective load in direct connection to the line. If the power factor, or the phase delay, is measured, and fed into an appropriate error amplifier, such as will occur to those skilled in the art, then the control circuitry will automatically correct power factor, even approaching unity, with response time on the order of 0.1 seconds. No other method uses reflected capacitance via a variably controlled voltage source to achieve PFC.

The apparatus and method of the invention has no DC storage bank, unlike known converter and PFC correction devices, and only one device is actually conducting output current at any given moment. Furthermore, the turn off voltage varies with the instantaneous line voltage, and (for reactive loads) is at a maximum when output current is at a minimum. Thus, switching losses are dramatically lower than existing methods, and the power factor corrector disclosed has greater output capability and efficiency, and smaller size than known PFC methods.

The disclosed PFC method and apparatus can also be configured for three phase PFC for balanced loads by employing two units and three PFC capacitors. In another application, since the invention can vary reactive loads and impedances, it may also be used as a whole or part of a tunable circuit for mitigation of power line harmonic currents, with either manual or automatic tuning of the filter.

Yet another extension of the invention includes a relatively fast (several kilohertz or more) loop which is closed around either system (motor and PFC) current or device (invention) output (capacitor) current. The control circuitry can be made to reject and to some degree correct existing harmonic currents that arise from resonances in such systems. Power line harmonic currents are a widely recognized problem in electrical distribution systems.

This has great advantage over the common PFC technique where several different capacitors are switched in and out with thyristors or relays. The apparatus of the invention is simpler, smaller, cheaper, and more accurate, and more reliable. It also eliminates the system resonances associated with PFC capacitors.

This circuit has the advantage that each switch turns off only into the instantaneous input voltage. The voltage is clamped to that value by an appropriate freewheeling diode, as will be appreciated by those skilled in the art. In a nominal 240 VAC system, average turn off voltage in the circuit of the invention is about 220V, compared to existing systems, such as those employing a DC rail where a clamp value might be as much as 500V, causing more than double the switching loss over the device of the invention. Thus the invention reduces switching losses to less than half of that common in known circuits, and with no clamp dissipation at all. A circuit with a snubber would require a capacitor so large that the snubber dissipation alone would be several times the total switching loss of the inventive device. The device of the invention reduces total switching losses dramatically over known devices, and this is particularly true while driving reactive loads, where peak line voltage and current are not in phase with each other. This phase separation normally leads to even higher losses in conventional devices. But since, as discussed above, switching loss is proportional to the product of frequency and voltage, this phase difference results in decreased switching losses in devices, embodying the invention.

Further advantages are that reduced peak voltage results in lower EMI/RFI conducted to input and output; while reduced switching losses allow higher switching frequencies, saving size and weight in input and output filters. Another advantage is that any of several power device types may be successfully employed in the circuit, including bipolar, MOSFET, IGBT, GTO, and MCT devices. Topologies like those disclosed by others (Peterson, for example) are not so versatile. Because all four switches in devices embodying the invention are on briefly at zero crossing of the voltage waveform, the current can flow in either direction during that transition without initiating a high voltage spike on the switches during that period. The resulting circuit is quieter, smaller, more efficient, and more reliable than existing treatments. It can handle voltage and current in either direction for true four quadrant operation and true bi-directional energy flow, with the small premium in extra control circuitry more than offset by savings in switch cost, heat sink size and weight, and mechanical size.

BRIEF DESCRIPTION OF THE DRAWINGS

FIG. 2 is a graphic representation of a voltage waveform output from a phase angle fired triac.

FIG. 3 is a graphic representation of an amplitude modulated sinusoidal voltage waveform output from devices embodying the invention.

FIG. 27 is a spreadsheet of comparative data on SCR performance vs. an invention prototype power controller.

BEST MODE OF CARRYING OUT THE INVENTION

Figure 1:
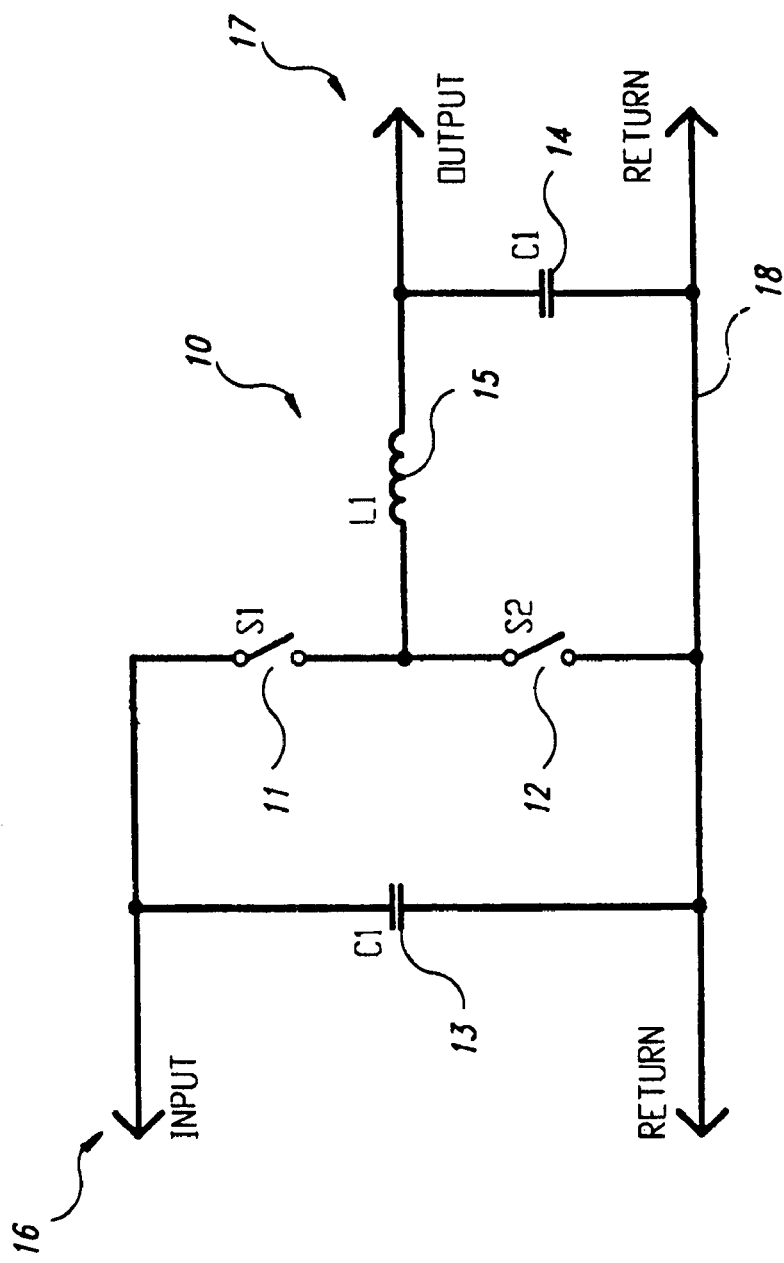
FIG. 1 is a schematic of a known simple buck regulator.

Turning now to the drawings, the invention will be described in a preferred embodiment by reference to the numerals of the drawing figures wherein like numbers indicate like parts.

FIG. 1 is a conventional configuration of known buck regulator topology, included here as a point of reference. Convention buck regulator 10 has a first switch 11, a second switch 12, input filter capacitor 13, output filter capacitor 14, inductor 15, input 16, output 17, and return 18. Switches 11 and 12 alternately close and open (are modulated), so that in conjunction with inductor 15, in well known fashion, voltage at output 17 may be stepped down from the voltage at input 16 in proportion to the duty cycle modulation of the switches.

FIG. 2 is a graphic representation of the broken waveform output from a phase angle fired triac, to be compared with FIG. 3 which is a graphic representation of an output voltage waveform having its amplitude varied over time by the power controller of the invention, without interruption of the waveform or change to the frequency. FIG. 2 is typical of phase controlled variable output voltage, in that step down of an instantaneous average voltage at output is achieved by cutting off a part of the waveform. This process results in many of the power regulation ills described elsewhere herein.

Figure 4:
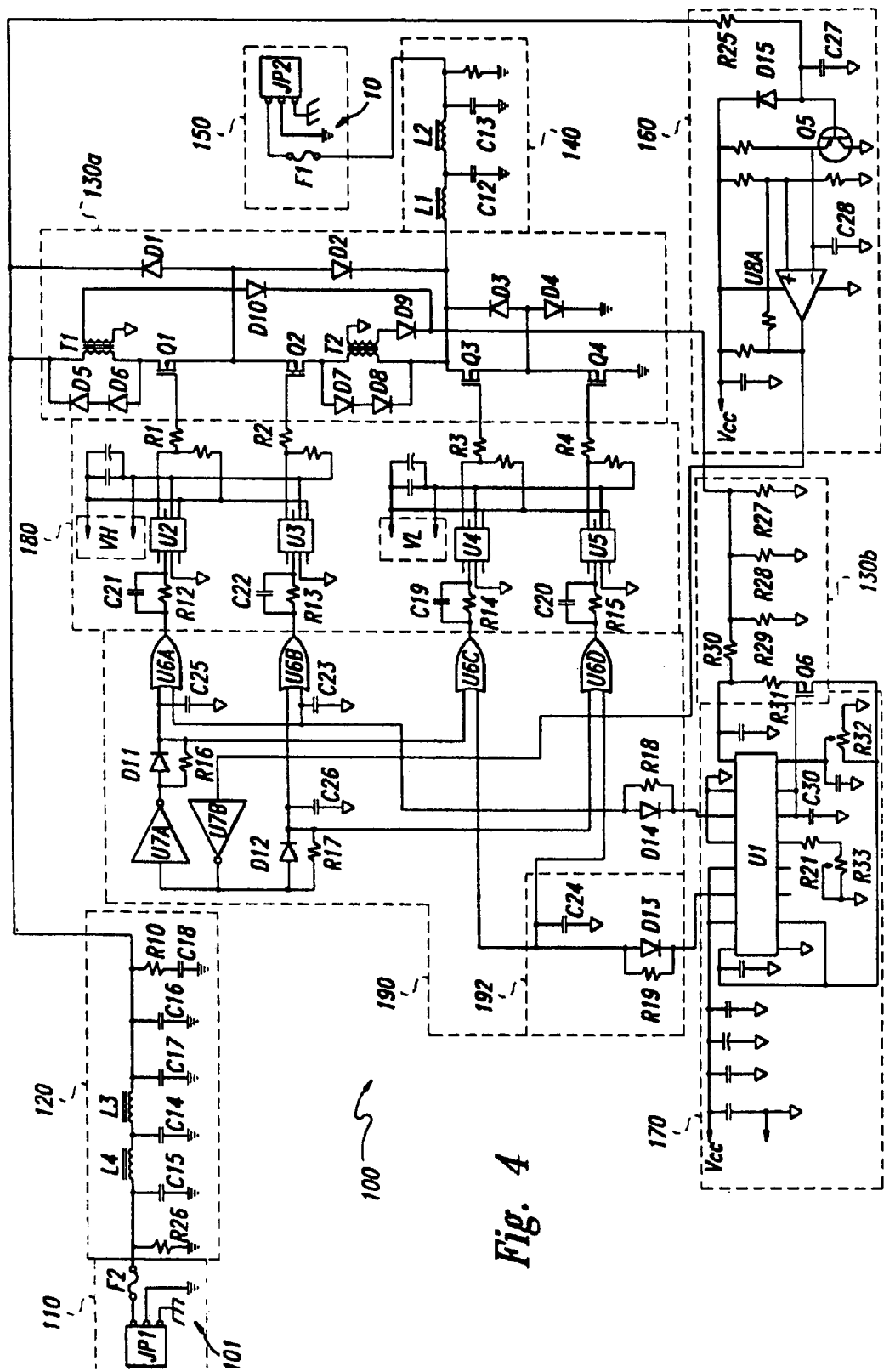
FIG. 4 is a schematic of one embodiment of the power controller of the invention.

FIG. 4 shows an electrical circuit for use in a preferred embodiment of the controller (sometimes also referred to herein as a converter or power converter) apparatus of the invention. The preferred circuitry of this aspect of the invention uses four IGBT solid state switches, four diodes, an inductor, input and output filters and novel controlling circuitry. The control circuitry is generally laid out in functional blocks in accordance with FIG. 5. The controller apparatus and methods of the invention may be used to implement all otherwise conventional converter types, including buck, boost, inverting, and flyback versions, as illustrated in FIGS. 6a–d, and duals of these topologies, as shown in FIG. 7.

Figure 5:
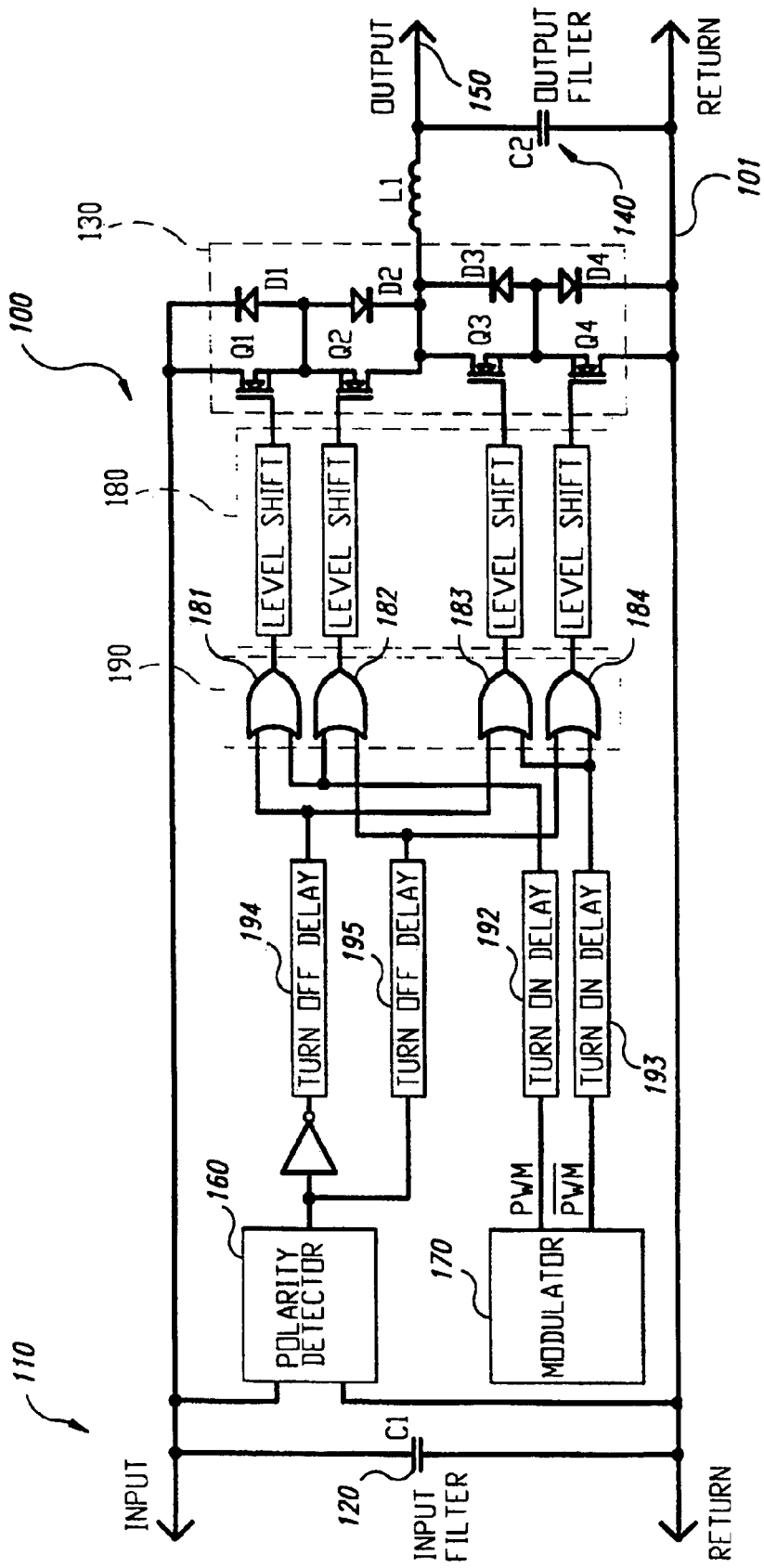
FIG. 5 is a block diagram and partial schematic of one embodiment of the power controller of the invention.

A preferred circuit for controlling power to reactive, resistive, or non-linear loads in accordance with FIG. 5 or 4 would be comprised of at least four separately controlled unidirectional switches that are all modulated differently according to the polarity of the line voltage according to a logic "box" so that some combination of the four switches is always on no matter what the polarity is, including the "zero cross" point of polarity change on the input voltage waveform. A preferred means of control in the "box" consists of a polarity detector, a modulator (preferably a pulse width modulator), and control logic.

Those skilled in the art will appreciate that the modulator may use any of several known methods, including fixed and variable frequency, and voltage and current mode, and can be implemented in one or more in a variety of ways, including use of one or more microcontrollers. Any of a number of algorithms can be employed to provide constant, vat or programmable output (in terms of RMS, average and peak voltage and/or current) to control the modulator. The modulator preferably provides a high frequency (>10 KHz) logic output of between 0% and 100% duty cycle. An additional output of opposite or reciprocal polarity is also preferably provided.

During the "zero crossing" of the line voltage (i.e., when input voltage is in transition from one polarity to another), all switches are turned on simultaneously for a short period of time (it is contemplated that this will be on the order of a few microseconds in preferred embodiments) to allow continuous current to flow in the output, as may be necessary. Thus, current can flow in either direction during the zero crossing transition without initiating a high voltage spike on the switches at that time. During this time, the input and output of the circuit are effectively short circuited by the simultaneous conduction of the four switches. However, the transition is chosen to occur at a point where the instantaneous input voltage is low enough (near the "zero" crossing—i.e., in the range of +/−4V, or less, depending on the power switches used) that little or no current is drawn from the input source.

Then each time the polarity has cycled, operation returns to that previously described. Thus there are four operational stages per line cycle: Positive polarity, polarity transition (zero cross), negative polarity, and polarity transition (zero cross). As the switches in preferred circuits are likely to operate at high and varying voltages, the control logic also includes level shifting as needed to interface with the switches.

The power controller 100 of the invention can best be appreciated in detail through a description of its basic schematic building blocks, as illustrated in a preferred circuit embodiment in FIG. 4. Input block 110 includes jumper JP1 through which power is applied to controller 100. JP1-2 is connected to a power return bus (as is line 2 of output connector JP2-2) and this bus is separate from chassis ground (JP1-3 and JP2-3). The common power return bus enables controller 100 to be portrayed (at least for purposes of block diagram form, such as for example FIG. 10) as a three terminal component. Input current limiting for catastrophic failure is provided by fuse F2.

Input filter 120 includes capacitors C14–C18, inductors L3 and L4, and resistor R10. This is a multistage filter which keeps high frequency switching noise out of the input line, reducing conducted EMI/RFI, as will be appreciated by those skilled in the art. R10 provides damping for the filter to reduce ringing. R26 is a bleeder resistor to remove stored charge from the input filter after power disconnection.

Power stage 130*a–b* consists of switches Q1–Q4 and diodes D1–D4. The switches are preferably implemented as IGBT type transistors, though they may also be any of several other types, as detailed elsewhere herein. Each of the four IGBT switches Q1–Q4 is separately controlled, though they form in combination a unique arrangement that, in conjunction with control circuitry disclosed herein, provides four quadrant operation (see discussion infra) and low switching losses.

In preferred embodiments, the four switches Q1–Q4 are paired, and each pair Q1–Q2 and Q3–Q4 have their sources tied together, and each of the switches in a pair are poled in the opposite sense to each other.

Output overcurrent protection is accomplished on a cycle by cycle basis via current transformers T1 and T2. Current sense information is rectified by diodes D9 and D10, and fed into sense resistor R27–R29 (block 130*b*), and then compared in the current limit pin U1-9 of modulator IC U1 (see infra). Switch Q6 and resistors R30 and R31 (block 130*b*) provide slope compensation to the current sense circuit in order to provide more stable operation under a variety of duty cycles. Diodes D6–D8 are used to limit transformer T1, T2 leakage reactance voltage spikes on switches Q1, Q2 during turn off.

Output filter 140 provides output averaging and filtering through inductors L1, l2 and capacitors C12, C13. L1 and C12 average the modulated power stage output into an instantaneous DC value (which varies over time, proportionate to input voltage and to duty cycle). L2 and C13 further filter out the high frequency switching waveform components from the output. Resistor R11 bleeds off charge from capacitors C12, C13 upon removal of input voltage.

Output block 150 includes output connector (jumper) JP-2, having output high side JP2-1 and power return JP2-2 (which as disclosed above is common with JP1-2). Long term output overcurrent protection is provided by fuse F1, while instantaneous limiting is provided for internally its previously discussed.

Polarity detector 160 serves to detect line polarity via comparator U8A and its associated circuitry. Input voltage is sensed through resistor R26 and clamped via diode D15 and switch Q5 to keep the signal within the common mode input range of comparator U8A. U8A detects voltage and provides a amount of hysteresis (about 1V) to prevent spurious operation in a noisy environment. Some filtering is also provided via capacitors C27, C28 for the same purpose.

Modulator 170 includes IC U1 which provides for modulation in this embodiment of controller 100, using pulse width modulation as its particular method. However, those skilled in the art will appreciate that a number of other conventional controllers and other modulation types may also be employed as desired.

Modulator U1 is an off-the-shelf part used as a modulator/regulator for conventional switching power supplies, and its operation here is likewise conventional. Timing components R21, R33, and C30 are used to set operating frequency in the 20 KHz to 40 KHz range. Duty cycle is varied via resistor R32, which is connected to the soft start pin U1-8. There is no regulation loop shown in this particular circuit embodiment, although output voltage and current may be regulated in a variety of ways, including average, instantaneous, RMS, harmonic reduction and/or neutralization, power factor correction, and the like, all as discussed elsewhere herein. Modulator output is taken from U1-11 (normal and U1-14 (inverted).

Level shifting may be accomplished by means of a variety of conventional methods involving transformers, optocouplers, and the like. In the preferred circuit shown in FIG. 4, the task is accomplished with a readily available integrated circuit (IC). This IC provides an optocoupler and high current driver for interfacing with the gate of a MOSFET or IGBT device. Electrical power at the gate is provided via an isolated transformer winding with rectifier and filter, although a number of equivalent methods may be alternately employed by those skilled in the art.

Level shifting block 180 receives output signals from the logic circuitry (q.v., infra), which are then shifted in voltage level to drive switches Q1–Q4 via ICs U2–U5, respectively. U2–U5 are stock components that include an optocoupler input and high current MOSFET driver output. They operate from small power supplies VH and VL which are 15 VDC floating power sources, the conventional derivation of which will readily occur to those skilled in the art. In this case, small linear power supplies are used but are not shown in the schematic for sake of clarity.

Each transistor gate has a series resistor (R1–R4) to limit ringing and to control rise and fall times during switching transitions. Each transistor also has a bleeder resistor from gate to source to insure that all devices are in the non-conducting or "off" state in the event that VH or VL are lost. Current into each optocoupler input is limited by a 1.21K resistor (R12–R15) to about 7 mA per the TC4804 specification, with a small capacitor (C19–C22) in parallel to speed up the response time.

Control logic block 190 includes IC devices U7A, U7B and U6A–D. Operation of control logic block 190 may best be understood from discussion of its three bask modes of operation. In all modes, control logic 190 takes three input signal types (normal modulated output—from U1-11, inverted modulated output—from U1-14, and polarity detect—from U8A-1) and translates them into four individual transistor drive outputs, which in turn control Q1–Q4. It is thus useful to discuss the invention in terms of three modes, corresponding as they do to the three types of input signals received by the control logic unit. This does not negate however the earlier discussion based on four operational stages, corresponding to the four parts of a voltage waveform as it moves in time. For each of the three basic operating modes there are two conditions (discussion of which also sets forth the essence of the full four quadrant operation of the apparatus and method of the invention).

First mode is positive polarity of input voltage. During positive input polarity, U8A will be low, holding inverters U7B (output) high and U7A (output) low. With U7B high, both OR gates U6B and U6D will be high, turning on Q2 via U3 and Q4 via U5. With U7A low, U6A is controlled by the modulator output from U1-11. A turn on delay (rising edge) is provided by R18 and C23. Turn off is not delayed because diode D14 bypasses R18 on the falling edge. U6A in turn controls Q1 via U2.

At the same time, U7A low allows U6C to be controlled by the inverted modulator output U1-14. It contains a similar turn on delay circuit comprised of R19, C24 and D13. Both delay times are the same and are sufficient to prevent Q1 and Q3 from conducting simultaneously during operation. U6C controls Q3 via U4.

The two conditions of operation for positive polarity are 1) positive output current, and 2) negative output current. During positive output current, L1 current is sourced through Q1 and D2 during the Q1 "on" (conducting) state. When Q1 is turned of L1 current freewheels through Q4 and D3. Q3 is turned on (after delay) during the time that Q1 is off, but no current flows through it due to its polarity; the current passes through D3 instead.

During negative output current, L1 current is controlled by Q3, passing through Q3 and D4. When Q3 is turned off, L1 current freewheels through Q2 and D1 back to the input. Q1 is turned on during that time, but no current flows through it due to its polarity; current passes through D1 instead.

The second mode is negative polarity of input voltage. During negative input polarity, U8A will be high, holding inverters U7B (output) low and U7A (output) high. With U7A high, both OR gates U6A and U6C will be high, turning on Q1 via U2 and Q3 via U4. With U7B low, U6B is controlled by the modulator output from U1-11. A turn on delay (rising edge) is provided by R18 and C23. Turn off is not delayed because diode D14 bypasses R18 on the falling edge. U6B in turn controls Q2 via U3.

At the same time, U7B low allows U6D to be controlled by the inverted modulator output U1-14. It contains a similar turn on delay circuit 192 comprised of R19, C24 and D13. Both delay times are the same and are sufficient to prevent Q2 and Q4 from conducting simultaneously during operation. U6D controls Q4 via U5.

The two conditions of operation for negative polarity are 1) negative output current, and 2) positive output current. During negative output current, L1 current is controlled through Q2 and D1 during the Q2 "on" state. When Q2 is turned off, L1 current freewheels through Q3 and D4. Q4 is turned on (after delay) during the time that Q2 is off, but no current flows through it due to its polarity; the current passes through D4 instead.

During positive output current, L1 current is controlled by Q4, passing through Q4 and D3. When Q4 is tuned of L1 current freewheels through Q1 and D2 back from the input. Q2 is turned on during that time, but no current flows through it due to its polarity; current passes through D2 instead.

The third mode is polarity transition, with the two conditions being positive transition and negative transition. During positive transition (from negative polarity to positive polarity), Q2 and Q4 are turned on at transition according to the previously described comparator and logic states. Q1 and Q3 had been turned on during negative polarity, as explained above, and do not now turn off immediately at this transition because of a delay circuit formed by resistor R16 and capacitor C25. Diode D11 prevents any turn on delay during this transition.

During negative transition from positive polarity to negative polarity), Q1 and Q3 are turned on at transition according to the previously described comparator and logic states. Q2 and Q4 had been turned on during positive polarity, as explained above, and do not now turn off immediately at this transition because of a delay circuit formed by resistor R17 and capacitor C26. Diode D12 prevents any turn on delay during this transition.

In some preferred embodiments the turn on delay is comprised of a circuit wherein a high input transition creates a high output transition after some predetermined delay, and a low input transition results in an immediate (i.e., minimum delay) low output transition. This is all preferably accomplished with a diode, resistor and capacitor combination, such that on a low-to-high transition, the capacitor is charged high through the resistor, taking an amount of time to reach the logic threshold voltage of the OR gate being driven, thus providing a delay, the amount of which may be selected through selection of the values of the diode, resistor and capacitor referred to above, as will be appreciated b) those skilled in the art. Then, on a high-to-low transition, the resistor is bypassed by the diode creating a low impedance discharge path to greatly increase the discharge rate of the capacitor. The capacitor voltage is thus lowered in minimum time, and the logic transition thus occurs with minimum delay.

In preferred embodiments the turn off delay is comprised of a circuit wherein a low input transition creates a low output transition after some predetermined delay, and a high input transition results in an immediate (i.e., minimum delay) high output transition. This is also all preferably accomplished with a diode, resistor and capacitor combination, such that on a high-to-low transition, the capacitor is discharged low through the resistor, taking an amount of time to reach the logic threshold voltage of the OR gate being driven, thus providing a delay, the amount of which also may be selected through selection of the values of the diode, resistor and capacitor referred to above. Then, on a low-to-high transition, the resistor is bypassed by the diode creating a low impedance charge path to greatly increase the charge rate of the capacitor. The capacitor voltage is thus raised in minimum time, and the logic transition thus occurs with minimum delay. For either or both of the turn off and turn on delay methods disclosed, a number of alternate methodologies may be used to create the respective delays, such as use of monostable multivibrators, counters, microcontrollers, and the like, all as will be appreciated by those skilled in the art.

As a result of this logic, for either positive or negative transition, the input voltage and output voltage are momentarily clamped and are likewise momentarily effectively short circuited to the input/output return and to each other. However, though this runs contrary to conventional thinking, the transition logic events described above all occur at a point in the input voltage waveform where the absolute value of the instantaneous input voltage is actually less than the total semiconductor voltage drops between the input voltage and the input/output voltage return (i.e., less than about four volts in the circuit illustrated). For this reason, no excessive current inputs are drawn during transition. Output voltage is held at a minimum voltage, proportionate to the input voltage, as it should be. L1 current freewheels appropriately, and no excessive voltage spikes occur on either the input, the output, or across any of the transistors or diodes in power stage 130.

After turn off delay, transition is complete, and operation returns to either positive or negative polarity mode, as appropriate, and as discussed above. Overall control logic and operation of controller 100 is therefore fully defined, logically controlled at all times, and smooth in transition for all modes and conditions.

In the circuit illustrated in FIG. 4, preferred component values and/or part types are given in the table below. This list, in conjunction with the schematic and other disclosure herein, will enable the technician or other skilled artisan to construct the circuit disclosed. This list, with such differences as will be appreciated by those skilled in the art also illustrates componentry of other topologies and embodiments disclosed herein

| Drawing Numerals | Part Type |
|---|---|
| C1–C8 | .1UF |
| R30 | 1.00K |
| R12–R15 | 1.21K |
| D11–D15 | 1N4448 |
| Q5 | 2N3906 |
| Q6 | 2N7000 |
| C13–C15 | 2UF 400V |
| R5–R9 | 4.99K |
| R10 | 5.1 10W |
| C12, C16–C18 | 5UF 400V |
| R31 | 6.21K |
| R1–R4, R27–R29 | 10.0 |
| R16–R21 | 10.0K |
| R32 | 10K |
| R33 | 20K |
| F1, F2 | 25A |
| L4 | 30UH |
| C27 | 47PF |
| L2, L3 | 50UH |
| R11, R25, R26 | 82K 2W |
| R22 | 90.9K |
| R24 | 100K |
| C19–C26 | 100PF |
| C9–C11 | 100UF |
| C28, C29 | 220PF |
| L1 | 240UH |
| R23 | 453K |
| C30 | 4700PF |
| U7 | CD4049UB |
| U6 | CD4071B |
| D9, D10 | HER105 |
| D5–D8 | HER305 |
| D1–D4 | HFA25BP60 |
| JP1 | INPUT |

-continued

| Drawing Numerals | Part Type |
|---|---|
| Q1–Q4 | IRGPC50U |
| U8 | LM393A |
| JP2 | OUTPUT |
| T1, T2 | PE51687 |
| U2–U5 | TC4804 |
| U1 | UC3824 |

The functional blocks discussed above with reference to FIG. 4 can be further understood now by reference to FIG. 5. Power controller 100 (also sometimes referred to herein as a converter) has four OR gates 181–184 in logic control unit 190 fed by outputs from polarity detector 160 and duty cycle modulator 170 through turn off delays 194, 195 and turn on delays 192, 193 such that OR gates 181, 183 each receive as a first input an output from the polarity detector 160 (inverted) through delay 194, and OR gates 182, 184 each receive as a first input an output from the polarity detector 160 through delay 195. OR gates 181, 182 each receive as a second input an output from the duty cycle modulator 170 through delay 192, and OR gates 183, 184 each receive as a second input an output from the duty cycle modulator 170 through delay 193. The output from each OR gate, through appropriate level shifting in level shift block 180, controls or drives one of four switches Q1–Q4 in power stage 130 (through its respective gate) each.

Figure 9:
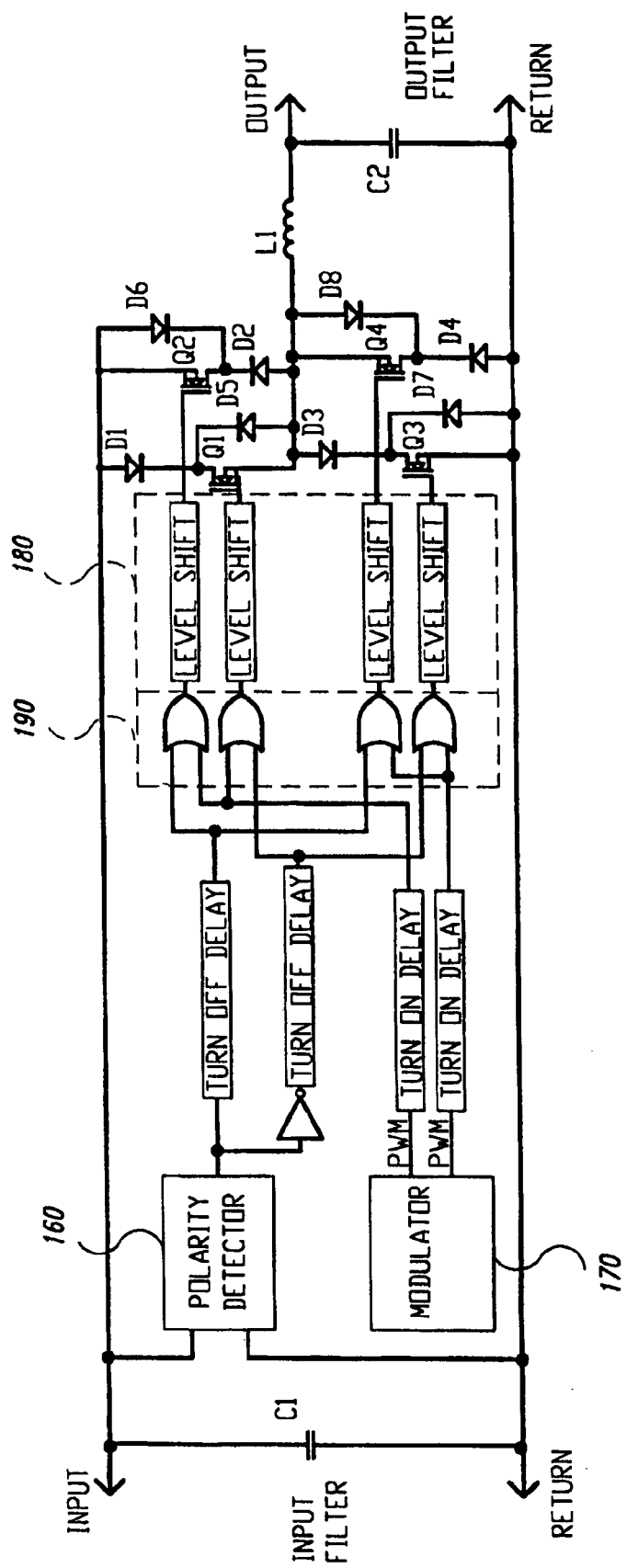
FIG. 9 is a block diagram and partial schematic of an alternate embodiment of the power controller of the invention.

Preferably, the switch sources of each pair of switches are tied together, as illustrated in this drawing figure, but do not have to be in some alternate embodiments, such as that shown in FIG. 9. Preferably, each switch is a solid state switching device, with a diode, poled to have a sense opposite to the switch, in parallel across the source and drain of the switch, and with the diodes of a pair of such switches opposite in sense to each other, as illustrated. The switches are preferably transistors, such as the IGBT transistors illustrated for Q1–Q4.

This embodiment of controller 100 has a buck regulator type of topology, but has two switches in series with each other, preferably poled in the opposite sense from each other, and connected with inductor L1 to input 110, and two switches in series with each other, also preferably poled in the opposite sense from each other, and connected with inductor L1 to return 101.

Figure 6A:
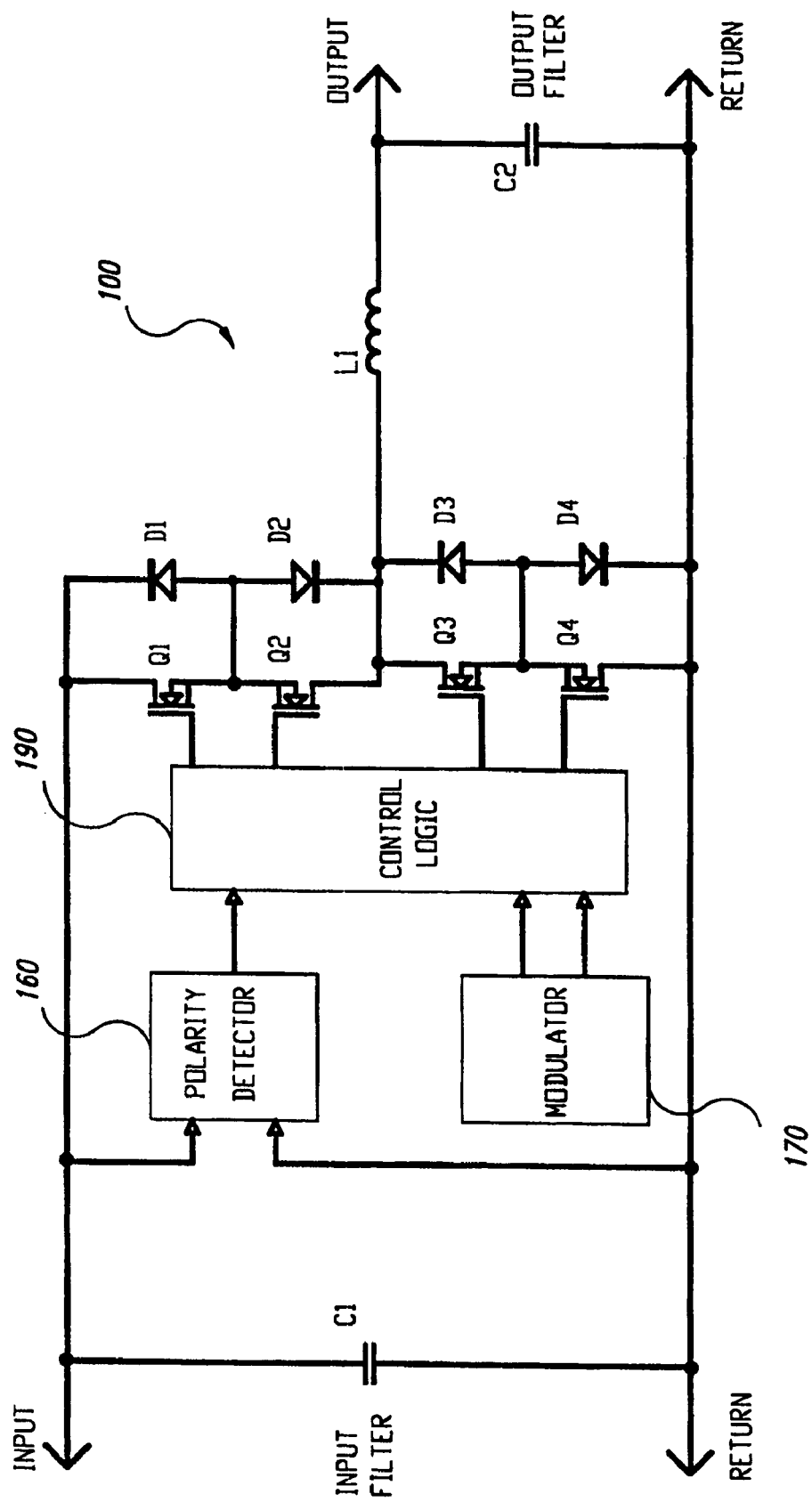
FIG. 6 is a set a–d of schematic and partial block diagrams of alternate embodiments of the power controller of the invention.
Figure 6B:
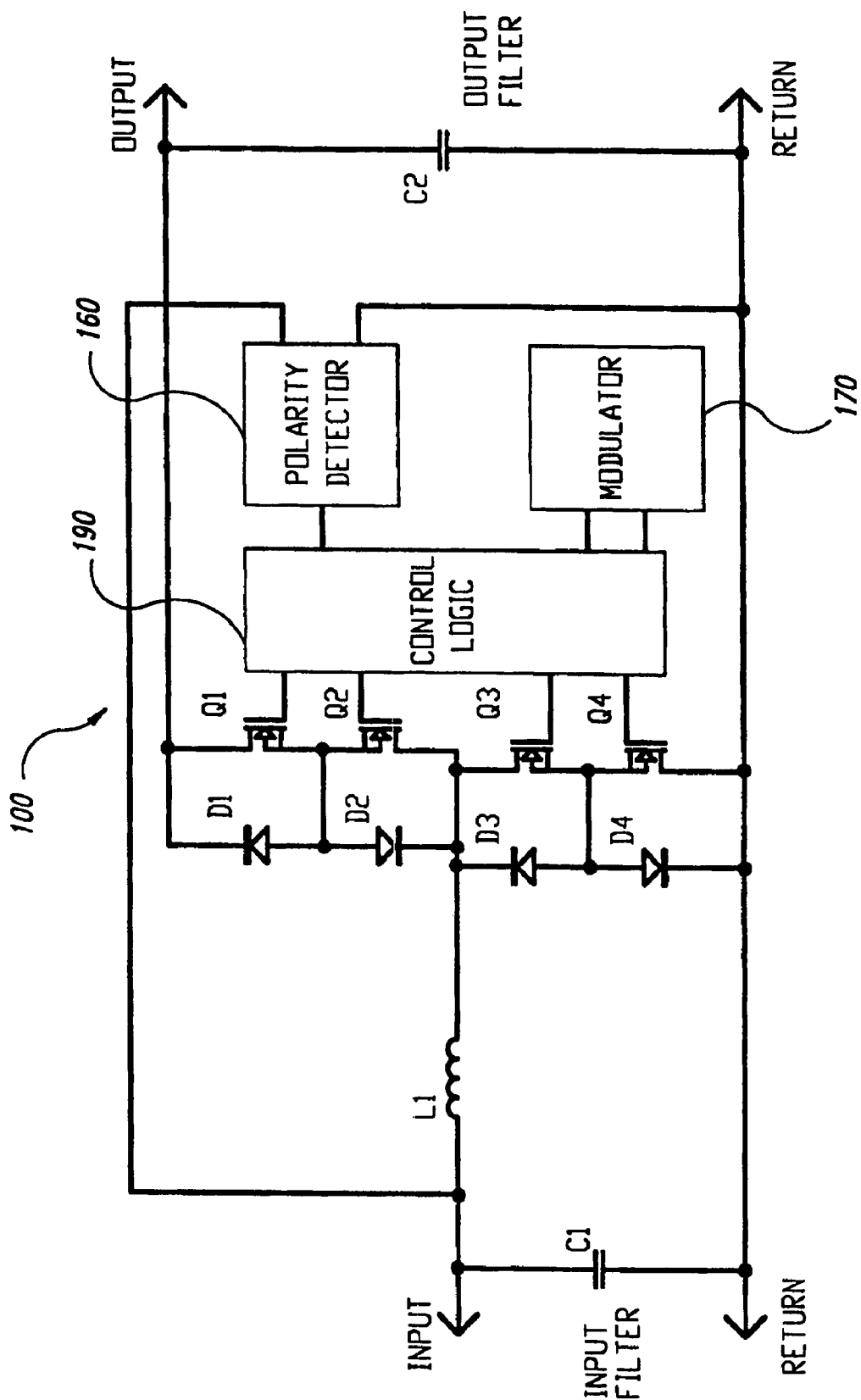
Figure 6C:
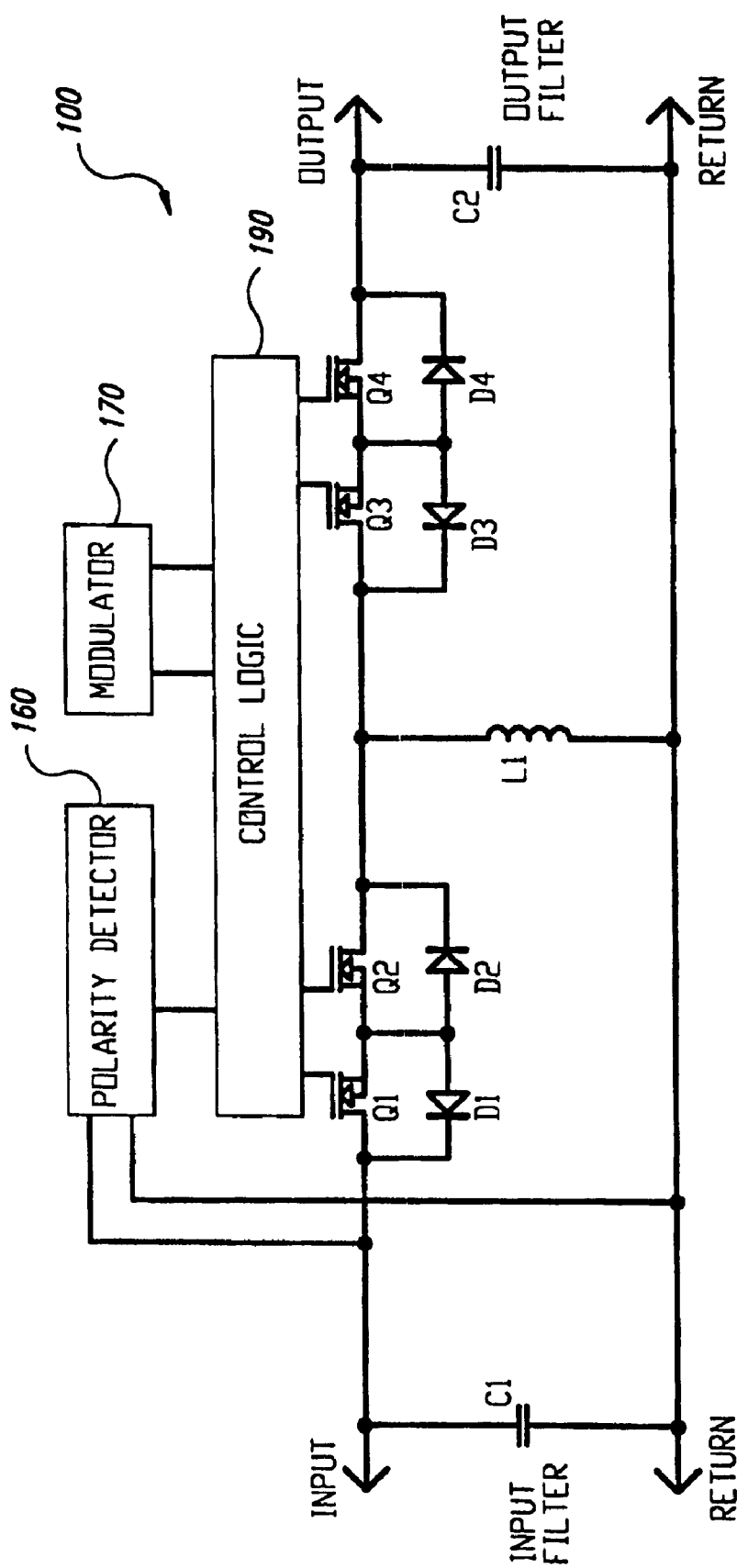
Figure 6D:
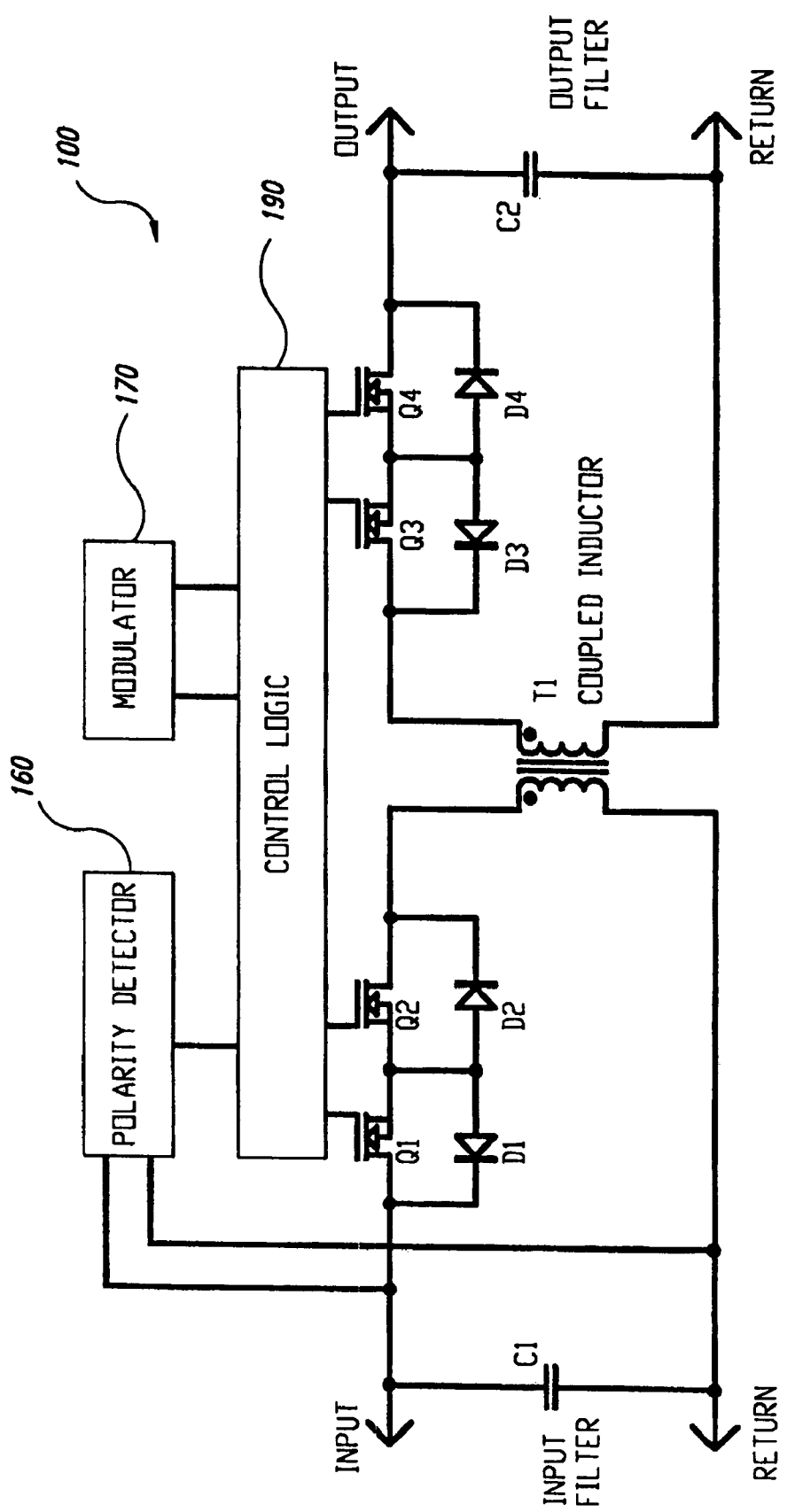
Figure 7A:
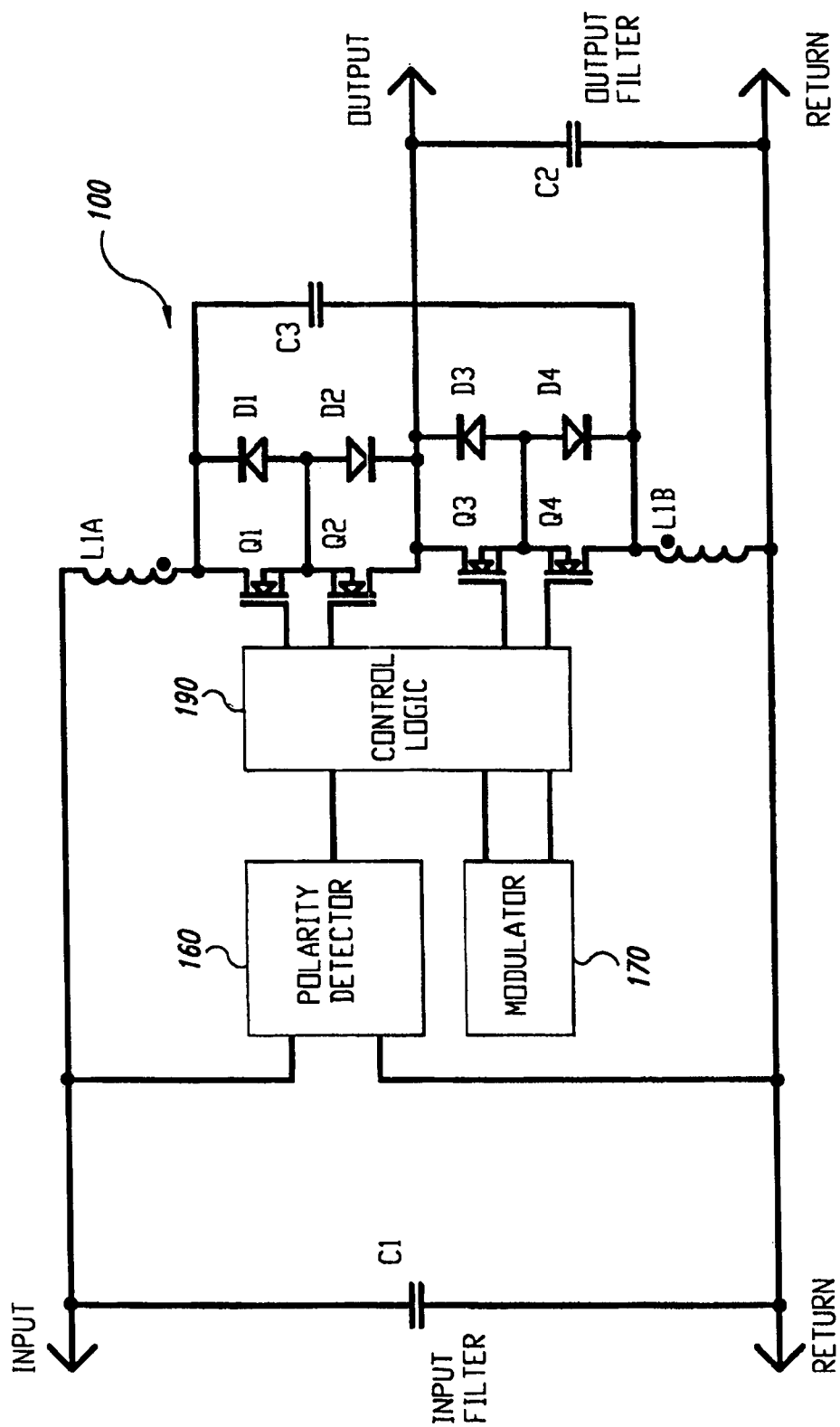
FIG. 7 is a set a–d of block diagrams and partial schematics of alternate dual topologies.
Figure 7B:
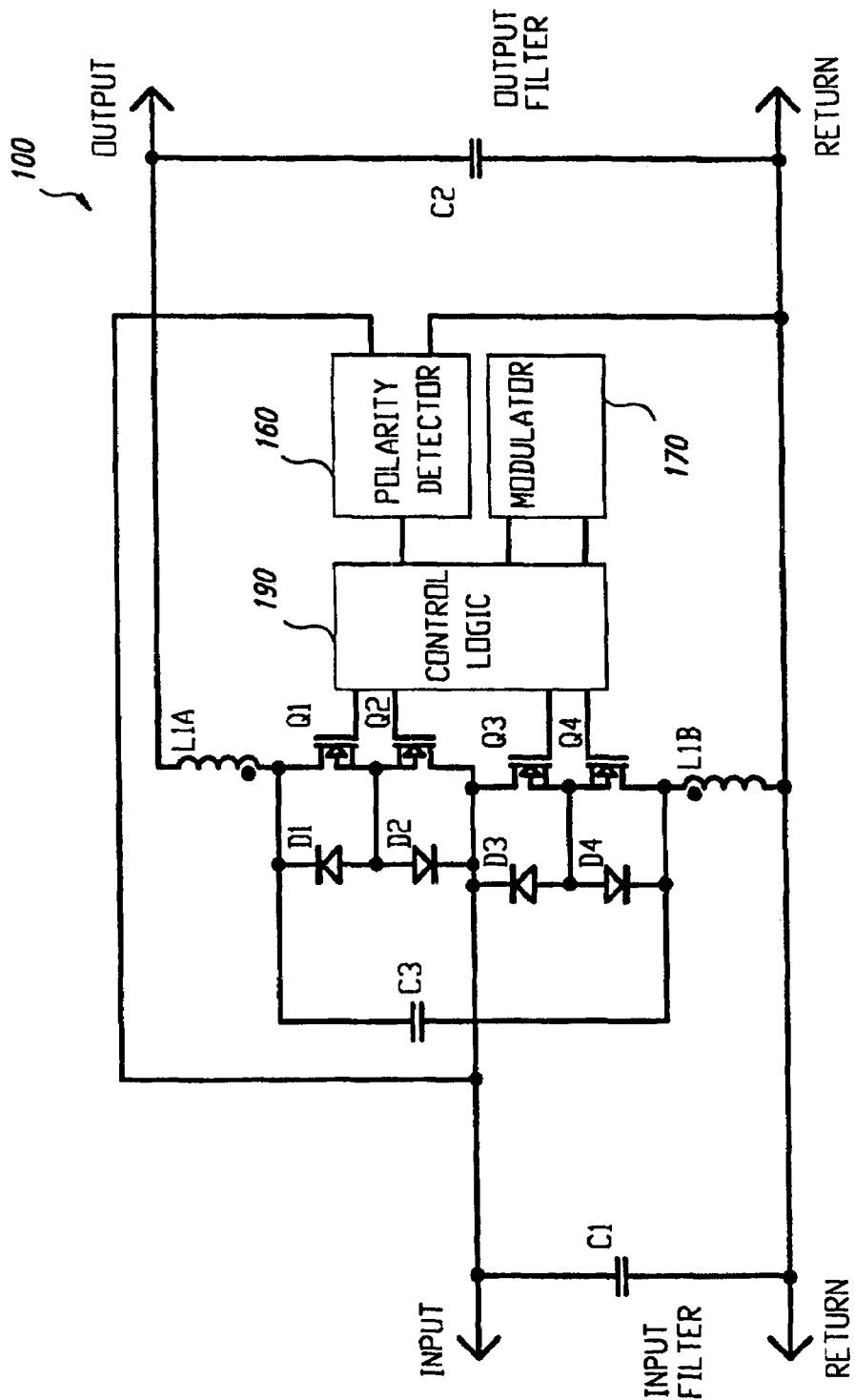
Figure 7C:
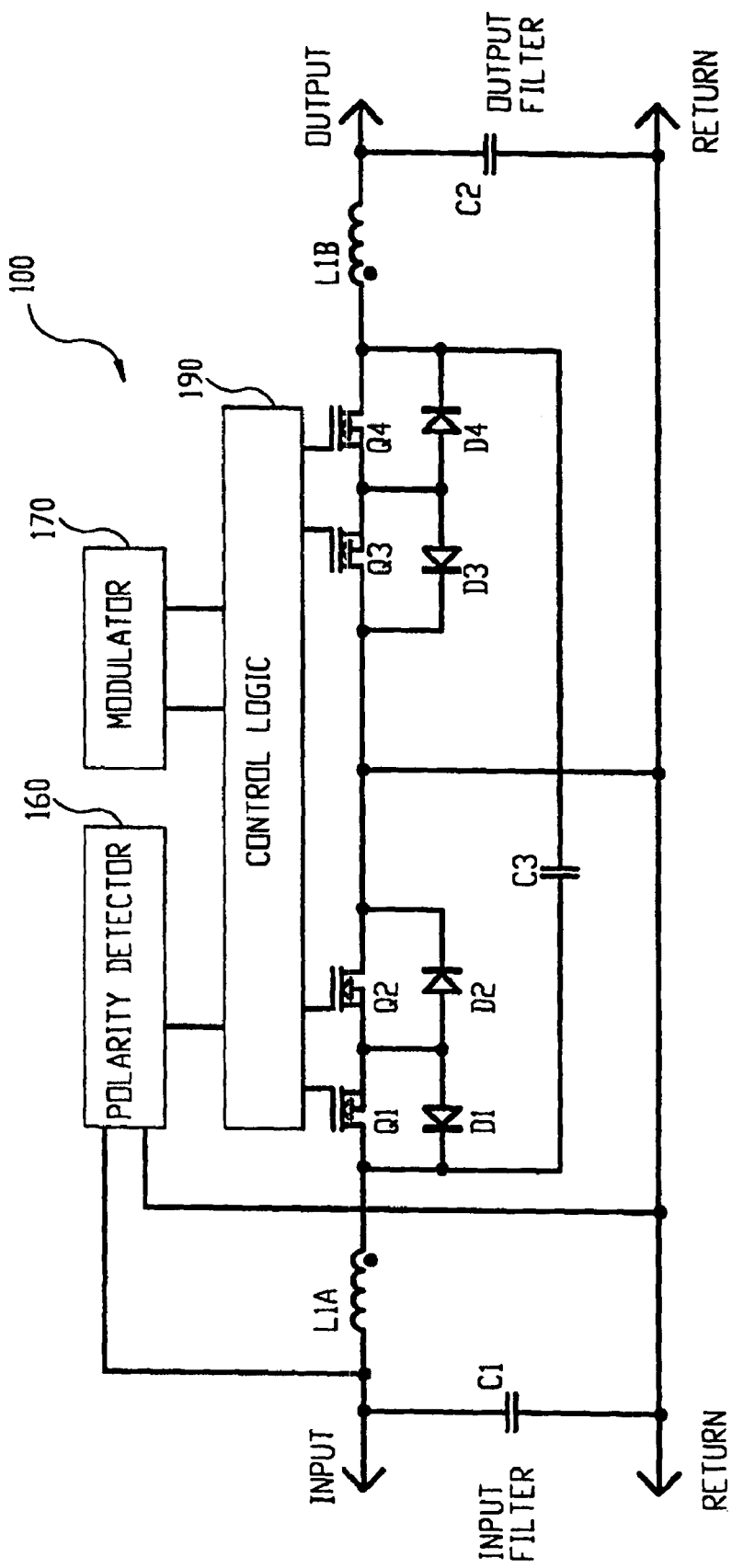
Figure 7D:
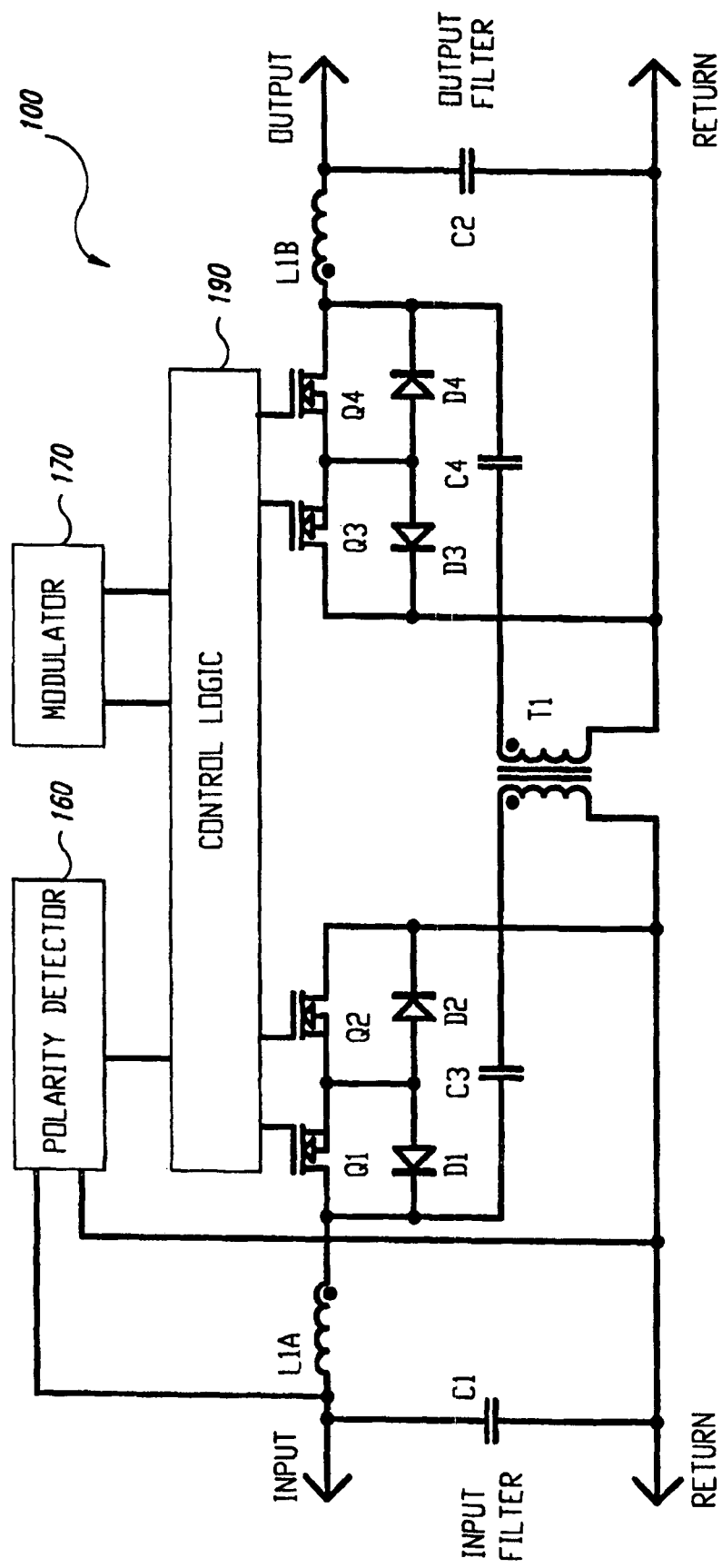

The buck regulator general form of controller 100 in FIG. 5, can better be seen in FIG. 6a, along with other conventional regulator type configurations for controller 100. FIG. 6b shows controller 100 in step-up or boost configuration. FIG. 6c shows controller 100 in inverting regulator configuration. FIG. 6d shows controller 100 in isolated or flyback configuration.

As a further illustration of the versatility of the invention, and its potential for replacing conventional topologies without their disadvantages, FIG. 7 shows the corresponding "dual" transforms for each of the four topologies shown in FIG. 6. FIG. 7a shows controller 100 in step-down or buck dual configuration. FIG. 7b shows controller 100 in step-up or boost dual configuration. FIG. 7c shows controller 100 in inverting regulator dual configuration. FIG. 7d shows controller 100 in isolated inverting dual configuration.

The resulting output controller 100 voltage under any input voltage mode or output current condition is equal to the product of the input voltage and the modulator duty cycle, as more fully discussed (elsewhere herein. Slight deviations do exist, due to turn on delay times and semiconductor and resistive voltage drops, as will be appreciated by those skilled in the art, but the overall waveform purity is excellent in the disclosed circuit, especially at higher voltages (such as 230 VAC and up).

The controller or converter apparatus and method of the invention is envisioned for use in a wide range of applications via a range of alternate topologies disclosed herein. For instance, it is envisioned that control modules comprising the apparatus or methodology of the invention can be made for manual usage, power factor correction and automatic power factor correction, as a universal line conditioner, a motor economizer, and as a harmonic neutralizer. Other uses such as industrial process controls can be accessed via standard industrial interfaces such as the 4–20 mA current loop, and any one of a number of other standard control interfaces, such as RS232, RS485, IEEE488.2, VXI, 0–10V, 0–5V, +/–10V, +/–5V, and manual. Power converters envisioned can be made for use in a wide range of operating voltages and currents, from for instance 120 VAC, 1.5 KVA to 600 VAC, 200 KVA, and even beyond this range, higher amperages can be accommodated by paralleling two or more of the converter modules of the invention, and higher voltages and currents may be controlled via a controller/transformer hybrid.

Figure 8:
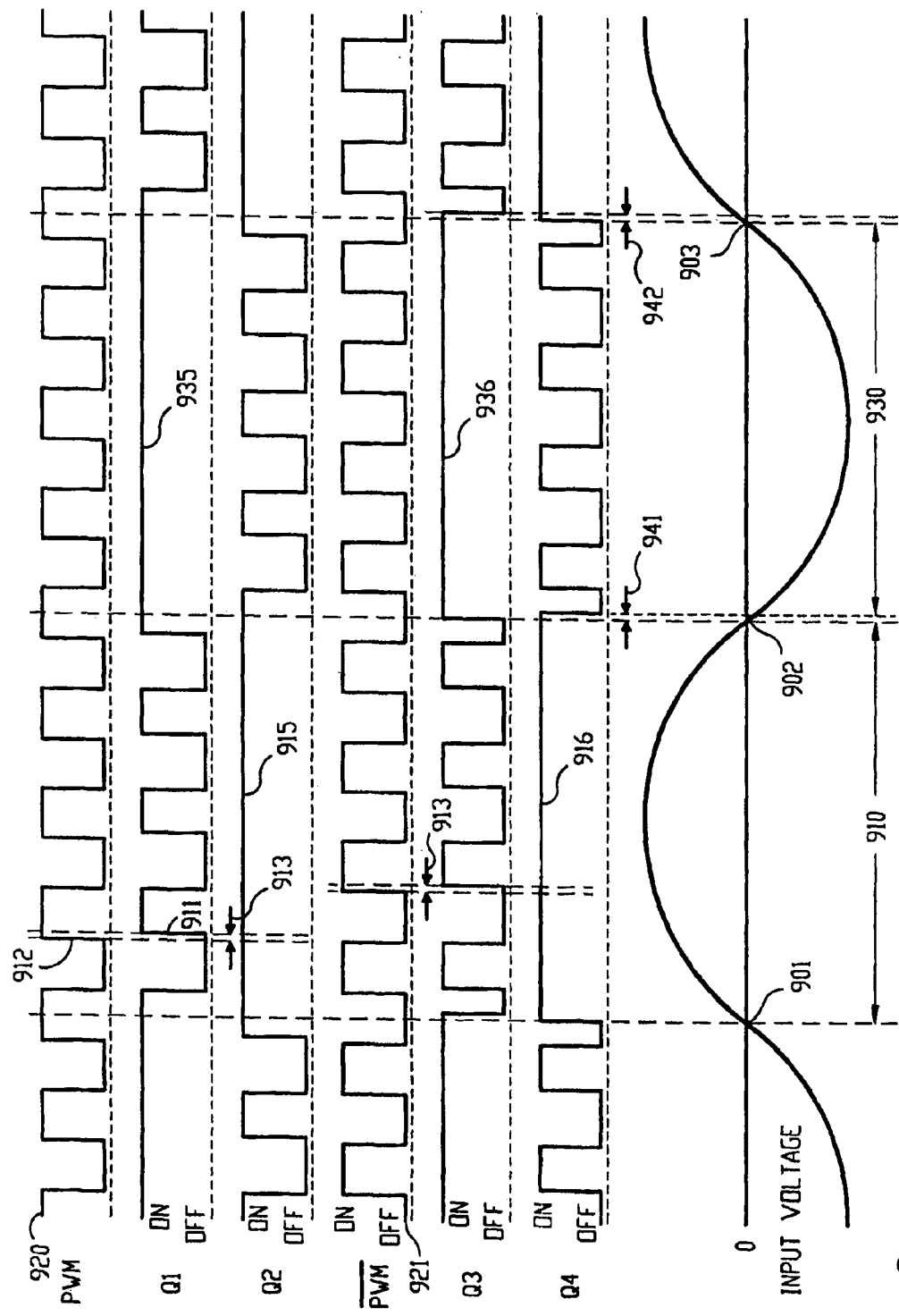
FIG. 8 is a switch timing diagram for operation of the circuit of FIG. 4.

In a preferred method of the invention, with all four preferably transistor switches separately controlled, and modulated differently according to the polarity of the input voltage, a sequence can be implemented whereby each switch turns off only into the instantaneous line input voltage, as graphically represented in the timing diagram of FIG. 8. In FIG. 8, an idealized line voltage is shown schematically as a sine wave with representative cross over points 901, 902, 903 (the points where the waveform line crosses the "zero crossing" line, emphasized by vertical dashed lines, and corresponding to the point in time where the waveform shifts from one polarity to the other). A pulse width modulation (PWM) signal 920, capable of ranging between 0% and 100% (and here illustrated at about 50%), and its "anti-modulated" reciprocal 921, are fed into a logic network, such as has been described herein, along with the output from a line polarity detector.

When line voltage (polarity) is positive (time duration 910), switch Q1 is pulse width modulated (on and off), each "on" time 911 slightly delayed relative to the corresponding rising edge 912 of the PWM, and in like manner, Q3 is anti-modulated (i.e., the opposite state of Q1, or in other words, when Q1 is on, Q3 is off, and vice-versa). A small delay or dead time 913 is added for each turn-on of each switch (emphasized with dotted lines) to avoid simultaneous conduction, where the amount of time will depend on the characteristics of the particular switch employed, all as will be appreciated by those skilled in the art. Q2 and Q4 remain on 915, 916 at all times during this positive polarity operational phase.

When line voltage polarity is negative (time duration 930), Q2 is pulse width modulated and Q4 is anti-modulated (i.e. the opposite state of Q2). Again, a small delay 913 (present, but not emphasized with dotted lines) or dead time is added for the turn-on of each switch to avoid simultaneous conduction and Q1 and Q3 remain on 935, 936 at all times during this negative polarity operational phase.

At crossover 902, 903, Q3 turn off delay 941 and Q4 turn off delay 942 (emphasized with dotted lines) assure that at least one switch (preferably all switches, as here illustrated) remains on, or conducting. Preferably, all switches are turned on simultaneously at this zero cross for a short period of time (on the order of a few microseconds) to allow continuous current to flow in either direction ion during zero crossing transition without initiating voltage spikes on any of the switches at that time, as more fully disclosed elsewhere herein. This may be all be summarized in Table 1.

TABLE 1

| INPUT POLARITY | Q1 | SWITCH Q2 | STATES Q3 | Q4 |
|---|---|---|---|---|
| POSITIVE | MODULATE | ON | MODULATE | ON |
| NEGATIVE | ON | MODULATE | ON | MODULATE |
| TRANSITION | ON | ON | ON | ON |

Note:
"MODULATE" is opposite of "MODULATE"

Figure 30:
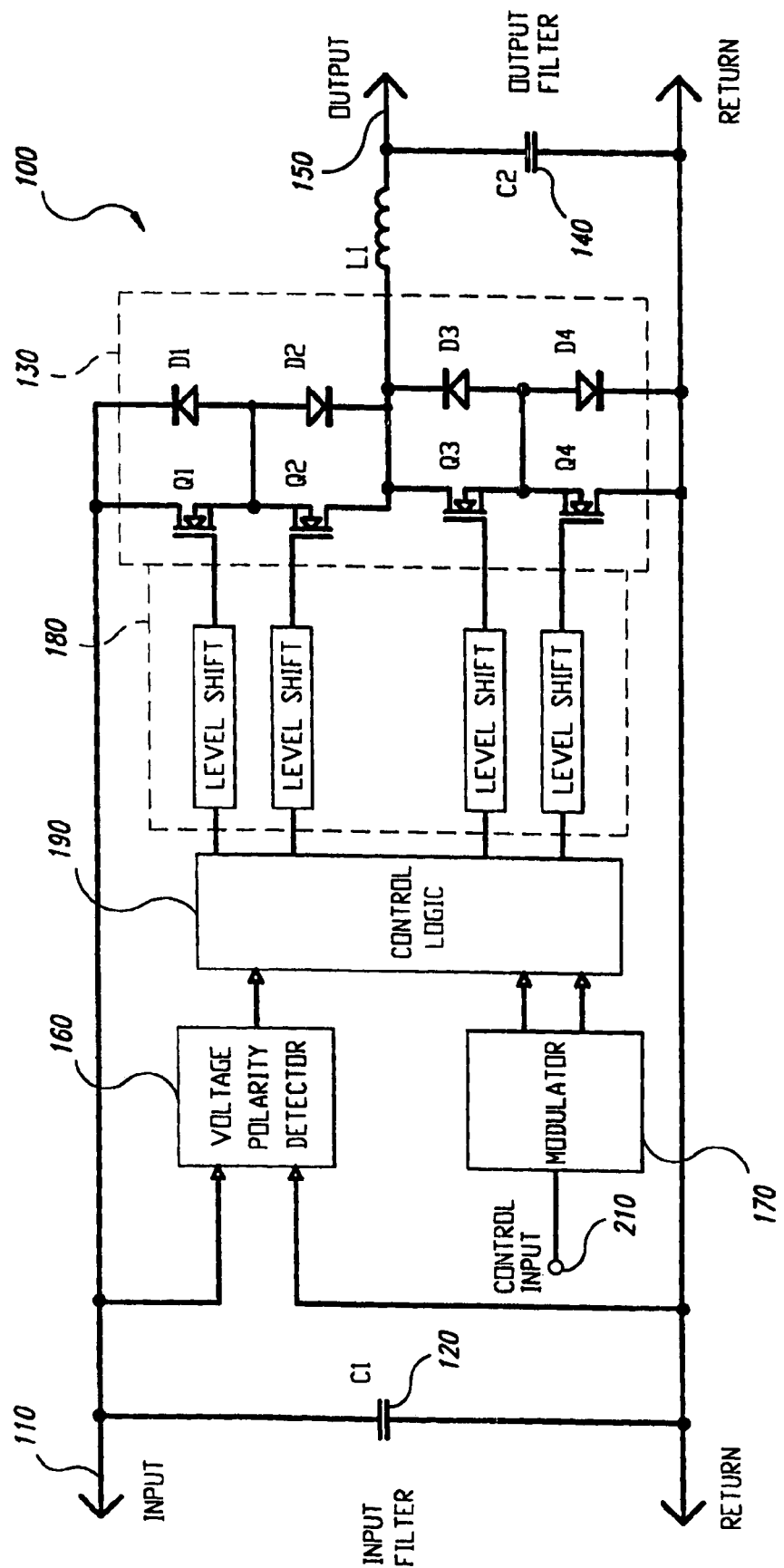
FIG. 30 is a block diagram of a preferred embodiment of a power controller of the invention.

In FIG. 30, an alternate control logic for logic section 190, with additional control input 210 to modulator 170, is implemented as summarized in Table 2.

TABLE 2

| Mode | Voltage | Current | Q1 | Q2 | Q3 | Q4 |
|---|---|---|---|---|---|---|
| Quadrant I | + | + | m d | n | off | on |
| Quadrant II | + | − | ff | on | m d | on |
| Quadrant III | − | − | on | mod | on | off |
| Quadrant IV | − | + | on | off | on | mod |
| Voltage Transition (+ to −, − to +) | 0 | x | on | on | on | on |
| Mode Transition (Quadrants I to II, II to I) | + | x | off | on | off | on |
| Mode Transition (Quadrants III to IV, IV to III) | − | x | on | off | on | off |
| Shutdown | + | x | off | on | off | on |
| Shutdown | − | x | on | off | on | off | where "mod" means modulate (i.e., by means of PWM, pulse frequency modulation, or the like as will be known to those skilled in the art); where "x" means that it doesn't matter what the polarity of the current is; where "Mode" refers to the various operating states that can occur during operation of the power controller; where "Voltages" refers to the input voltage polarity of controller 100 (from the polarity detector 160) and where "0" refers to the voltage transition point; where "Current" refers to the output current polarity from power controller 100; and where Q1, Q2, Q3, and Q4 are the outputs that define the operation of those respective power switches. These switches interface with the control logic section 190 via conventional level shift circuitry 180.

It should be kept in mind that, while a mode transition might look inconsistent with an "x" as a current state, in the various Quadrant modes, current is a desired output resulting from the logic scheme rather than an input to it. In preferred embodiments, converter 100 chooses its quadrant modes based upon input voltage and error circuit output (in modulator 170). Thus, a positive input voltage will determine that either Quadrant I or Quadrant II will be employed, while a negative input voltage will determine that either Quadrant III or Quadrant IV will be employed. The selection of Quadrant I vs. Quadrant II or (Quadrant III vs. Quadrant IV is dependent upon the error circuitry on the other hand. The error circuitry compares output voltage to the reference and determines both the required direction of current flow and the required amount of modulation by way of the error amplitude output to maintain converter output regulation.

Thus, in the practice of the invention in this aspect, current can be in either direction for any particular Quadrant or transition without damaging the converter 100. In operation, the logic scheme summarized above for controlling the power switches drives the output current in the right current direction; the transitions serve only to provide a controlled and nondestructive logic transition between operating modes. It should also be noted that both Mode and Voltage transitions are short term events that last in the range of a few hundred nanoseconds to several microseconds, with typical times on the order of a microsecond.

Quadrant selection in these embodiments can be roughly analogized to changing motor directions in a motor driven watercraft. The motor has both direction (forward and reverse) and magnitude (throttle) control which correspond to quadrant modes and modulation amplitude, respectively. It is clear then that it is not necessary for either the boat, or the converter, to be stopped (zero output current) in order for the boat to change motor directions, or for the converter to transition between modes.

The advantages of the control logic scheme summarized in Table 2 are several:
1. It provides for a truly instantaneous regulator because only one switch is modulated at a time, whereas other schemes use a sequence or a series of switches and the whole sequence or series has to run before a return to a changed switch state.
2. There are no deadtimes. This differs from some disclosed embodiments where deadtimes are applied to prevent simultaneous conduction across power switches. In this scheme there is no opportunity for cross conduction; the switching is virtually instantaneous.
3. Lower switching losses and discontinuous conduction at lower power ranges allows for higher efficiency.
4. No snubbers are required, so there are no snubber losses.
5. It can make use of an "all on" zero crossing.
6. It provides for devices with true four quadrant operation and bi-directional power flow.

Figure 32:
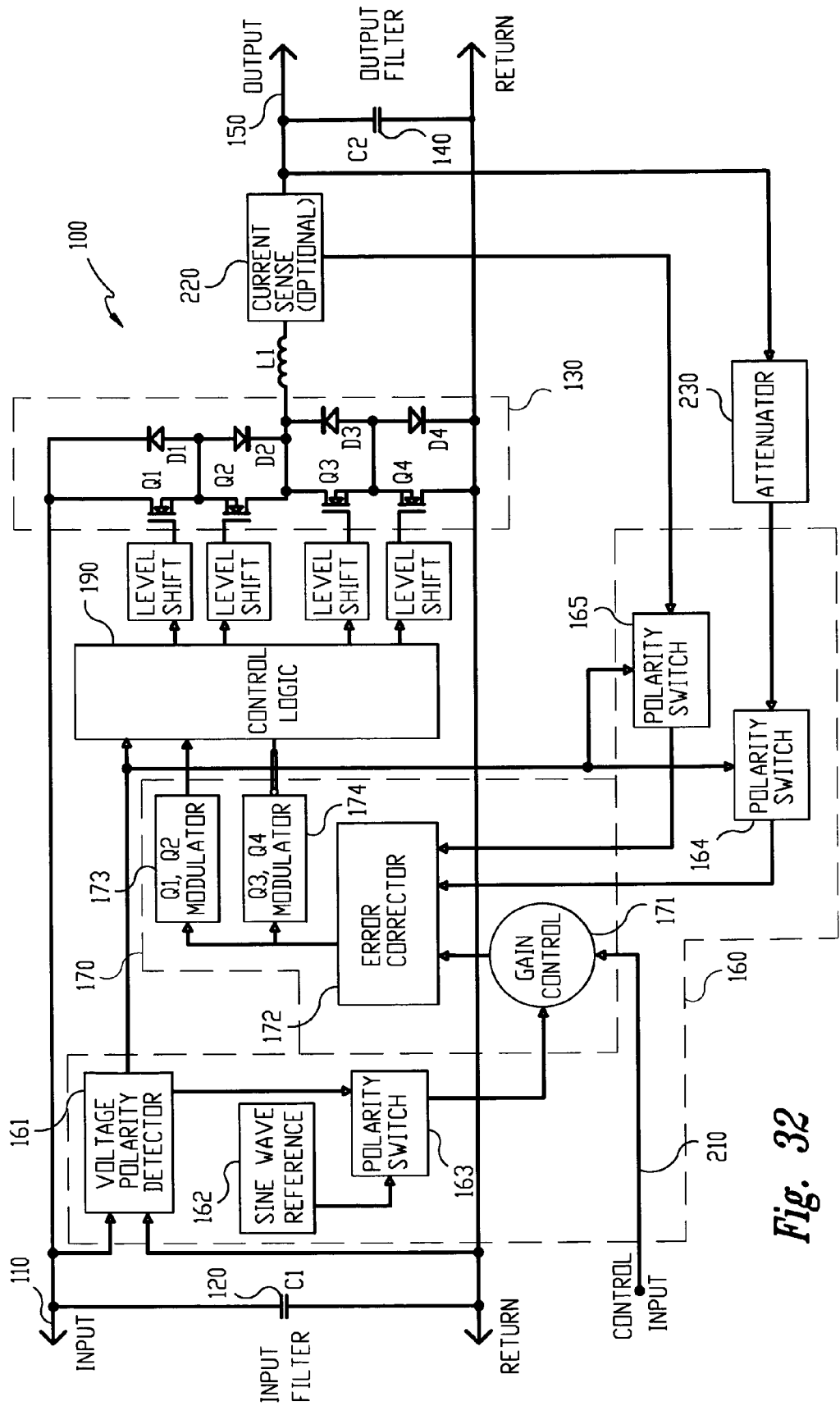
FIG. 32 is an alternate block diagram of a preferred embodiment of a power controller of the invention.

In FIG. 32 a preferred embodiment of the power controller 100 is shown in block diagram form, with particular reference to variation of details of input to the modulator section 170. Sine wave reference 162 feeds polarity switch 163, is in phase with the voltage at input 110, and may be derived from any of a number of known sources. For instance, a sine wave generator, phase locked to the input line, or a microprocessor look up table, could be used. The input voltage itself, attenuated and optionally filtered to eliminate harmonics, could also be employed in some applications. Voltage polarity detector 161 senses polarity (+ or −) of the input voltage at the input of power stage 130. When input voltage is positive, detector 161 outputs a high logic state to all polarity switches 163–165 and to control logic 190. When input voltage is negative, detector 161 outputs a low logic state.

If polarity switches 163–165 receive high logic input, they pass their input directly to their output; if they receive low logic input, they first invert their input signal, then pass it to output. This configuration is preferred over a simple full wave rectification block. In order for the error corrector 172 to properly signal modulators 173 and 174, all references and error signal inputs must be referenced to the polarity of the voltage across the input to power stage 130. Output voltage and current transients and rings could temporarily change polarity, but the error signals must not change polarity state or else error corrector 172 will amplify errors rather than correct them.

Gain control 171 receives input from polarity switch 163 and sine wave reference 162. It is an adjustable attenuator varying the amplitude of the reference signal to error corrector 172. Gain control 171 also receives input from control input 210 which is preferably an external input to determine overall output level, as will be appreciated by those skilled in the art. In a preferred embodiment, it is a digitally controlled attenuator, but in some applications, a simple potentiometer would suffice. Error corrector 172 then compares the attenuated reference signal with the output voltage from output 150 and, optionally, the output current, from optional current sense 220, one or both of which are run through optional attenuator 230 and then through polarity switches 164 and 165, respectively, as described above. Error corrector 172 then outputs a signal to modulators 173 and 174 that will keep power controller 100 output 150 accurately following the reference. In a preferred embodiment, this is accomplished with a single error amplifier, although a microcontroller may also be used advantageously, as will be appreciated by those skilled in the art.

Each of the modulators 173 and 174 receive an input from error corrector 172 and convert it to a digitally modulated output. This is generally in the form of PWM ranging from 0% to 100% at frequencies preferably between 10 KHz and 50 KHz, depending upon the application. Other frequencies and other modulation methods such as pulse frequency modulation (PFM) may be employed as well. In a preferred embodiment, each modulator comprises a triangle waveform generator and a comparator. The triangle waveform itself is fed into the negative input of the comparator and the error corrector output is fed in the positive input of the comparator. The comparator output of each modulator is then fed to control logic 190. Preferably, each modulator has its triangle wave input offset from the other in order to allow a sequential response from the modulators according to the output of error corrector 172. For instance, in a preferred embodiment, triangle waves of 2.5V peak to peak are offset in relative steps of 2.5V as they feed into the modulator comparators. Modulator 173 (for Q1, Q2) then responds to error corrector outputs of 3.5 VDC to 6.0 VDC, while modulator 174 (for Q3, Q4) responds to error corrector outputs of 1.0 VDC to 3.5 VDC. In addition, the output of modulator 174 is preferably inverted. The overall output response of the modulators is therefore in accordance with Table 3 (where "1" is "on", and "0" is "off").

TABLE 3

| Error Corrector Output | Q3, Q4 Modulator Output | Q1, Q2 Modulator Output |
| --- | --- | --- |
| 0.0 V to 1.0 V | 1 | 0 |
| 1.0 V to 3.5 V | MODULATE | 0 |
| 3.6 V to 6.0 V | 0 | MODULATE |
| >6.0 V | 0 | 1 |

Outputs from polarity detector 161 and the modulators are fed into control logic 190, which outputs power transistor drive signals according to Table 2 or 4. Optional current sense 220 senses for overcurrent protection or for output current regulation into a load. It is preferably a current transformer, but may also be via an isolation amplifier, hall effect sensor or other means known to those skilled in the art. Attenuator 230 is preferably a simple resistive divider.

Where the power converter of the invention drives only nonreactive loads (i.e., in Quadrants I and III only), a simplified logic scheme may optimally be employed, as summarized in Table 4.

TABLE 4

| Mode | Voltage | Current | Q1 | Q2 | Q3 | Q4 |
|---|---|---|---|---|---|---|
| Quadrant I | + | + | mod | on | off | on |
| Quadrant III | − | − | on | mod | on | off |
| Voltage Transition (+ to −, − to +) | 0 | x | on | on | on | on |

Figure 33:
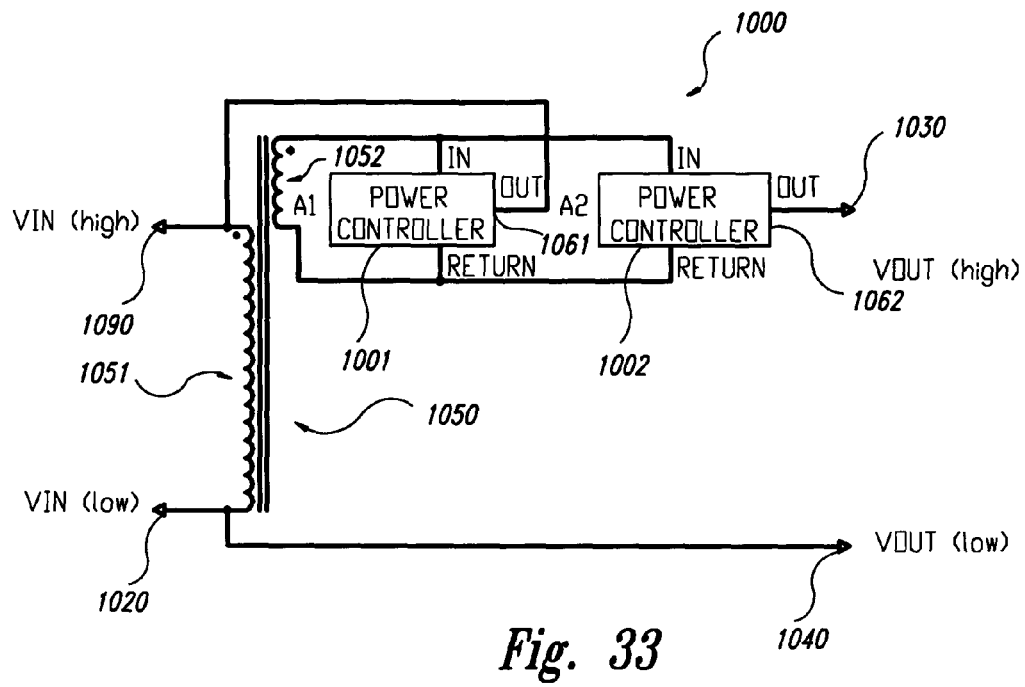
FIG. 33 is a partial schematic and block diagram of a preferred embodiment of a high voltage power controller of the invention.

FIG. 33 illustrates a high voltage regulator 1000 embodiment of the invention comprised of two power converters 1001 and 1002 of the invention and a transformer 1050. An input voltage from an AC source is connected to VIN (high) 1090 and VIN (low) 1020. VIN (high) 1090 and VIN (low) 1020 connect to primary winding 1051 of transformer 1050, and VIN (high) 1090 also connects to output 1061 of controller 1001. Output 1062 of controller 1002 is connected to VOUT (high) 1030, while VIN (low) 1020 is connected directly to VOUT (low) 1040.

Both controllers have as their voltage source secondary winding 1052 and each controller is controlled independently so that the difference in output voltages of the two controllers is algebraically added to input voltage at VIN (high) 1090. For example, if the input voltage is 10,000 VAC and the secondary winding is 500 VAC, which is within the operating range of the invention controller, both controllers are controlled to remain at zero output voltage when no regulation is needed, since the difference between the two controller outputs is thus zero, and the input voltage passes to the output at VOUT (high) 1030 unmodified. It will be appreciated that the difference is also zero if both controllers are modulated to some identical, but non-zero, voltage, except that that would not be as efficient a usage of power in the controllers themselves. If controller 1002 is modulated to increase its output voltage with respect to its return, and if controller 1001 is controlled to produce zero output voltage, then an AC voltage equal to the difference in output voltages of the two controllers is added to VIN (high 1090 and sent to VOUT (high) 1030. This output addition is typically adjustable from 0 VAC to 500 VAC.

Then to achieve a like continuously adjustable subtraction of voltage from VIN (high) 1090, controllers 1001 and 1002 are modulated inversely from that outlined above, so that 1001 has increased output while 1002 remains at zero. In this manner, for the given example, voltage may be continuously varied from about 9600 VAC to 10,500 VAC (10 KVAC−500 VAC to 10 KVAC+500 VAC), for a total high voltage regulation range of +/−5%.

Figure 34:
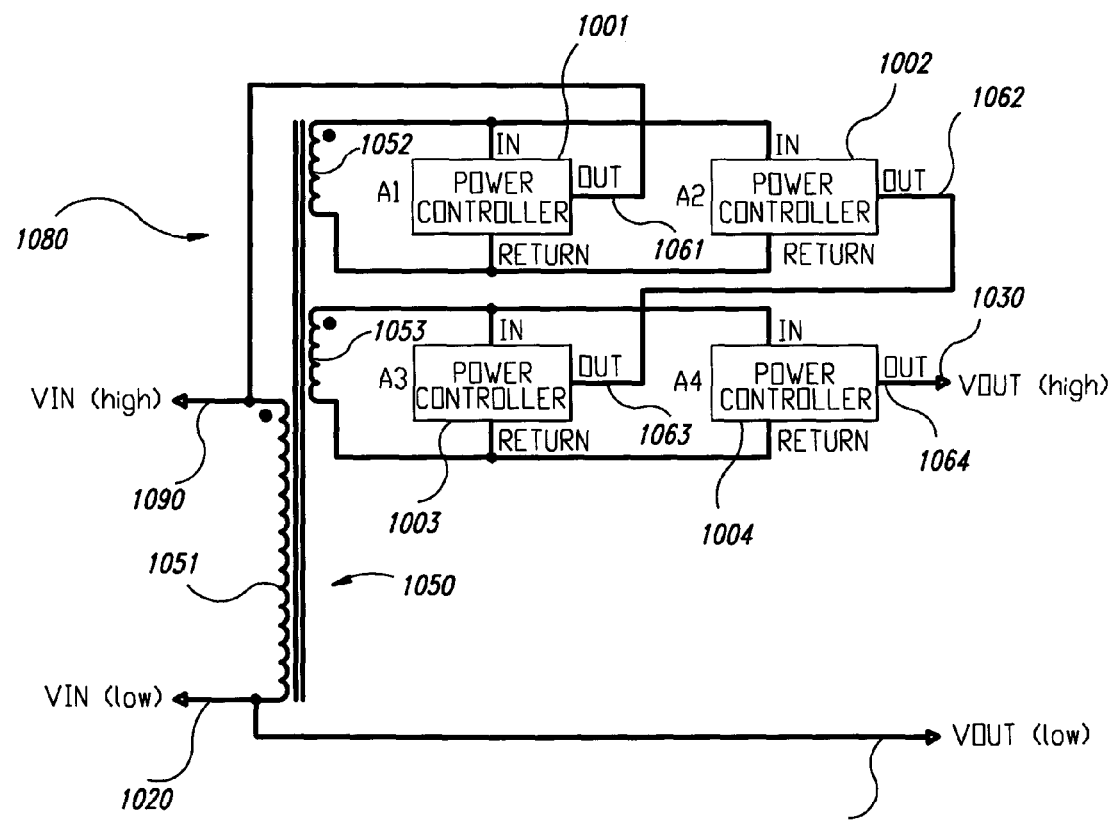
FIG. 34 is an alternate partial schematic and block diagram of a preferred embodiment of a high voltage power controller of the invention.

In FIG. 34 an extended range high voltage AC regulator 1080 is illustrated. Extended range (for instance over that associated with the embodiment in FIG. 33) is achieved by adding another secondary winding 1053 and another pair of power controllers 1003 and 1004. The two pairs of controllers illustrated are connected as shown in series with each other (output 1062 connected to output 1063), and the outputs of each pair are thus simply added to each other and to VIN (high) 1090. The number of controller pairs employed in this fashion may also be increased to achieve any particular desired regulation range (in the example above, thus adding 500 VAC of range per pair). Optional conventional fail sense circuitry may be employed in such multiple pair embodiments to insure that operable pairs continue to provide maximum range leaving off only the failed pair(s).

Figure 35:
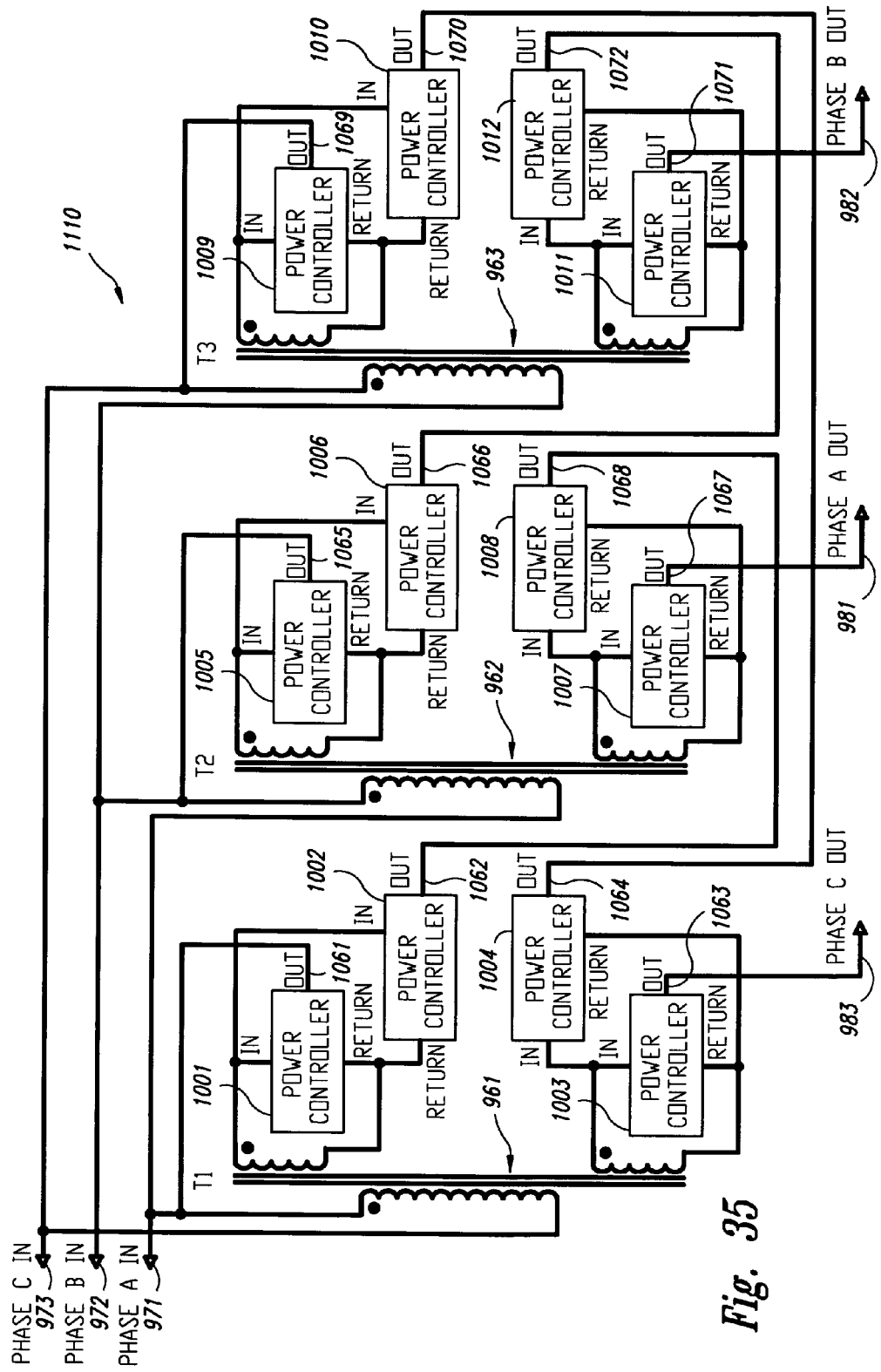
FIG. 35 is a partial schematic and block diagram of a preferred three phase delta high voltage power conditioner of the invention.

FIG. 35 illustrates a three phase delta high voltage conditioner 1110 embodiment corresponding to the single phase embodiment of FIG. 34. Three transformers 961, 962, 963 have their respective primaries connected to the respective phase input voltages 971, 972, 973. These are shown as three separate transformers, although a single conventional three phase transformer may also be employed. Each transformer primary has two associated secondary windings for the purpose of adding or subtracting voltage from the input voltage as previous described for FIGS. 33 and 34.

As it is typically desirable to keep the output of such a system in phase with the input, especially when employing the circuit in utility applications, each phase is modified by two power controller pairs. For example, to regulate phase A, it is fed through controllers 1001 and 1002 (delta phase C-A) and controllers 1007 and 1008 (delta phase A-B) to phase A output 981. In like manner, phase B is fed through controllers 1005 and 1006 (delta phase A-B and controllers 1011 and 1012 (delta phase B-C) to phase B output 982, and phase C is fed through controllers 1009 and 1010 (delta phase B-C) and controllers 1003 and 1004 (delta phase C-A) to phase C output 983. Compare this embodiment to the other three phase delta power controller of FIG. 31.

FIG. 9 illustrates an alternate embodiment of the power converter of the invention. It is particularly well adapted for higher power (100A and up) applications. It is in most respects the same as that shown in FIG. 5, except for the arrangement of switches Q1–Q4, and a different switch diode arrangement. Q1–Q4 are independently controlled as before (logical control direct to the gate of each switch, no two gates tied together or receiving control from the same logical controller element), but the switch sources of respective switch pairs (i.e. Q1–Q2) are not directly tied together, as they are in the embodiment in FIG. 5. Diodes D1–D4 are also differently placed, rather than simply connected across source and drain of their respective switches. Additional diodes D5–D8 are relatively small and inexpensive, and added to the design to help bypass the switches as they (diodes D1–D4) turn off but are not necessary when MOSFET switches are used (instead of the preferred IGBT's).

In a power factor correction application, the converter circuit of the invention can interface between the power line and a PFC capacitor, and/or reactor. If the power factor, or the phase delay, on the line is measured, and then fed into an appropriate error amplifier, of such design as sill be readily available to those skilled in the art, then the power controller with its control circuitry will automatically correct power factor on the line, even approaching unity PF, and with response time on the order of 0.1 seconds.

Figure 10:
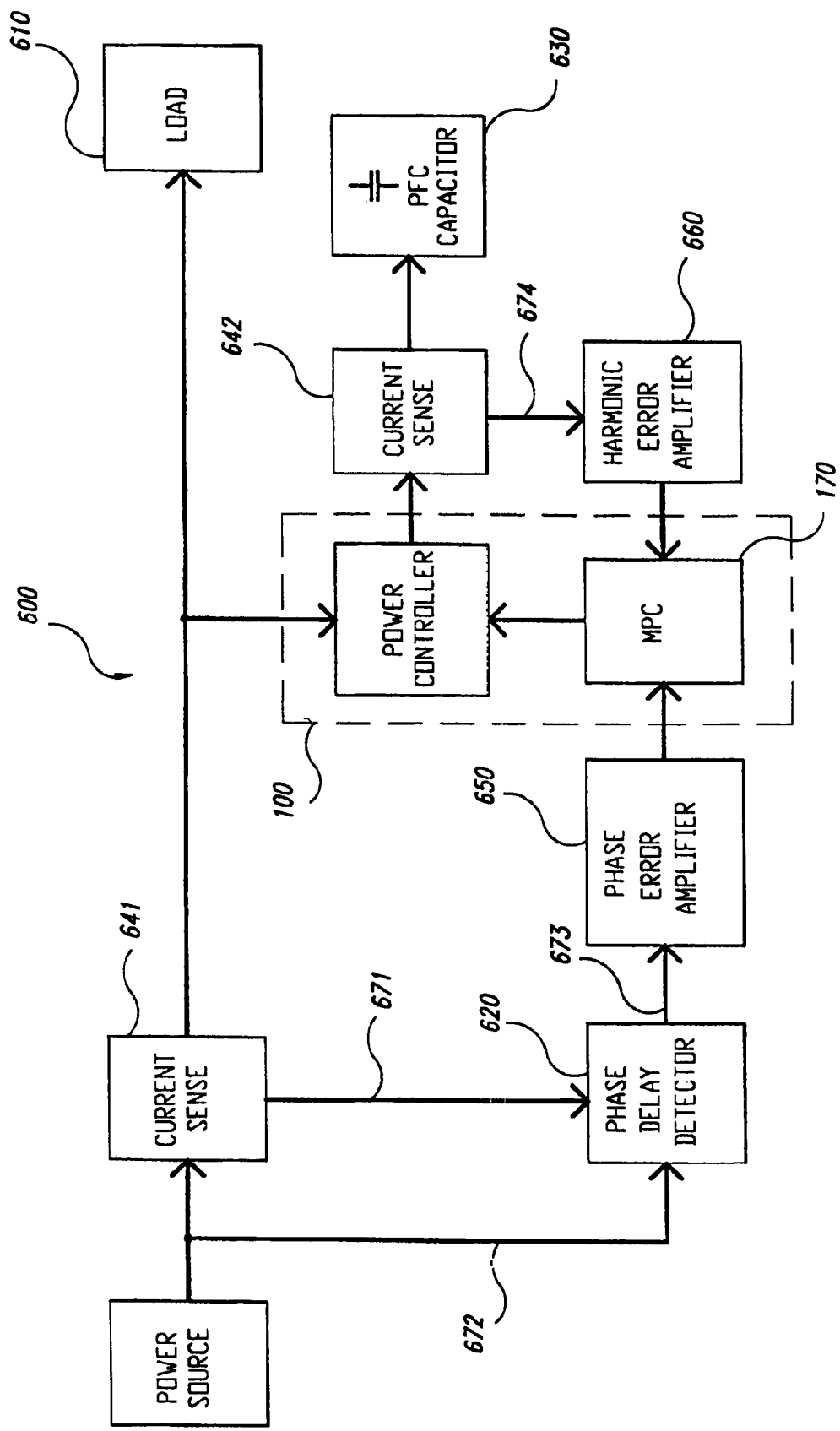
FIG. 10 is a block diagram of an autovariable power factor corrector.

FIG. 10 shows such an automatic variable power factor corrector 600, having a power controller 100 and power factor correction capacitor(s) 630 and control circuitry. This topology is well adapted for correcting lagging power factor due to use of motors and transformers on the line.

Operation of automatic power factor corrector 600 is based upon the addition of a variable leading load in parallel with the lagging load to be corrected. The two loads will cancel each other out, achieving a unity power factor. This is accomplished by varying controller 100 output into PFC capacitor(s) 630, so that the varying output voltage in turn varies output current into capacitor 630, so that a variable capacitive load is reflected back into the power line. Automatic correction is achieved by adding a current sensor 641 in series with the load. A current sense signal 671 from current sensor 641 is compared with a voltage signal 672 to detect phase delay (and thus power factor) in phase delay detector 620. A phase error amplifier 660 receives this phase delay information 673 and adjusts power controller 100 through its modulator 170 to vary reflected capacitance, and thus minimize phase delay (bringing PF toward unity). This loop preferably has a bandwidth of 20 Hz or less. (Power controller 100 is shown as a dotted block with its modulator 170 drawn as though separate to emphasize its function in this illustration.)

PFC capacitors can resonate with other elements in the power system. To limit or eliminate this possibility, an optional additional current sensor 642 is placed between controller 100 output and PFC capacitor 630, in series. Within current sensor 642, the fundamental line frequency is filtered out, as will be appreciated by those skilled in the art, to leave only harmonic currents information. Current sense signal 674 containing this harmonic information is then sent to a fast error amplifier 660 (several KHz bandwidth) which in turn adjusts modulator 170 of power controller 100 to keep the capacitor current sinusoidal (non-harmonic). Thus power controller 100 responds to slow signals from power factor error amplifier 650, and fast signals from harmonic error amplifier 660. The result is an automatic power factor corrector 600 with continuous variability and which does not tend to resonate with other elements in a power distribution system.

Figure 11:
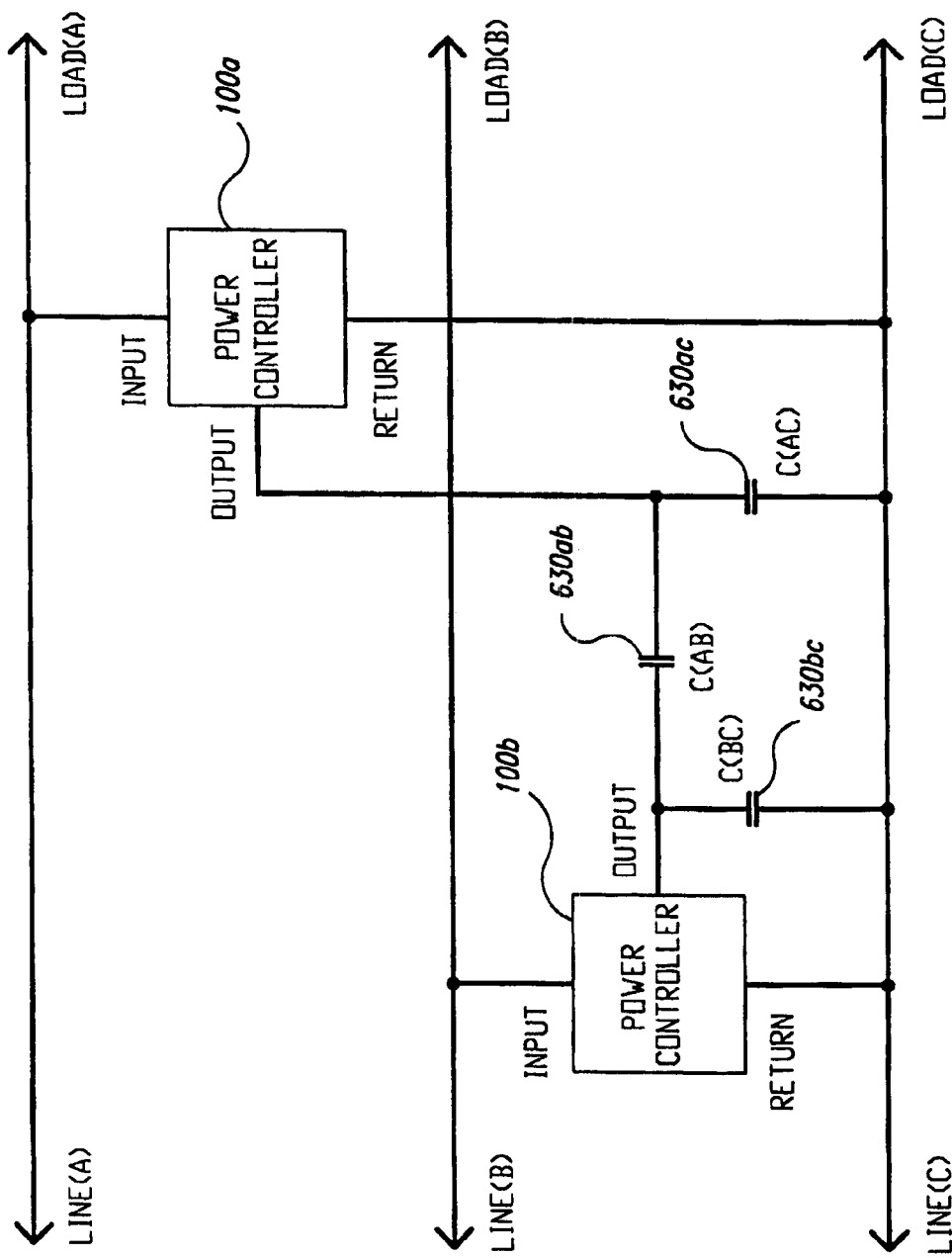
FIG. 11 is a schematic and partial block diagram of a three phase power factor controller of the invention.

The disclosed PFC method and apparatus can also be configured for three phase PFC for effecting balanced loads by employing two power controller units 100a and 100b, and three PFC capacitors 630ab, 630ac and 630bc as shown in FIG. 11. In this embodiment, power controller 100a is preferably in parallel between a first AC line (A) and a third AC line (C), and power controller 100b is in parallel between a second AC line (B) and the third AC line. Capacitor 630ac is preferably connected between the output of controller 100a and AC line (C), capacitor 630bc is connected between the output of controller 100b and AC line (C), and capacitor 630ab is connected between the output of controller 100a and the output of controller 10b.

Figure 12:
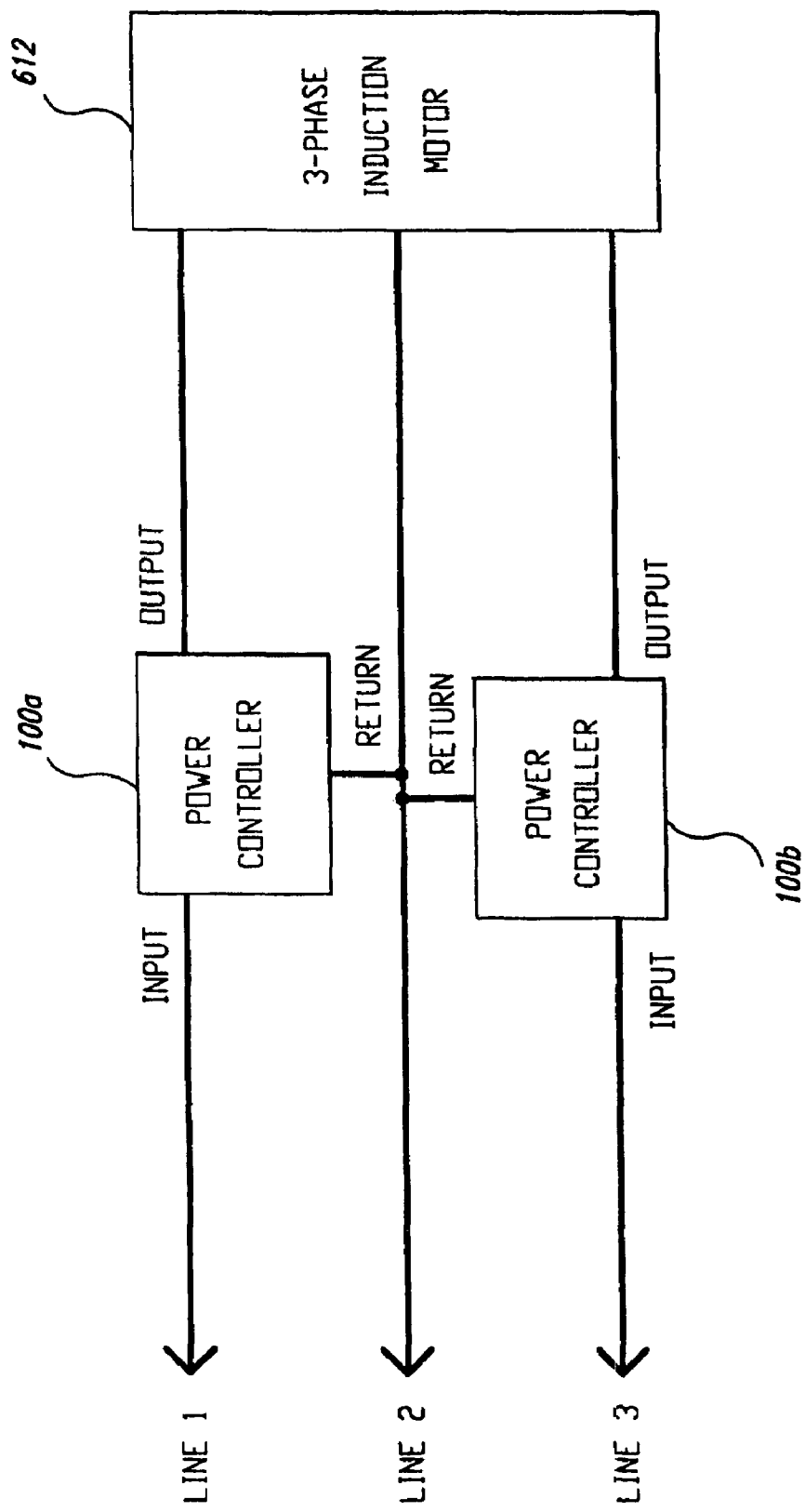
FIG. 12 is a schematic and partial block diagram of an alternate method of power factor correction with soft start current limits.
Figure 13:
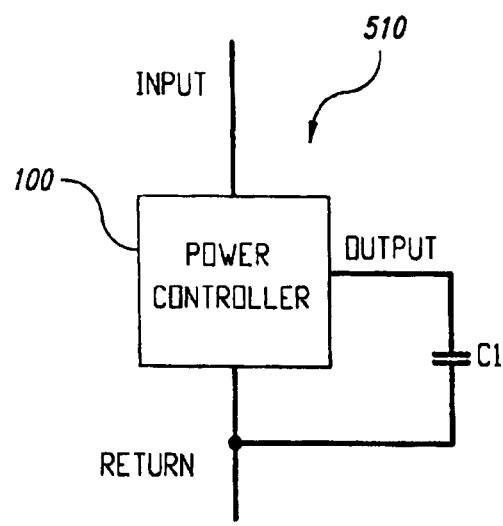
FIG. 13 is a schematic and partial block diagram of an adjustable capacitor of the invention.
Figure 14:
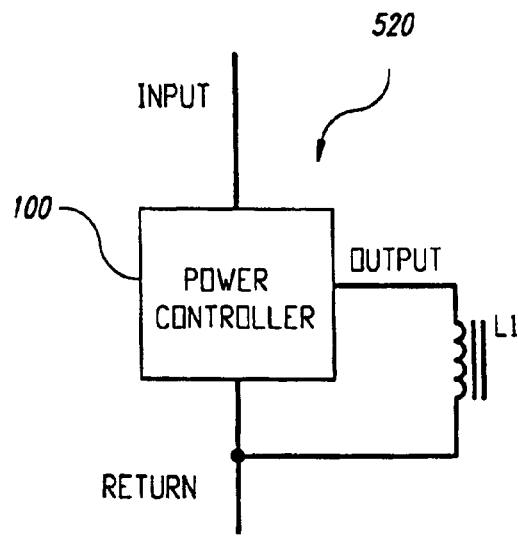
FIG. 14 is a schematic and partial block diagram of an adjustable inductor of the invention.
Figure 15:
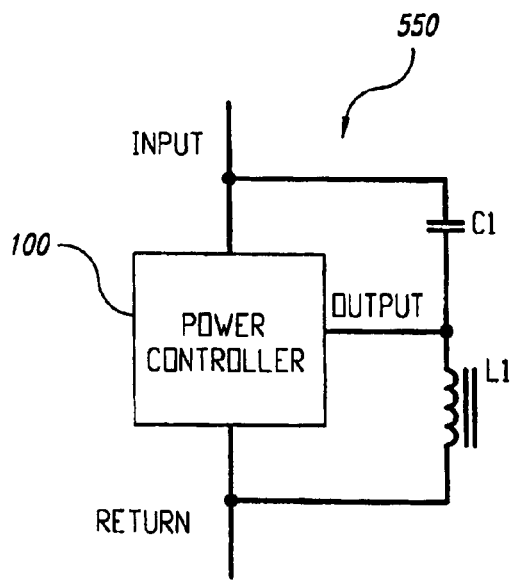
FIG. 15 is a schematic and partial block diagram of an adjustable harmonic rejecter of the invention.

FIG. 12 shows a configuration for controlling three phase induction motor 612, as an alternate PFC correction method accomplished by lowering the motor terminal voltage via controllers 100a, 100b when motor 612 in not operating at full load. Power controller 100a is in series in line 1, and power controller 100b is in series in line 3. Both controllers return to line 2. Independent modulation and control of controllers 100a, 100b results in optimal power conversion and control for induction motor 612, while also optimizing power quality on the three phase line system. The power controller 100 of the invention is also well adapted to be used in combination with simple componentry to fashion fully (and optionally automatically) adjustable components, such as capacitors, inductors, resistors, and the like, for example as shown in FIGS. 13, 14, and 15.

Figure 31:
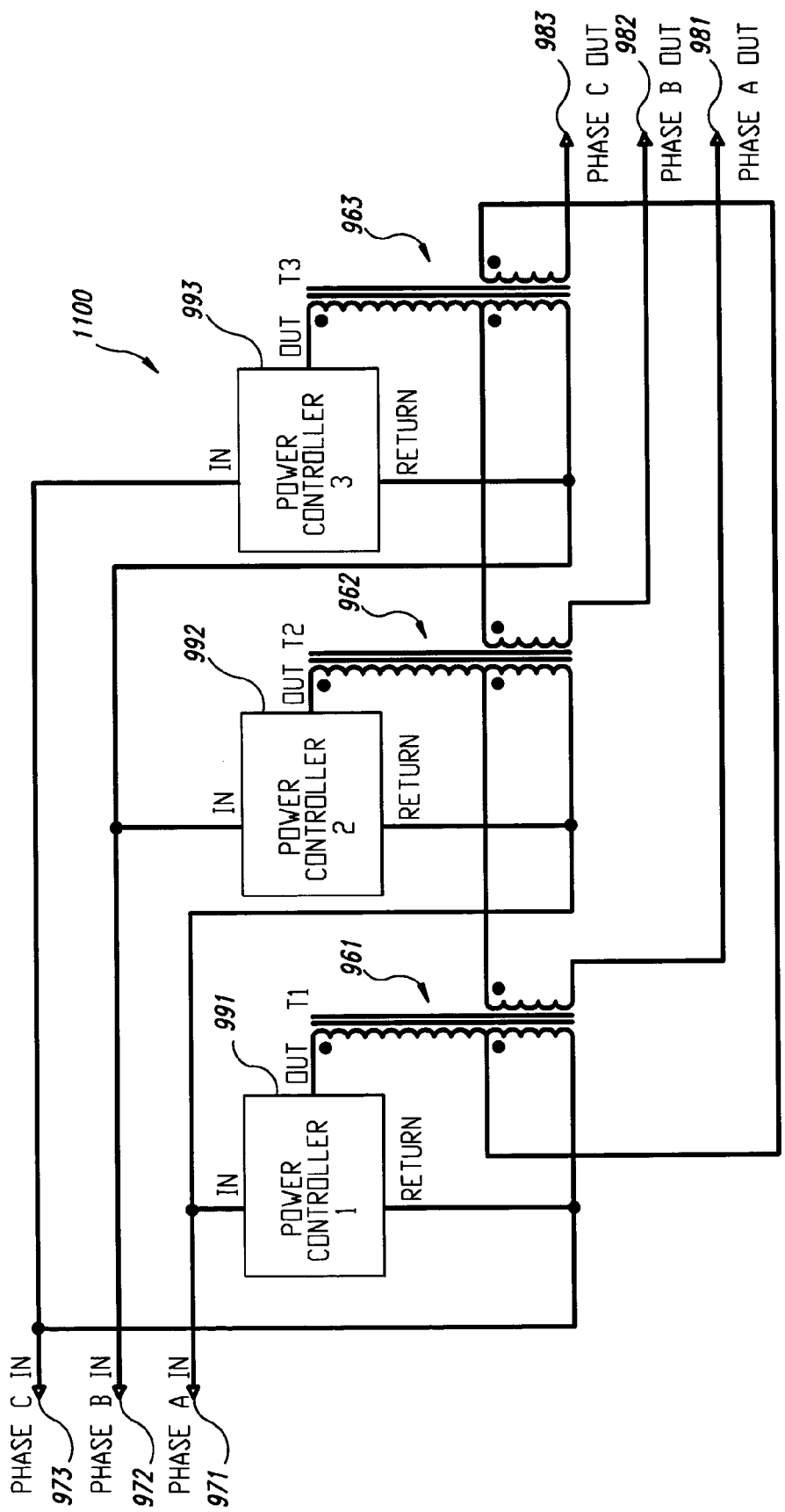
FIG. 31 is a partial schematic and block diagram of a preferred three phase delta power conditioner of the invention.

In FIG. 31, a three phase delta power conditioner is shown in block diagram form. It is a combination of three power controllers of the invention and three transformers, which together implement a circuit for controlling the output voltage of a delta wired three phase input. Each power controller is connected between two different phases and each controller (livers a transformer which modifies the voltage on two different phases. Put differently, each phase is acted upon by two different converter/transformer combinations.

As an illustrative example, regard phase A IN 971 in FIG. 31. Power controller 992 is connected between phase B and phase A and drives transformer 962. Power controller 991 is connected between phase A and phase C and drives transformer 961. The primary return of transformer 962 is connected to phase A IN 971, and the autotransformed tap of transformer 962 is in turn fed to the floating winding of transformer 961. The output of the floating winding of transformer 961 is then fed to the output as phase A OUT 981.

Now under normal operating conditions, all controller outputs start at zero output voltage. In this mode, phase A passes through transformer 962 and transformer 961 unmodified. However, as power controller 991 and power controller 992 increase their output, phase A begins to be modified. Increasing output voltage from power controller 992 through transformer 962 moves the output tap of transformer 962 closer to phase B. Similarly, an equal increase in the output voltage from power controller 991 through transformer 961 moves phase A OUT 981 an equal distance toward phase C. The result of these two vectors is that phase A OUT 981 is reduced in amplitude but remains in phase with phase A IN 921.

A like effect upon phase B and phase C will be appreciated, so that the overall effect is an adjustable delta voltage source, concentric with the input voltage, and in phase with it. If the controllers are independently adjusted, then input phase angle irregularities may also be compensated for, which reduces voltage imbalance losses in three phase motors and transformers.

For operation from no output voltage to full output voltage, the turns ratio of each transformer primary to its autotransformed tap and floating winding is 3:1:1. Numbers higher than this (such as 6:1:1) will result in a smaller range of voltage adjustability while reducing the required output current from each power controller.

In an alternate embodiment, each of the three power controllers is connected to a different input phase and provides an output that is between 0% and 100% of the input voltage (i.e., between IN and RETURN). Each output drives the primary of its own transformer, where each such transformer has an autotransformed tap that is fed into the auxiliary winding of the transformer that is connected to the adjacent phase. The output of that auxiliary winding is then the conditioned output of the phase for that transformer.

For the full range output from 0V to the full input voltage, the turns ratio of the transformer is:

$$N(\text{primary}) = 3N(\text{tap}) = 3N(\text{auxiliary})$$

where N(primary) is the number of total turns from the output of the power controller to its return, and it includes the turns in the tapped winding.

Operation over different ranges is possible by varying the transformer turns ratio, as long as the tap and auxiliary windings all have the same number of turns. It will be appreciated therefore that output voltage is at a maximum (approaching the input voltage) when all power controllers are at minimum output voltage. Conversely, output voltage is at a minimum when all power controllers are at maximum output voltage.

Generally speaking, it will be preferred to operate all three power controllers at equal output voltages; however, since they may all three be individually controlled, the conditioner can be used to compensate for voltage imbalance on the input.

FIG. 13 shows adjustable capacitor 510. Power controller 100 variably reflects the capacitance of capacitor C1 back onto the input and return connections. The reflected capacitance value ranges between 0 and the full rated value of C1. Typical applications would be adjustable power line filters with variable frequency and amplitude characteristics, and adjustable components of harmonic current traps and rejecters. See discussion infra of FIGS. 24 and 25.

FIG. 14 shows adjustable inductor 520 whose reflected inductance can be varied, via controller 100, between the full rated value of L1 and (theoretically) infinity. Its applications are as complementary components to the variable capacitor in its applications as disclosed above. It should be noted that for a duty cycle D and a full rated inductance L, reflected inductance is given by the formula:

$$L_{refl} = L/D^2$$

Figure 16:
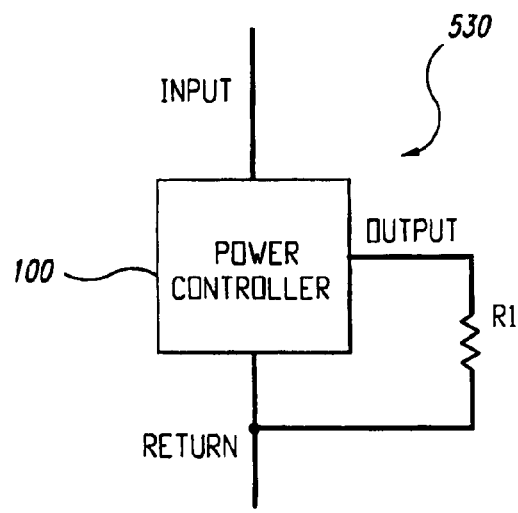
FIG. 16 is a schematic and partial block diagram of an adjustable resistor of the invention.

FIG. 16 shows variable resistor 630 with a resistance value adjustable, via controller 100, between R1 and (theoretically) inanity. This topology would have applications including motor controls, a variable damping element in power line filters, and variable AC/DC power loads for testing electrical equipment (transformers, generators, AC power supplies, inverters, power distribution systems, and the like).

FIG. 15 shows adjustable harmonic rejector (shunt filter) 550 with controller 100. Inductor L1 is connected between the output of controller 100 and the return, while capacitor C1 is connected between output and input of controller 100. As controller 100 duty cycle is increased, both reflected capacitance and inductance decrease. The result is a parallel LC filter with resonance (or "notch") that is tunable over a wide frequency range. This would have application in power line harmonic voltage and current reduction. For instance, the unit could be installed in series with the power line and its resonance adjusted to reject a desired harmonic. In response to changes of load on the system, it may be suitably readjusted, either manually or automatically, for optimum performance.

Figure 17:
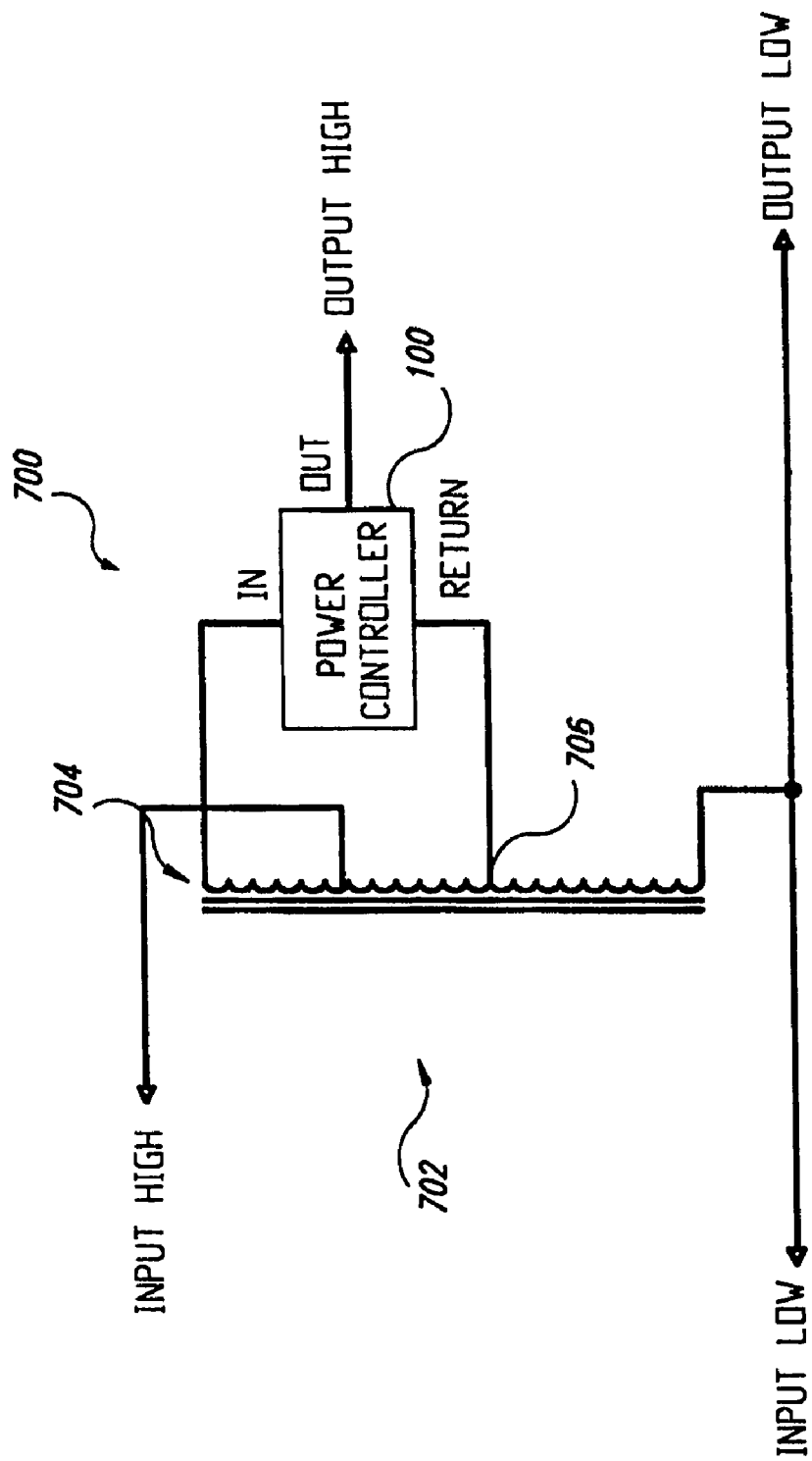
FIG. 17 is a schematic and partial block diagram of an AC power conditioner of the invention.

FIG. 17 shows AC power conditioner 700 for regulating output voltage over a limited range. This configuration allows use of a lower voltage power controller than one otherwise required for operation over a larger voltage range.

Input voltage is fed to autotransformer 702 having two output taps 704, 706. Lower tap 706 is configured to be the lowest desired voltage step down, while higher tap 704 is set for the highest desired voltage step up. Power controller 100 is connected between these two taps and thus vanes the output voltage from one tap to the other in continuously variable increments. Conditioner/converter 700 may thus be used either as a constant output voltage regulator for input voltages that vary, or as a device for providing varying output voltages from a constant input voltage.

Using this configuration, if an output variation range of +/−20% is desired, then power controller 100 itself need only withstand 40% of the input voltage. This allows available semiconductors to regulate much higher output voltages than if the controller 100 were operating without autotransformer 702. In lower voltage circuits (such as 120 VAC), it allows inexpensive low voltage semiconductors (<100 VDC) to be used, giving significant cost advantages over other line conditioning methods.

Figure 18:
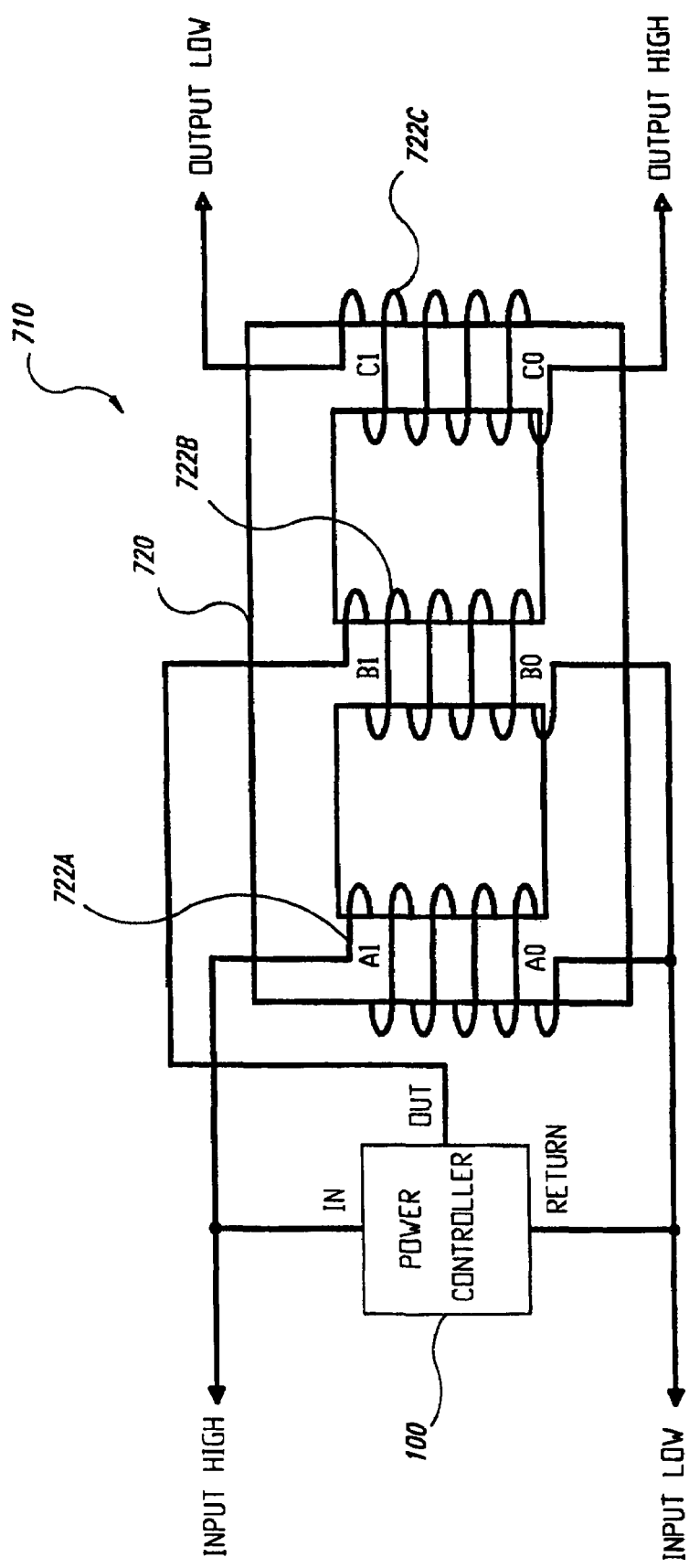
FIG. 18 is a schematic and partial block diagram of an isolated output AC power conditioner of the invention.

FIG. 18 shows isolated output AC power conditioner 710 having power controller 100 and three part coupled magnetic structure 720. This topology provides isolated variable output voltage lover a limited output range while also providing galvanic isolation from input to output.

Magnetic structure 720 comprises three core sections which are coupled at each end. Each section has associated winding 722A, 722B, and 722C respectively, each winding having a number of turns $N_A$, $N_B$, and $N_C$ respectively. For operation within the saturation limits of the core, voltages V may be applied to the windings according to the following formula:

$$V_A/N_A + V_B/N_B + V_C/N_C = 0$$

while the corresponding formula for current is:

$$I_A N_A = I_B N_B = I_C N_C$$

In this isolated output AC power conditioner, input voltage is applied directly across winding 722A. Power controller 100 receives the same input voltage and applies a variable voltage across winding 722B with the number of turns $N_B$ corresponding to the maximum amount of output voltage regulation range desired. The voltage delivered from the output winding 722C can be described therefore by the following formula:

$$V_{out}/N_C = -V_{in}/N_A - V_{controller}/N_B$$

With this topology, $N_B$ can be much greater than $N_A$ as the output regulation range is reduced. Thus power controller 100 output current is reduced for a given total conditioner 710 output current (and power), and line regulation over the desired range is accomplished with a relatively smaller power regulator 100. Costs are thus reduced, efficiency is increased, and larger amounts of power may be regulated than by merely cascading a power controller with a standard isolation transformer. Applications for this topology are anticipated in line voltage regulation, data processing, telecommunications, and medical equipment.

Figure 19:
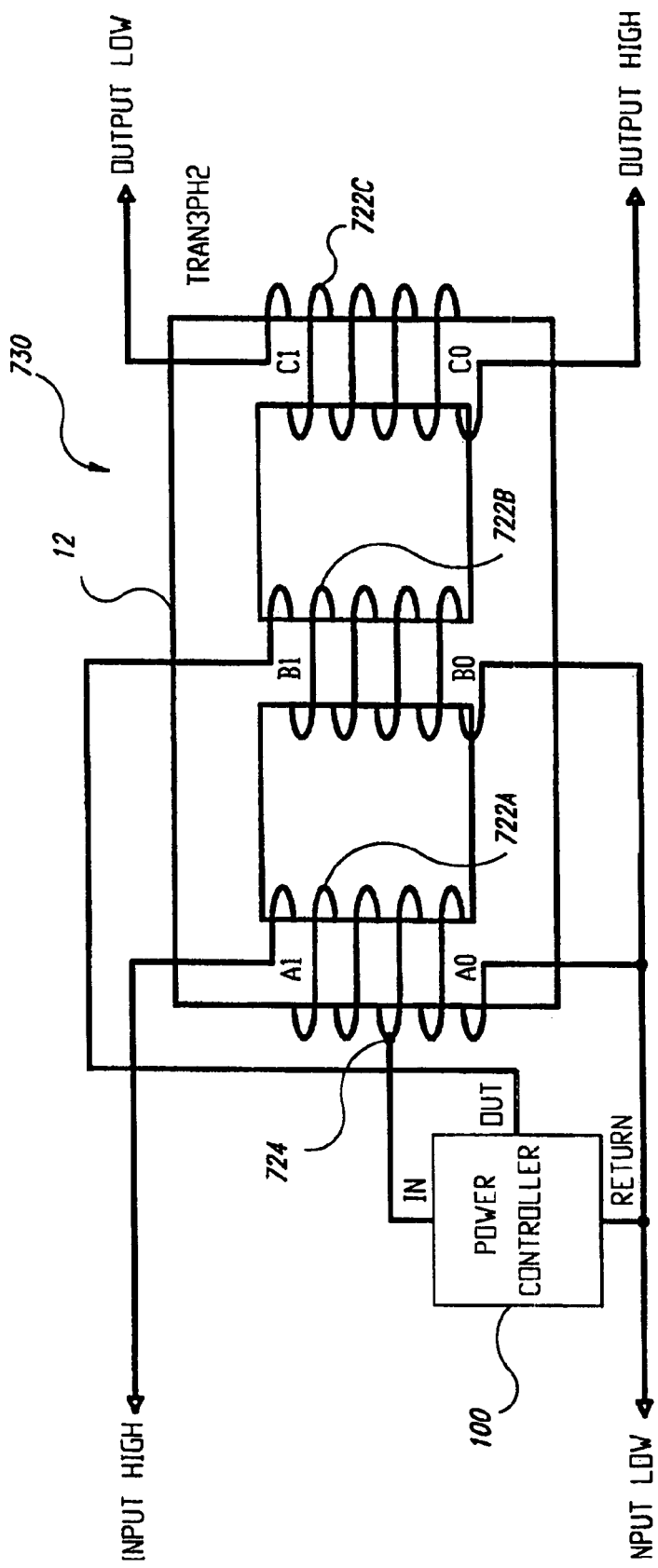
FIG. 19 is a schematic and partial block diagram of a high voltage input AC power conditioner of the invention.

FIG. 19 shows high voltage input AC power conditioner 730. The circuitry is substantially the same as for FIG. 18 above, except that power controller 100 is operated from a voltage that is lower than the input voltage. Winding 722A has tap 724 in it, creating in effect a step down autotransformer for use by controller 100. The tap voltage is selected according to the voltage input limitations of power controller 100. All other specification and operation is the same as above.

This topology can regulate voltages far beyond what could be done with conventional power semiconductors employed in direct regulation. As an example, the input voltage can be as much as 13,200V, and yet regulation can be accomplished using nothing more than standard semiconductors (having ratings such as 1200V or 1700V). Applications are envisioned in regulated distribution transformers such as those dropping distribution voltages down to 120/240 VAC for residential and commercial customers.

Figure 20:
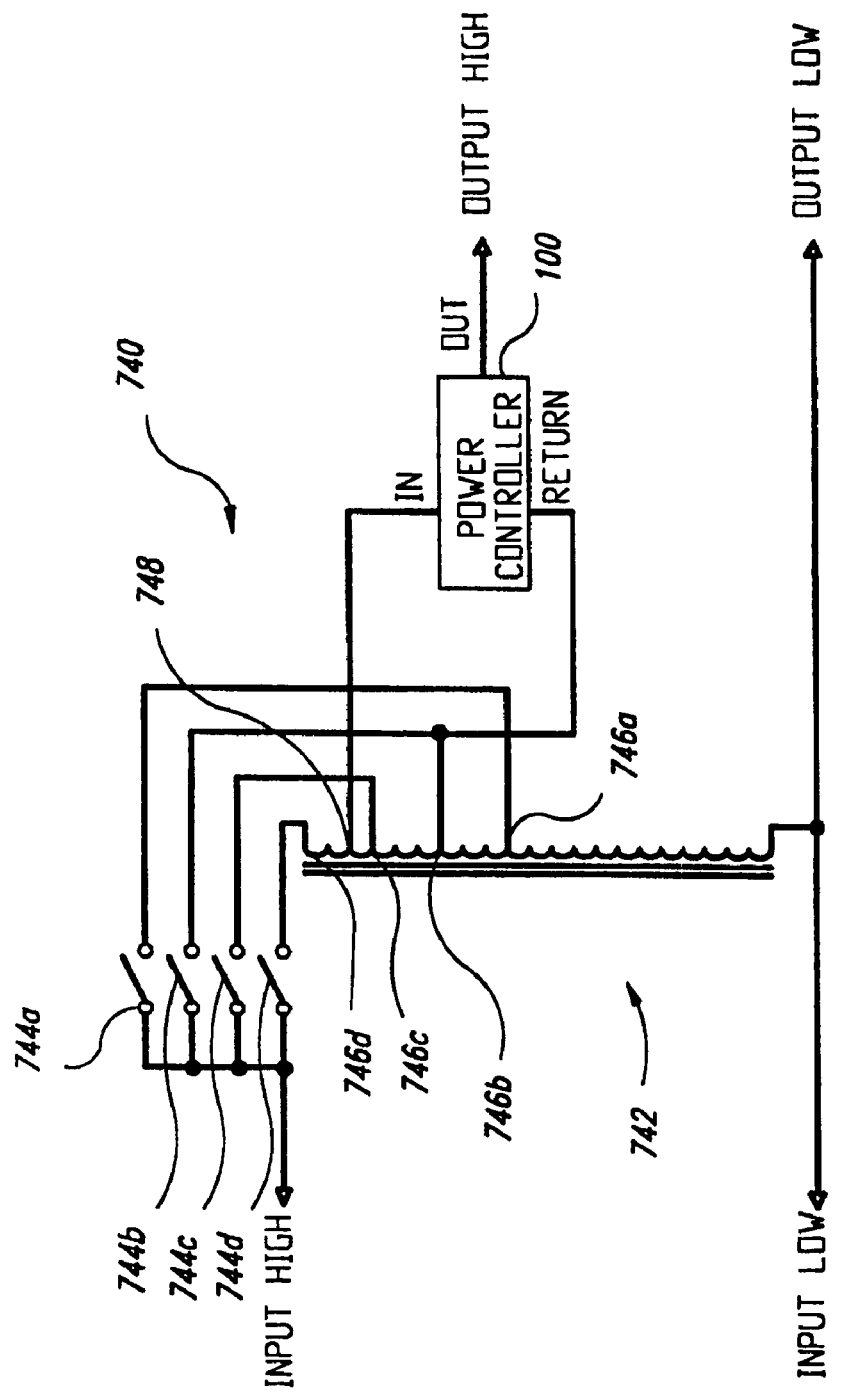
FIG. 20 is a schematic and partial block diagram of an AC hybrid power conditioner of the invention.

FIG. 20 shows AC hybrid power conditioner 740, similar to AC power conditioner 700 disclosed above, except that it is capable of connecting different taps 746a–d in autotransformer 742 to the input voltage. Output regulation is generally accomplished in two steps. The first step comprises selecting and connecting an appropriate tap 746a, b, c, or d on autotransformer 742 to the input voltage. The tap is selected so that the input 748 of power controller 100 is higher than the desired output voltage and the return of power controller 100 is lower than the desired output voltage. Connection is preferably accomplished using thyristor switches 746a–d, and in a manner similar to connection in conventional tap switching line conditioners.

The second step consists of modulating controller 100 to provide an adjustable output voltage that can be varied continuously between its input and return voltages. By combining these steps, precise regulation of output voltages is possible over a wide range of input voltages. This circuit topology allows controller 100 to operate over a smaller voltage range so that lower voltage power controller components may be employed for a given output voltage. At the same time, continuous output adjustability is maintained, providing superior regulating capability over conventional power conditioners.

Figure 21:
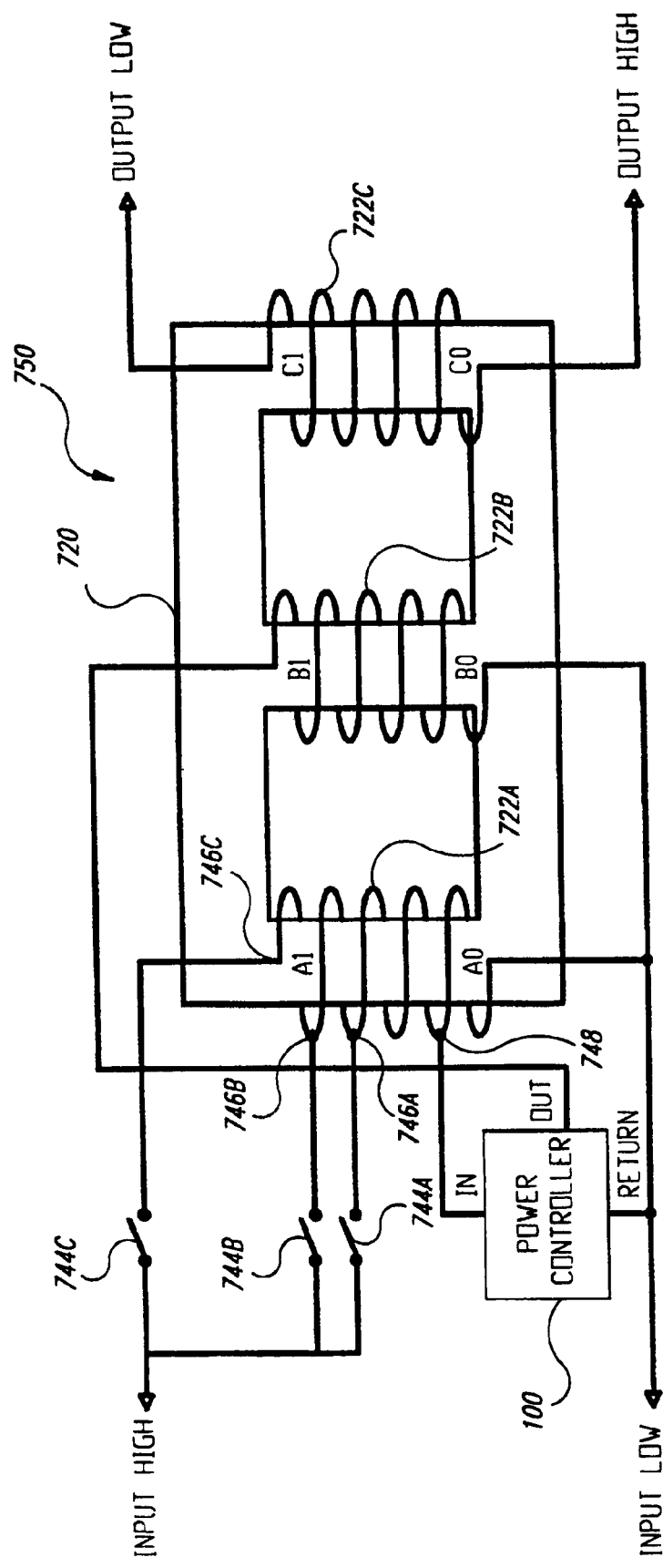
FIG. 21 is a schematic and partial block diagram of a hybrid isolated AC power conditioner of the invention.

FIG. 21 shows hybrid isolated AC power conditioner 750, similar to high voltage input AC power conditioner 730 disclosed above, particularly in that it uses a three part magnetic structure 720 and power controller 100, but it adds tap selecting capability to the winding 722A. Tap connection is preferably accomplished using thyristor switches 744a–c to connect the proper tap 746a–c of winding 722A to the input voltage. This tap selection allows a coarse adjustment of the output voltage in one or more discreet steps. Fine adjustment is achieved by varying the voltage on winding 722B by varying the output of power controller 100.

With tap selecting capability in this embodiment of the invention, power controller 100 is only required to regulate over a much smaller range than otherwise practical or useful and the amount of power delivered by controller 100 to the transformer is decreased. This allows either a decrease in the size of the power controller, or an increase in the output capability of the conditioner system for a given size power controller.

Figure 22:
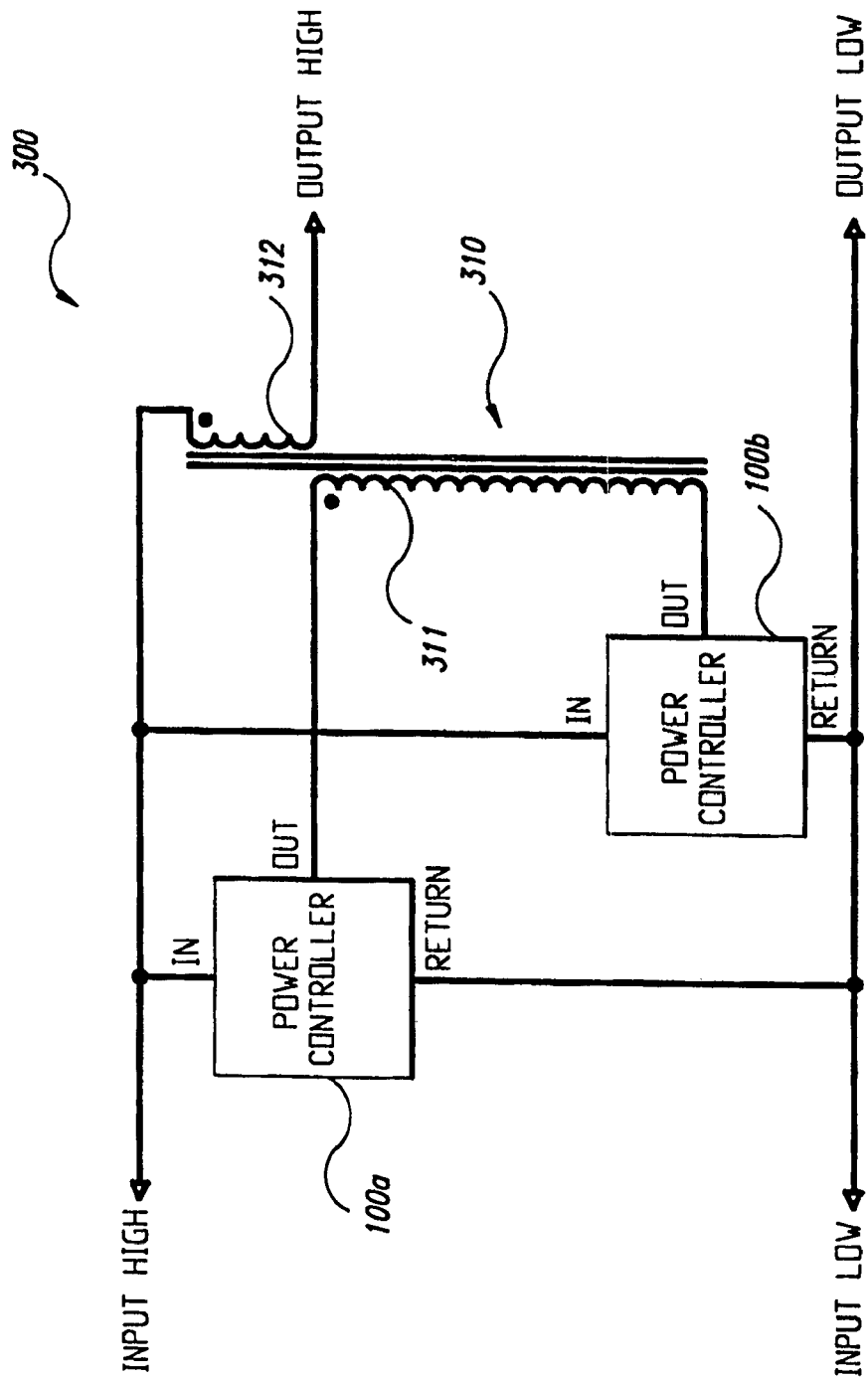
FIG. 22 is a schematic and partial block diagram of an AC voltage regulator of the invention.

FIG. 22 schematically illustrates preferred AC voltage regulator 300 of the invention. This circuit employs two lower controllers 100a and 100b that drive opposite ends of a primary winding 311 of transformer 310. Secondary winding 312 is in series with Input line (high).

Regulator 300 functions by using the secondary 312 output to either add to or subtract from the input voltage. Adding and subtracting are controlled by separately modulating the outputs of controllers 100a and 100b. There are three modes of operation.

In mode 1, both controllers are at zero output voltage. The transformer primary 311 is thus clamped to no voltage, while the current is allowed to pass through secondary 312 (and through the primary as reflected through the transformer). Zero primary voltage translates to zero secondary voltage, and the input voltage is thereby maintained from input to output with voltage neither added nor subtracted.

In mode 2, controller 100a output is increased over the output of controller 100b (preferably held at a minimum). In this mode, a variable amount of voltage from controller 100a on primary 311 adds a proportional voltage (according to turns ratio of primary to secondary windings) to the input voltage, and output voltage is thereby effectively increased.

In mode 3, controller 100b output is increased over the output of controller 100a (now preferably at a minimum). In this mode, a variable amount of voltage from controller 100b on primary 311 subtracts a proportional voltage (according to turns ratio of primary to secondary windings) from the input voltage, and output voltage is thereby effectively decreased.

For industrial level (460 VAC) voltage regulators, a +/−10% variability is required. This would mean a transformer turns ratio (primary to secondary) in the preferred circuit of approximately 10:1. With this circuit and conventional power semiconductor technology, it should be possible to provide regulation at power levels in excess of 1 MW per phase.

Figure 23:
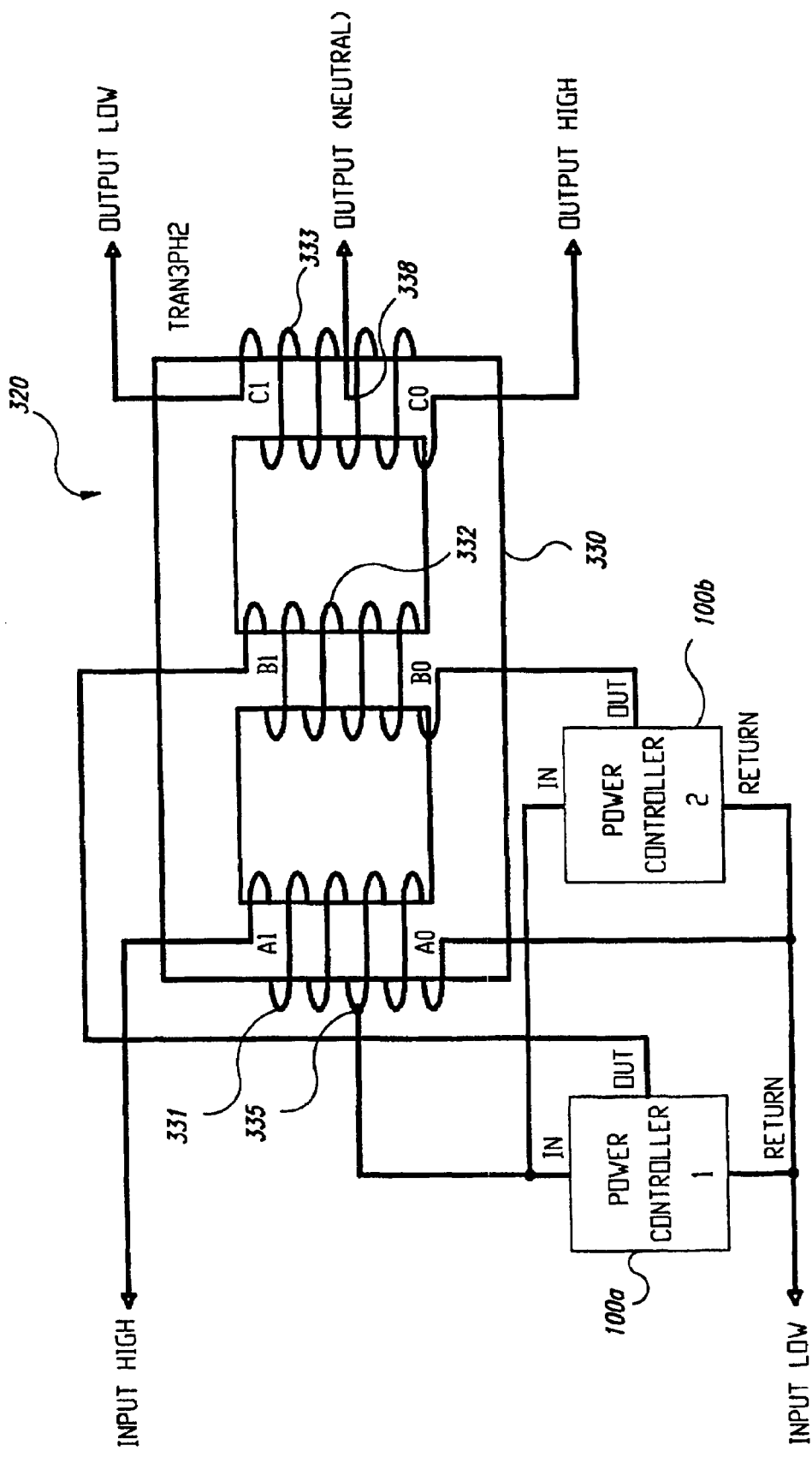
FIG. 23 is a schematic and partial block diagram of an isolated AC voltage regulator of the invention.

FIG. 23 schematically illustrates preferred isolated AC voltage regulator 320 of the invention. Regulator 320 is anticipated to be used to take utility distribution voltages and provide isolated and regulated low voltage outputs for residential, commercial, and industrial applications.

In operation, input voltage is applied to input winding 331 and provides thereby most of the voltage that is transformed to output winding 333. Two power controllers 100a and 100b operate in accordance with the disclosure herein from a lower voltage tap 335 on winding 331. Controllers 100a and 100b are used to drive intermediate winding 332, which preferably has several time the number of turns of winding 331. Output winding 333 has conventional neutral tap 338.

The two power controllers operate in essentially the same three modes as described in conjunction with the apparatus shown in FIG. 22. In total, the controllers provide a small part of the total voltage transformed to winding 333 to effectively adjust output voltage up or down from nominal voltage value, or to clamp to the nominal value. Advantages of this circuit include continuous amplitude adjustability over the entire regulating range, and no mechanical contacts to wear out.

Figure 24:
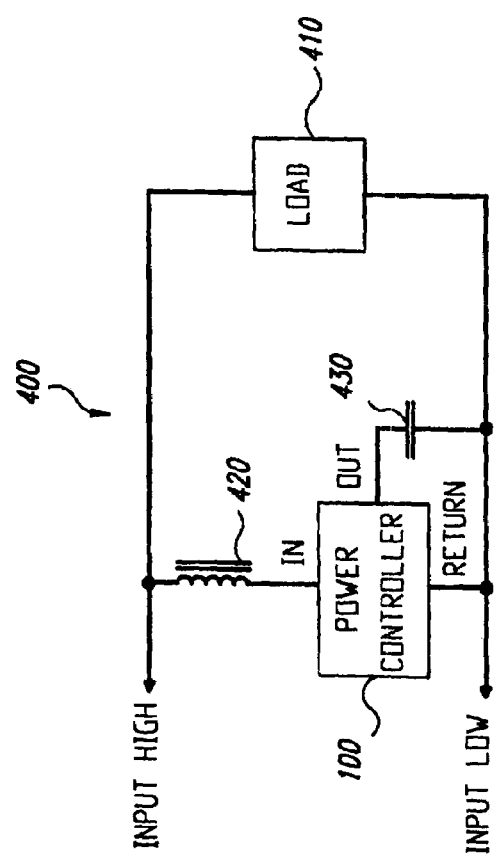
FIG. 24 is a schematic and partial block diagram of an adjustable parallel harmonic filter of the invention.

FIG. 24 schematically illustrates adjustable parallel harmonic filter 400 embodiment of the invention. Filter 400 is a system that employs the power controller 100 of the invention as a kind of adjustable capacitor, as more fully disclosed elsewhere herein. PFC capacitor 430 lies between the output of controller 100 and low side of load 410. Inductor 420 lies between input high and controller 100 input. Controller 100 is in parallel with load 410.

It is envisioned that filter system 400 will find use as a harmonic current trap, with the advantage of continuous adjustability of its resonant frequency. With continuous adjustability, filter 400 may be fine tuned for better performance and less ringing with other power line components. It may also be readjusted at any time in accordance with the changing line and load conditions in the electrical system.

Figure 25:
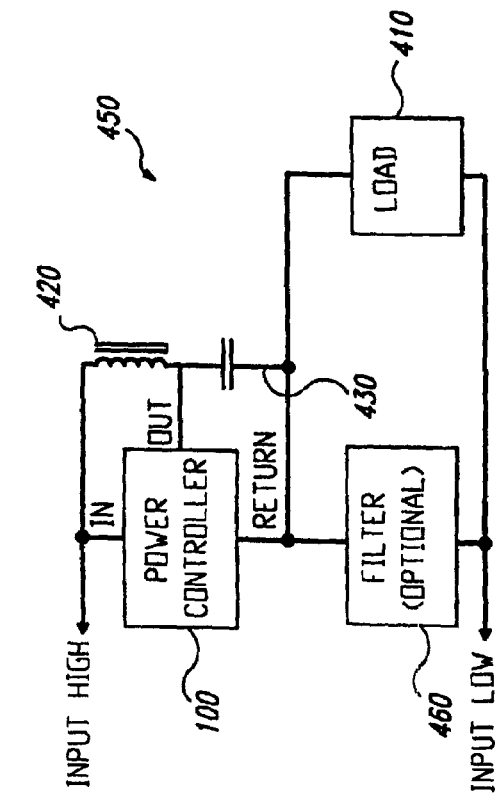
FIG. 25 is a schematic and partial block diagram of an adjustable series harmonic rejecter of the invention.

FIG. 25 schematically illustrates adjustable series harmonic rejector 450 embodiment of the invention. Rejector 450 is a system application of the adjustable harmonic rejector 550 discuss in conjunction with FIG. 15, and which functions as a kind of adjustable parallel LC network. Inductor 420 lies between controller 100 input and output, while PFC capacitor 430 lies between controller 100 output and high side of load 410. Controller 100 is in series with load 410. Optional filter 460 is in parallel with load 410.

Rejector 450 is envisioned for use to selectively reject any harmonic current in a system so as to keep it from conducting back to source. Rejector 450 may be optionally aided by addition of parallel filter 460 to absorb (or shunt) any rejected harmonic current. As with the adjustable parallel harmonic filter 400, rejector 450 may be fine tuned for optimum performance and to accommodate changing power distribution conditions.

Preliminary testing of prototypes of power controller embodiments of the invention are very encouraging. In a test of a power factor corrector embodiment of the invention, a one horsepower pump (running dry, at minimum load, at maximum load), a window fan (at low, medium, high), and a radial arm saw (running idle) were tested, and input current was first measured without any attempt at power factor correction, and PF was noted. Then the corrector of the invention was applied to correct PF, and input current was again measured, and PF noted. The results are summarized in Table 5. Al measurements were taken at 120 VAC, 60 Hz.

TABLE 5

| Test Unit | Input Current with/o PFC | Power Factor | Input Currant with/ PFC | Power Factor | Comments |
| --- | --- | --- | --- | --- | --- |
| 1 HP pump | 10.74 A | .365 | 5.31 A | .950 | Dry operation |
| " | 14.16 A | .782 | 11.68 A | .986 | pumping, min. load |
| " | 15.10 A | .853 | 13.72 A | .990 | pumping, max. load |
| Window fan | | .649 | | .988 | Low, 93 W |
| " | | .690 | | .986 | Medium, 141 W |
| " | | .694 | | .985 | High, 180 W |
| Radial saw | 7.41 A | .281 | 3.15 A | .845 | Running, idle |

These tests, while providing good numbers, highlighted the importance of proper treatment of resonances between the PFC capacitors and parasitic system inductances. The occurrence of this problem is well known. Most manufacturers of conventional PFC systems use an elaborate and expensive array of optional harmonic "traps" that have to be customized to a specific installation. Passive damping, as will be appreciated by those skilled in the art, can to some extent be built into a system to reduce harmonic currents. But active damping, which is preferred, yields better PFC results, increased efficiency, and reduced cost. In active damping, small signal control circuitry is used to vary the duty cycle of the PWM in opposition to the harmonics, causing the power controller to reject the harmonics, and leading to yet higher PF. It is anticipated that it will also lead to reduced resonances in the utility service as well.

Figure 26A:
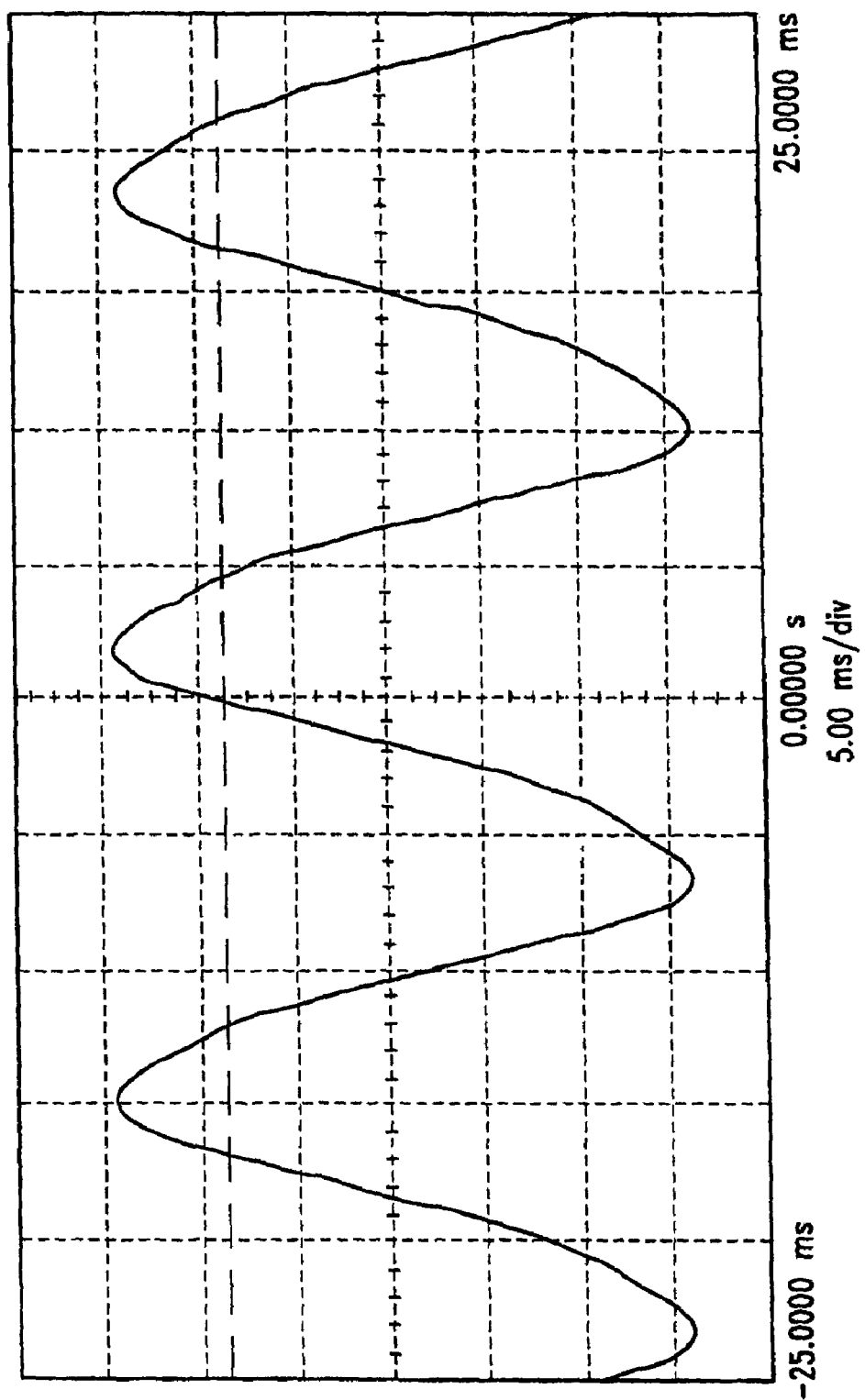
FIG. 26 is a set a–e of printouts of oscilloscope readings during a test on a prototype PF corrector of the invention.

A second round of testing on the 1 HP motor, running at no load, was conducted to test and demonstrate PFC effectiveness of the power factor corrector of the invention with added capability for active damping. FIG. 26*a* is an oscilloscope printout showing the line current waveform of the 1 HP motor running at no load. Input voltage is 120 VAC. In this test PF was noted at below 0.4, with input current at 10.7 ARMS. The waveform shows slight distortion. Common oscilloscope settings for the tests in the FIG. 26 series were: auto edge trigger; edge; source=1; level=875.000 mV; and holdoff time=14.000 mS.

Figure 26B:
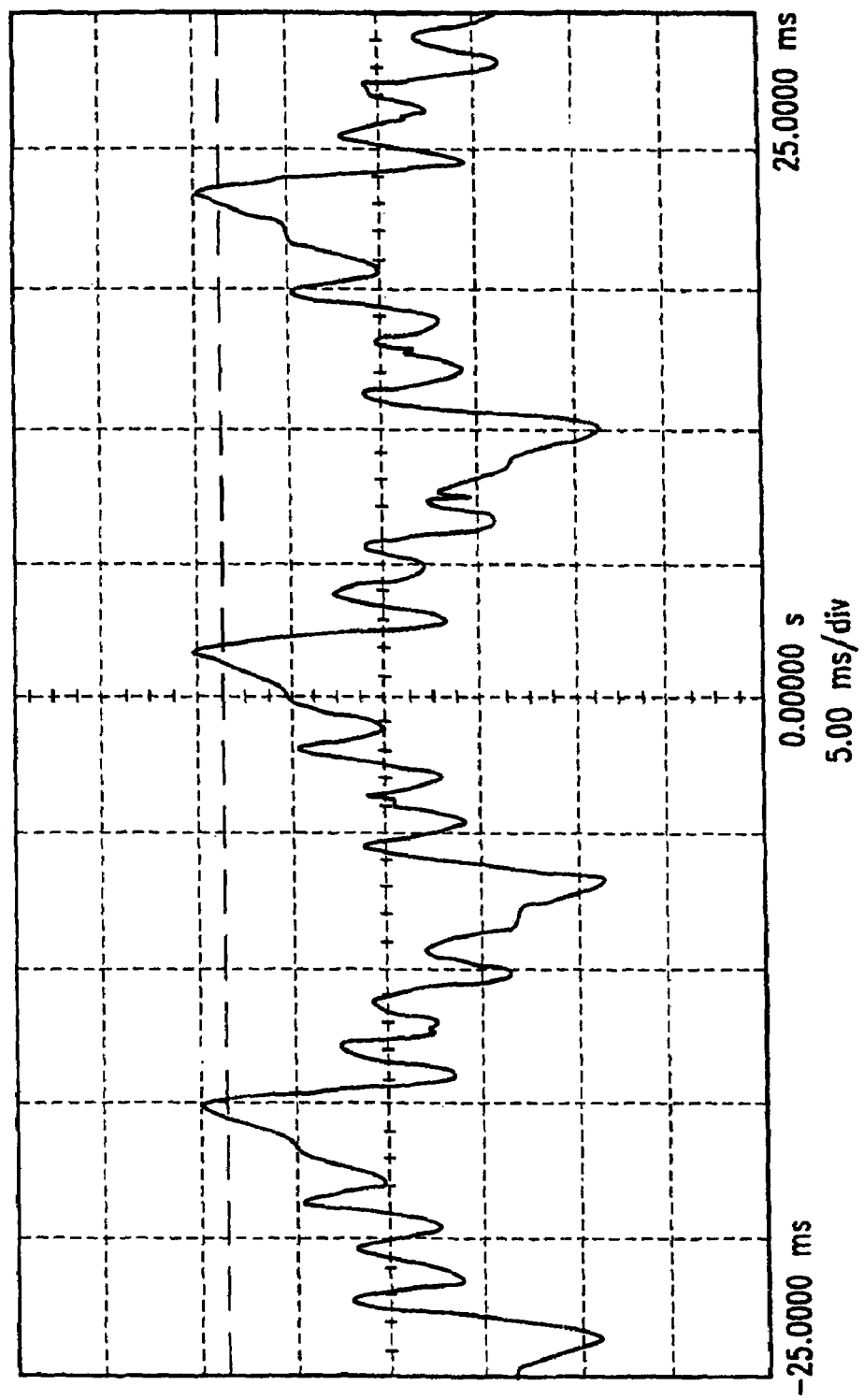
Figure 26C:
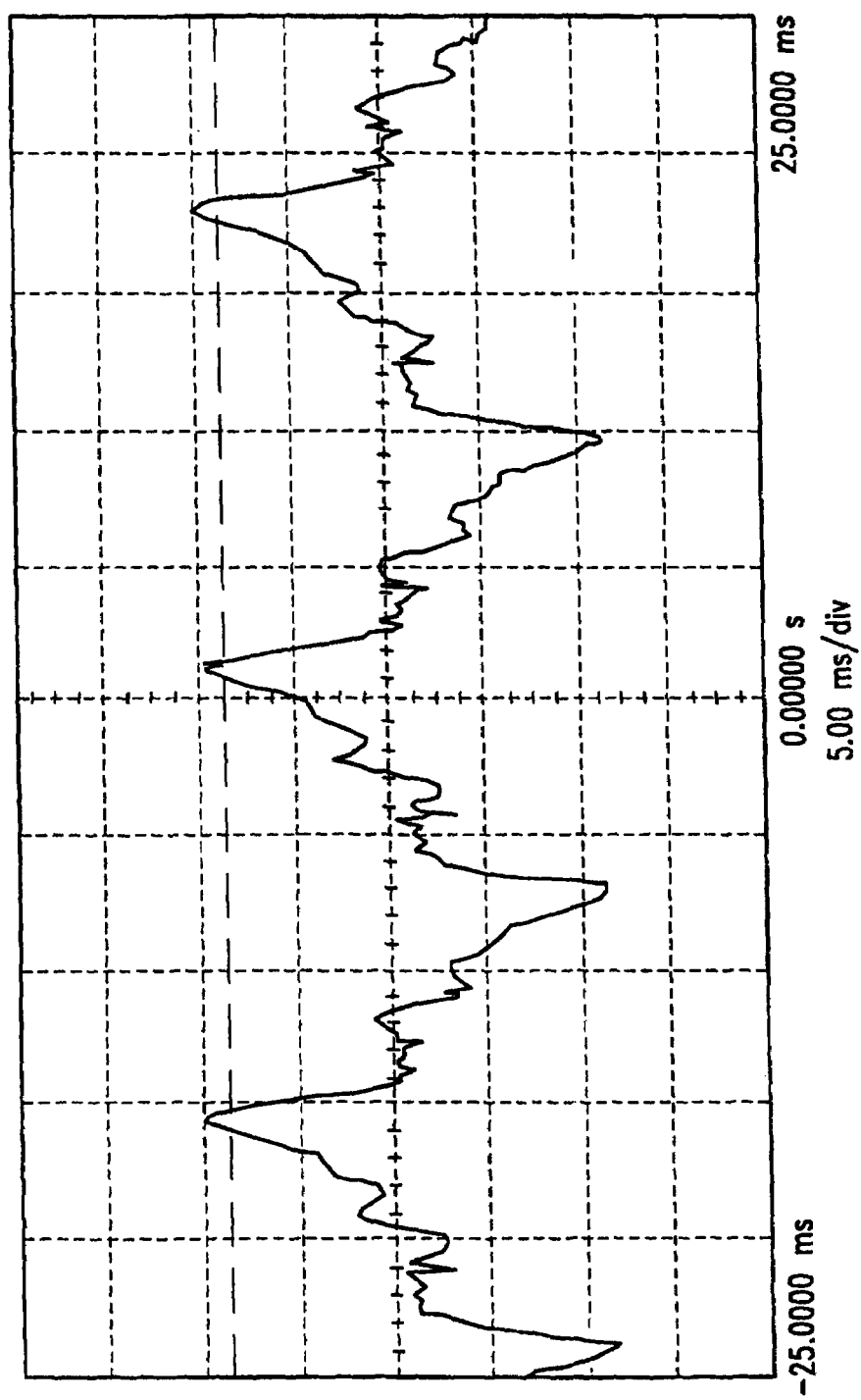

FIG. 26*b* is an oscilloscope printout showing the effect of the prototype invention PFC, but without any damping. Input current was substantially reduced to 4.8 ARMS. Significant resonance and current draw at the ninth harmonic (540 Hz) can be seen. FIG. 26*c* is an oscilloscope printout showing the results of adding a passive (and power consuming) damper into the circuit. Input current drops to 4.6 ARMS, and the ringing is somewhat diminished.

Figure 26D:
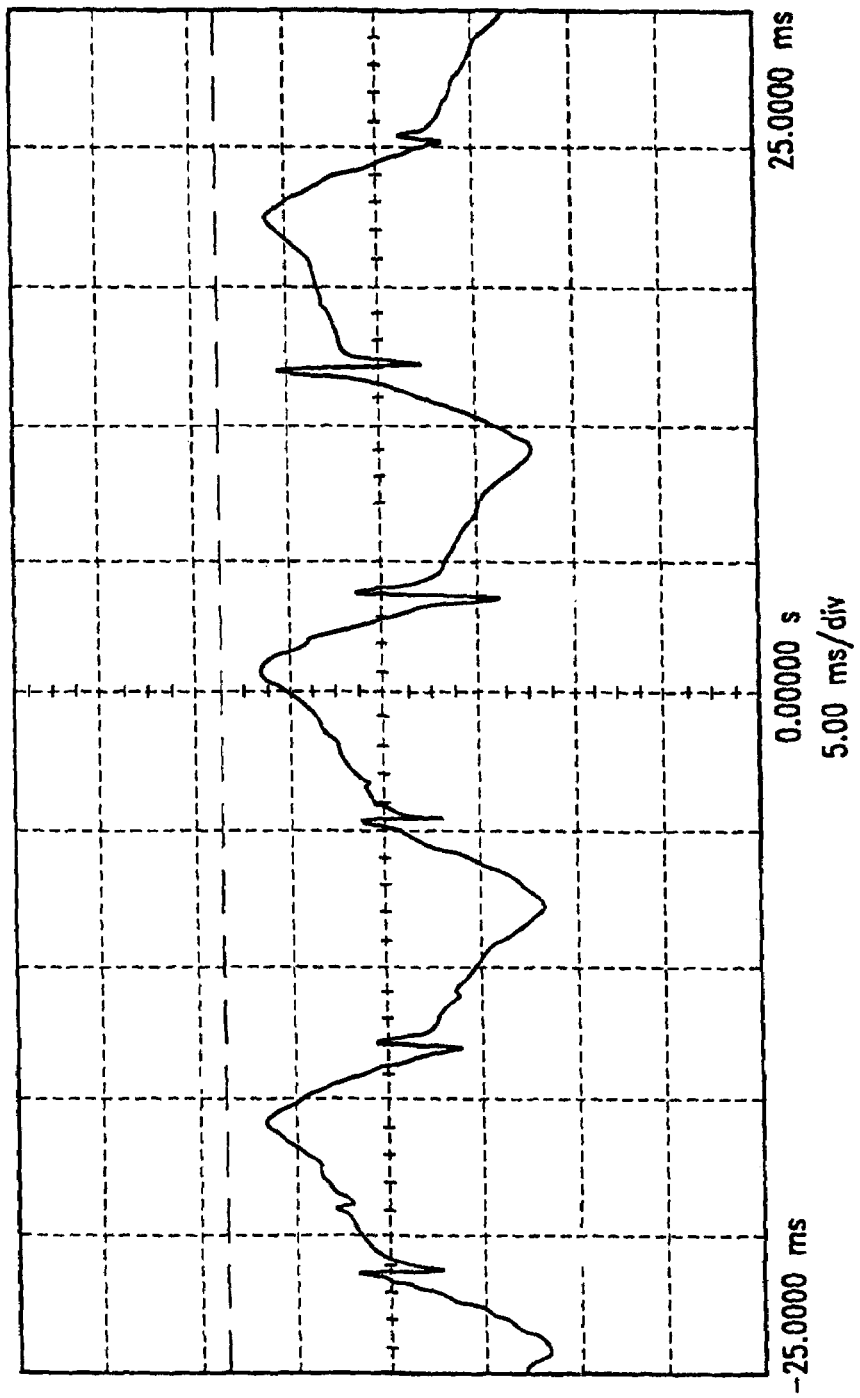

FIG. 26*d* is an oscilloscope printout showing the result of removing the passive damping and employing the prototype PFC's own active damping circuit. It can be seen that the ringing has been eliminated (though there remain in this screen traces of crossover glitches caused by polarity switching in the error amplifier). Some distortion remains on the waveform, this is believed to be the uncorrected distortion existing on the original motor current waveform. Input current is reduced to 4.3 ARMS, even lower than with passive damping applied.

Figure 26E:
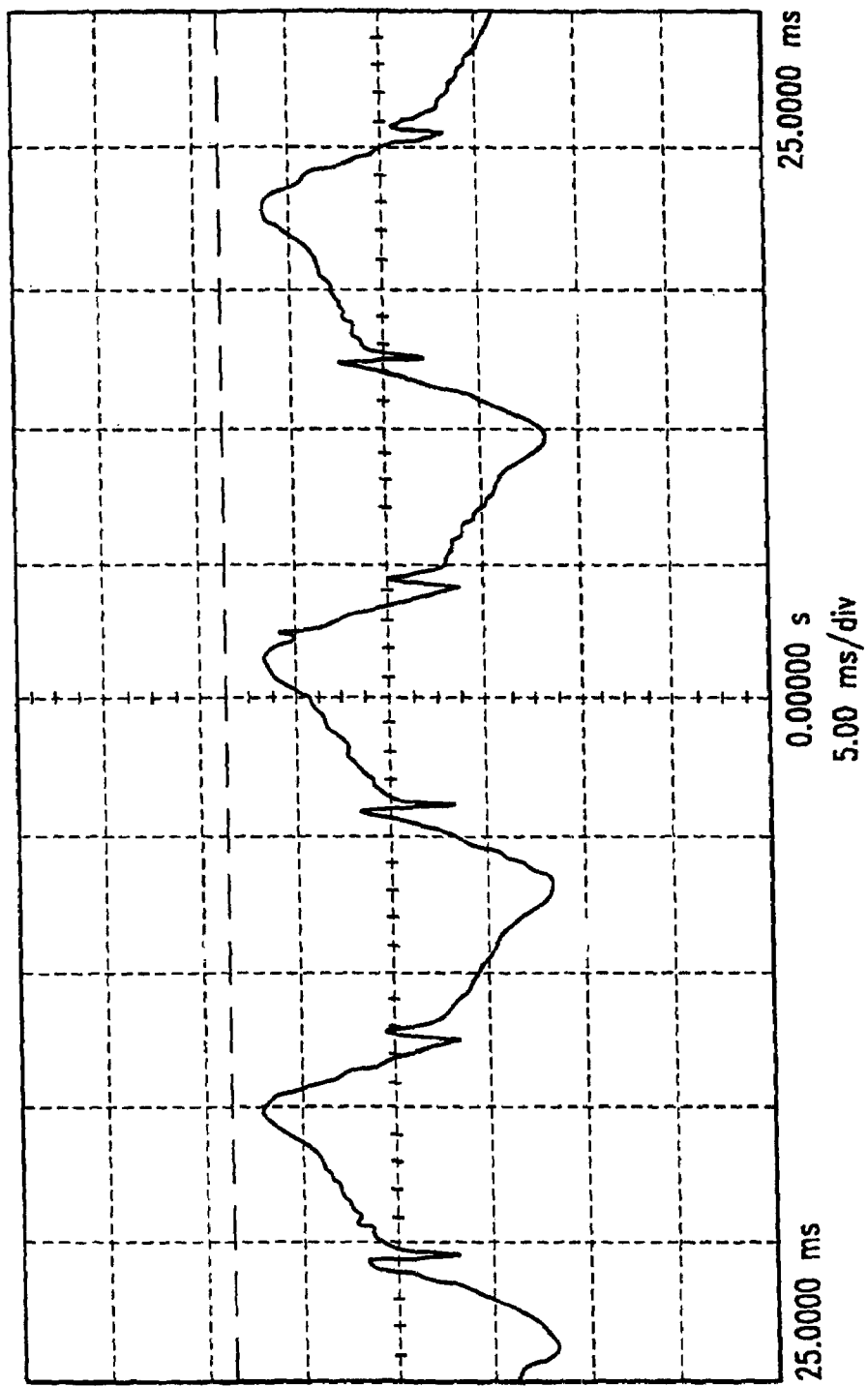

FIG. 26*e* is an oscilloscope printout showing, for comparison purposes, the effect of both active and passive damping applied. In most respects the waveform is identical to the previous printout, but the passive damper clearly contributes to greater power consumption as the input current increases to 4.5 ARMS, without significant improvement in the waveform over active damping alone.

Better results than these however are anticipated at the higher voltages more common in industrial use. These tests were conducted at 120 VAC where IGBT and diode voltage drops are more significant in terms of percentage loss, than would be the case at the higher voltages. Also at 240 VAC and 480 VAC, there will be less converter loss per KVAR. Secondly, the tests were not conducted in a worst case resonance scenario; in an industrial plant with far less "clean" power, multiple motor and PFC resonant combinations typically create fuse blowing and PFC capacitor failures, and have much greater need for the kind of PFC demonstrated here.

Another test was performed as a comparison of a conventional SCR power control device with the invention power controller (sometimes also referred to in the table and graphs as an "MPC"). FIG. 27 is a spreadsheet of comparative data on SCR performance vs. an invention prototype power controller. A prototype power controller in accordance with this disclosure was run, in "buck" mode, at 120 VACRMS from 100% to 0% of range. Both KW efficiency and KVA efficiency were noted, as well as both input and output KW, KVA, PF and % THD-rmsa. The SCR device was run over the same range. The results are summarized in the spreadsheet, and the trend of the data, at least in certain respects, is evident from reading the spreadsheet. While the SCR remains highly efficient throughout the range from 100% voltage to 0%, and the MPC declines at 50% then falls off badly below 20%, the MPC sustains high input PF to a much lower voltage (still 0.89 at 40%; the SCR falls below 0.9 around 85%), and maintains near unity output PF down to below 10%. Similarly, the MPC sustains lower input and output current draw throughout the range, and is sharply lower in % THD on both input and output sides.

Figure 28:
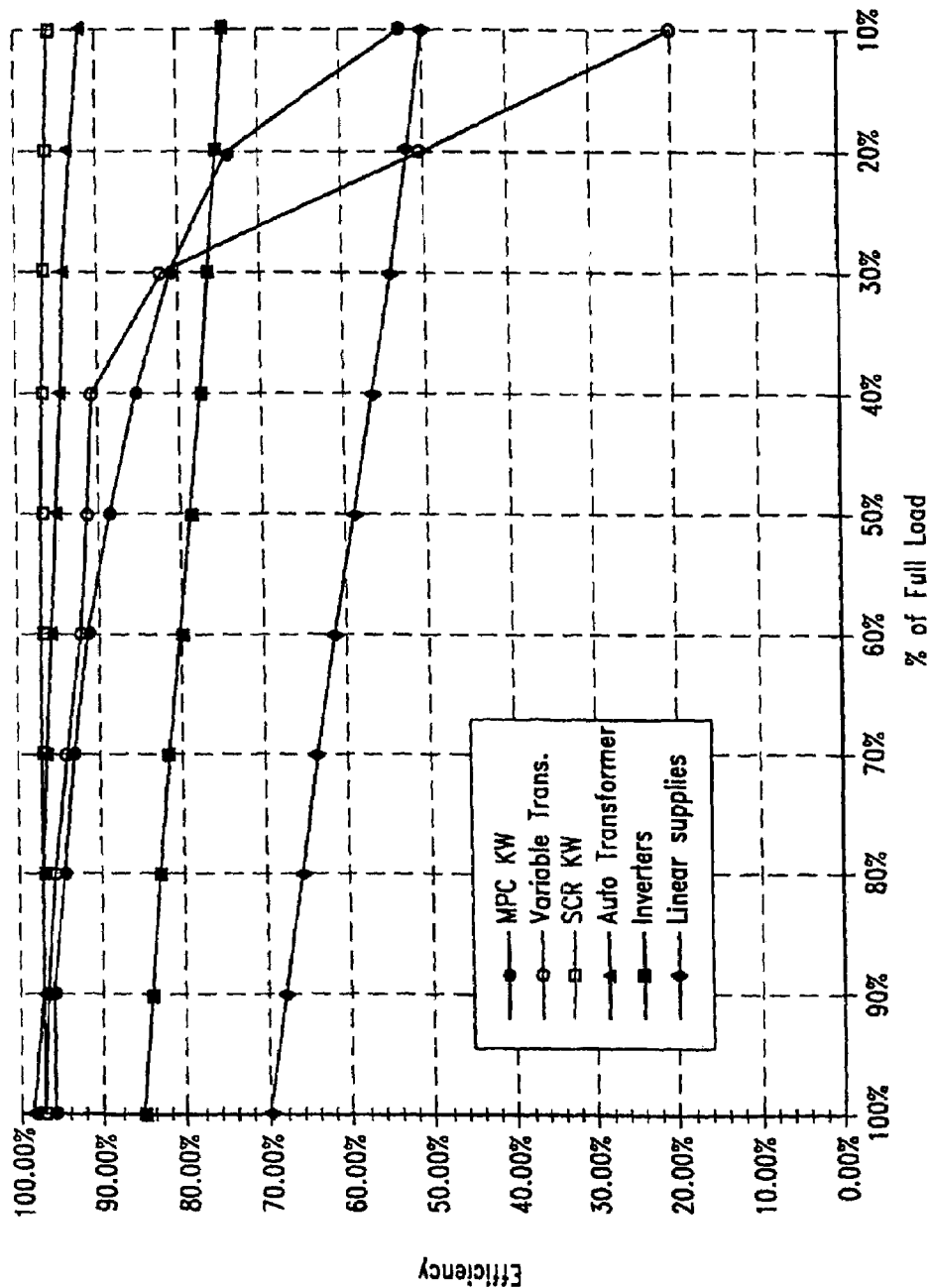
FIG. 28 is a graph of relative efficiencies of conventional power control devices compared to the power controller of the invention.
Figure 29:
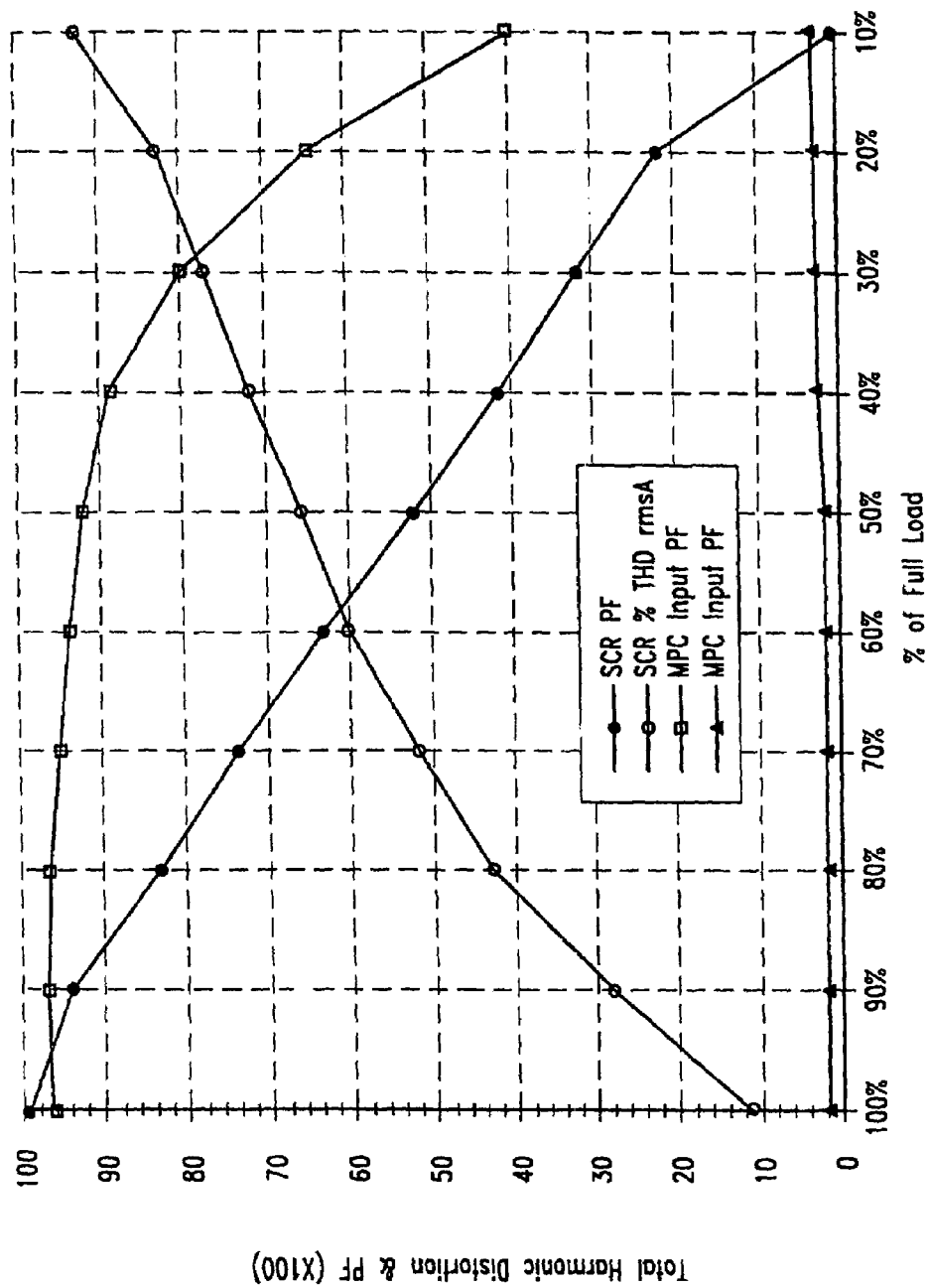
FIG. 29 is a graph of relative harmonics and power factor (for resistive loads) of conventional power control devices compared to the power controller of the invention.

FIG. 28 is a graph of relative efficiencies of conventional power control devices compared to the power controller of the invention, and FIG. 29 is a graph of relative harmonics and power factor (for resistive loads) of conventional power control devices compared to the power controller of the invention. A study of both graphs together suggests that, while SCR's with their noted efficiency stay at the top of the graph in FIG. 28, they are clearly the worst in PF and % THD performance in FIG. 29. In FIG. 28, it is apparent that the MPC's KW efficiency is quite close (above 90%) to that of the SCR down to 60% of range, and exceeds the efficiency of both inverters and linear supplies down to about 20% of range. In summary, the MPC compared to conventional devices has good efficiency, good power factor, and excellent harmonics (THD<1%).

With regard to componentry and assembly methodology above referred to, but not otherwise specified or described in detail herein, the workings and specifications of such components and the manner in which they may be made or assembled or used, both cooperatively with each other and with the other elements of the invention described herein, to effect the purposes herein disclosed, are all believed to be well within the knowledge of those skilled in the art. No concerted attempt to repeat here what is generally known to the artisan has therefore been made.

INDUSTRIAL APPLICABILITY

An electrical converter implemented with a high frequency (>100 KHz) and using switchmode power conversion techniques achieves great advantage over existing circuits, including higher output, smaller size, light weight, lower cost, greater efficiency, electrically quieter operation, and better reliability.

In broad terms, the largest markets for the invention are related to electrical power quality products and electrical energy conservation products. At least half of the applications currently identified for the invention relate to improving the efficiency of, or cleaning up power problems caused by, electrical motors and/or motor drives. The Edison Electric Institute reports that there are one billion electric motors in the US alone, and that they consume collectively nearly half of the total electricity consumed in the US.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriate interpreted in accordance with the doctrine of equivalents.

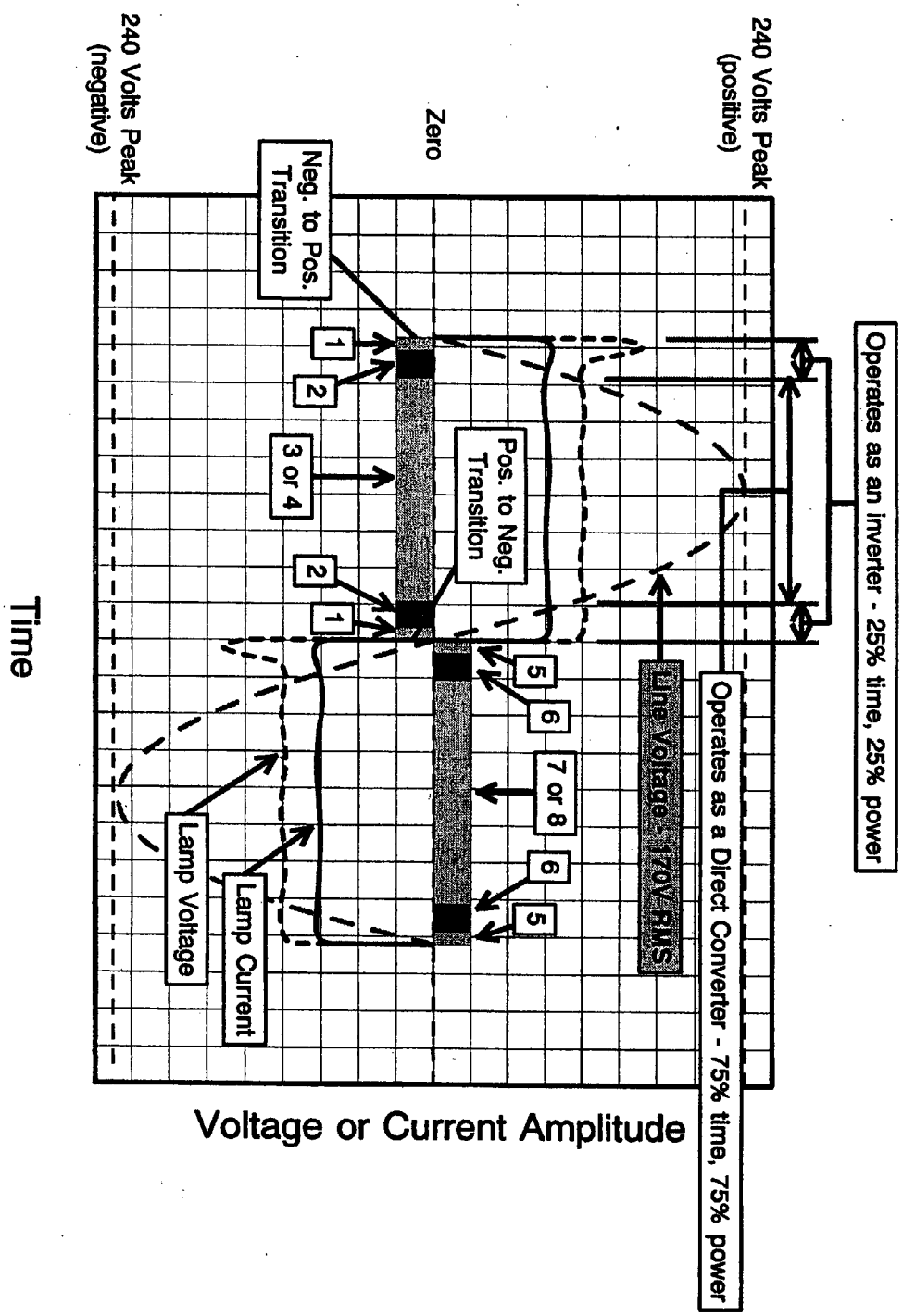

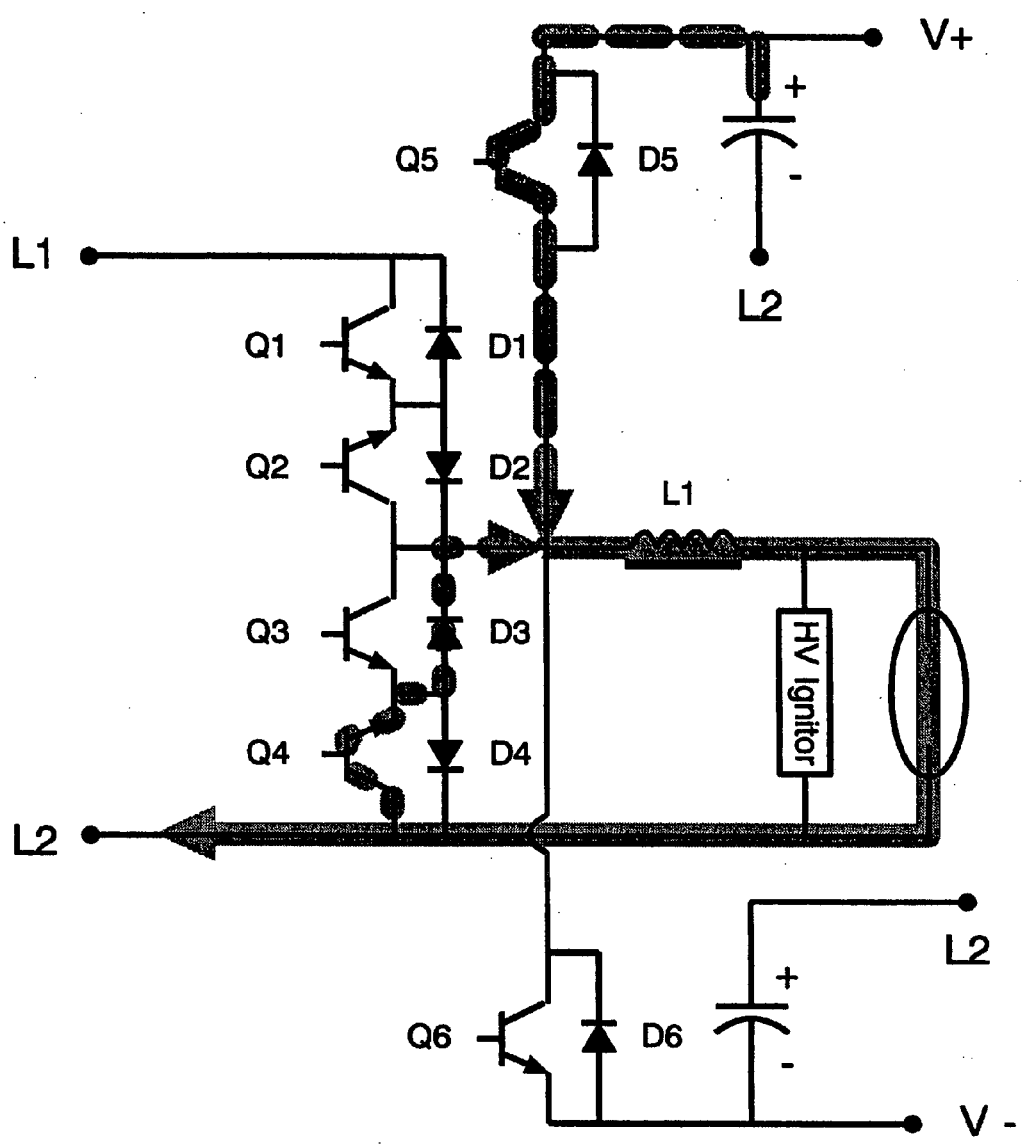

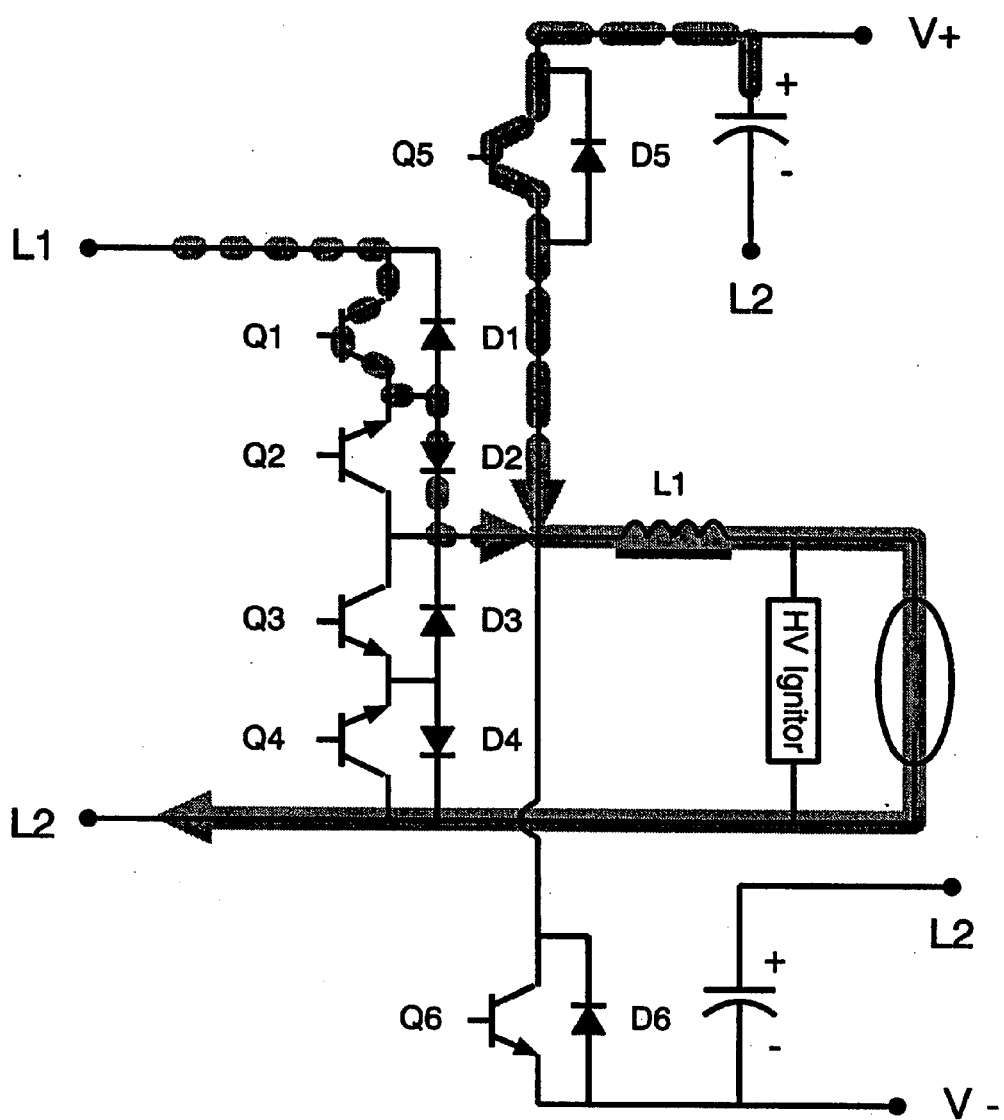

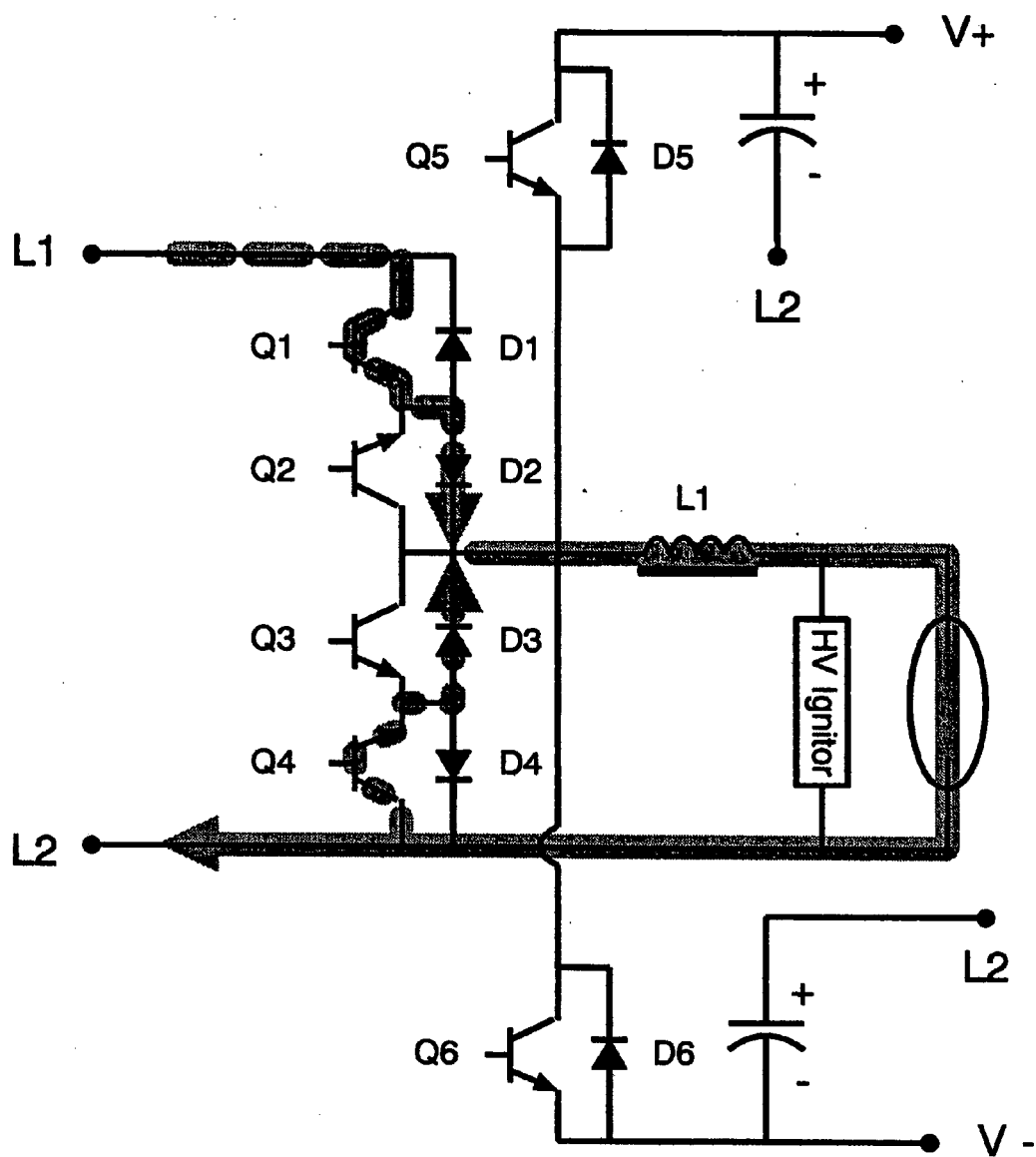

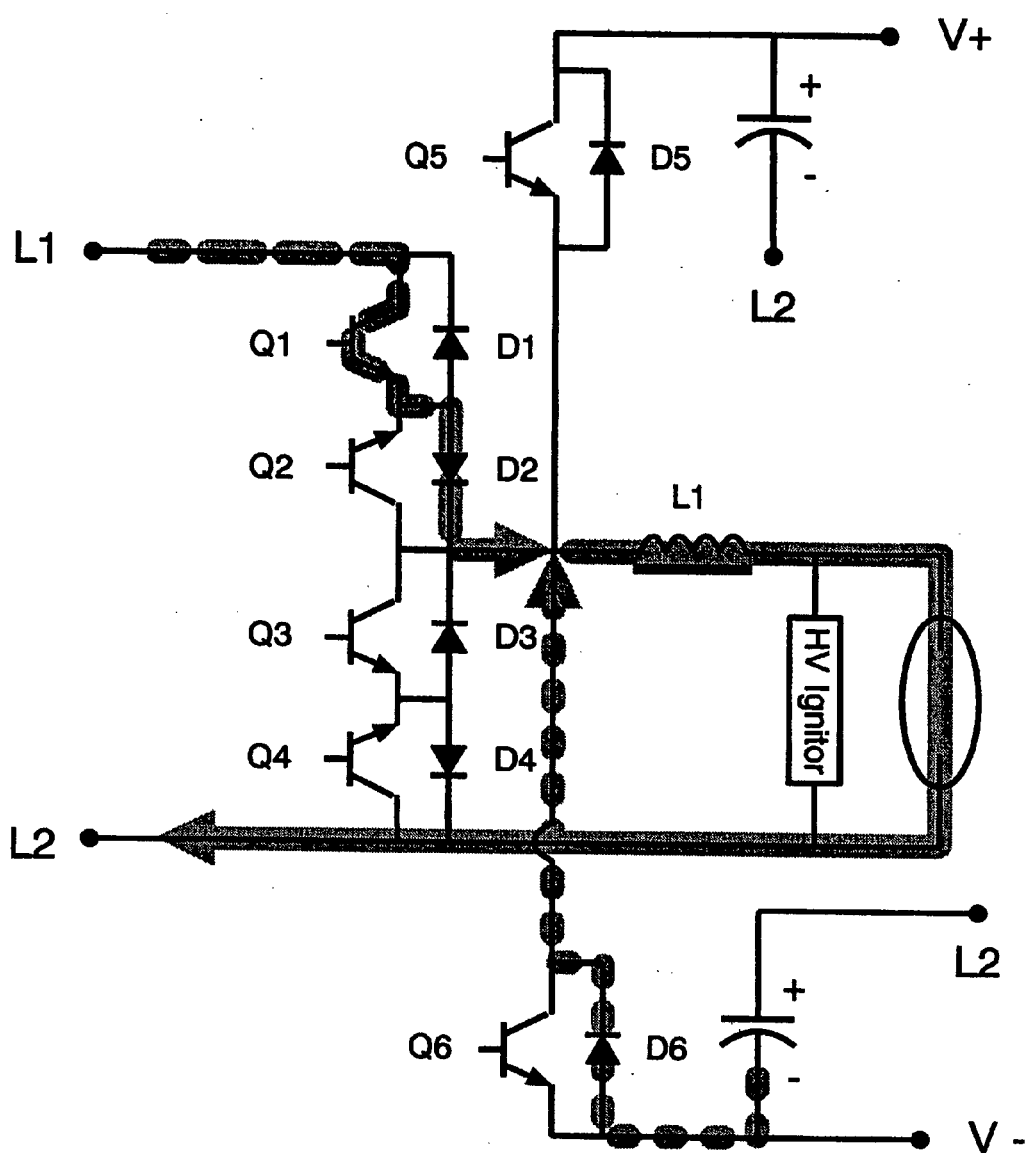

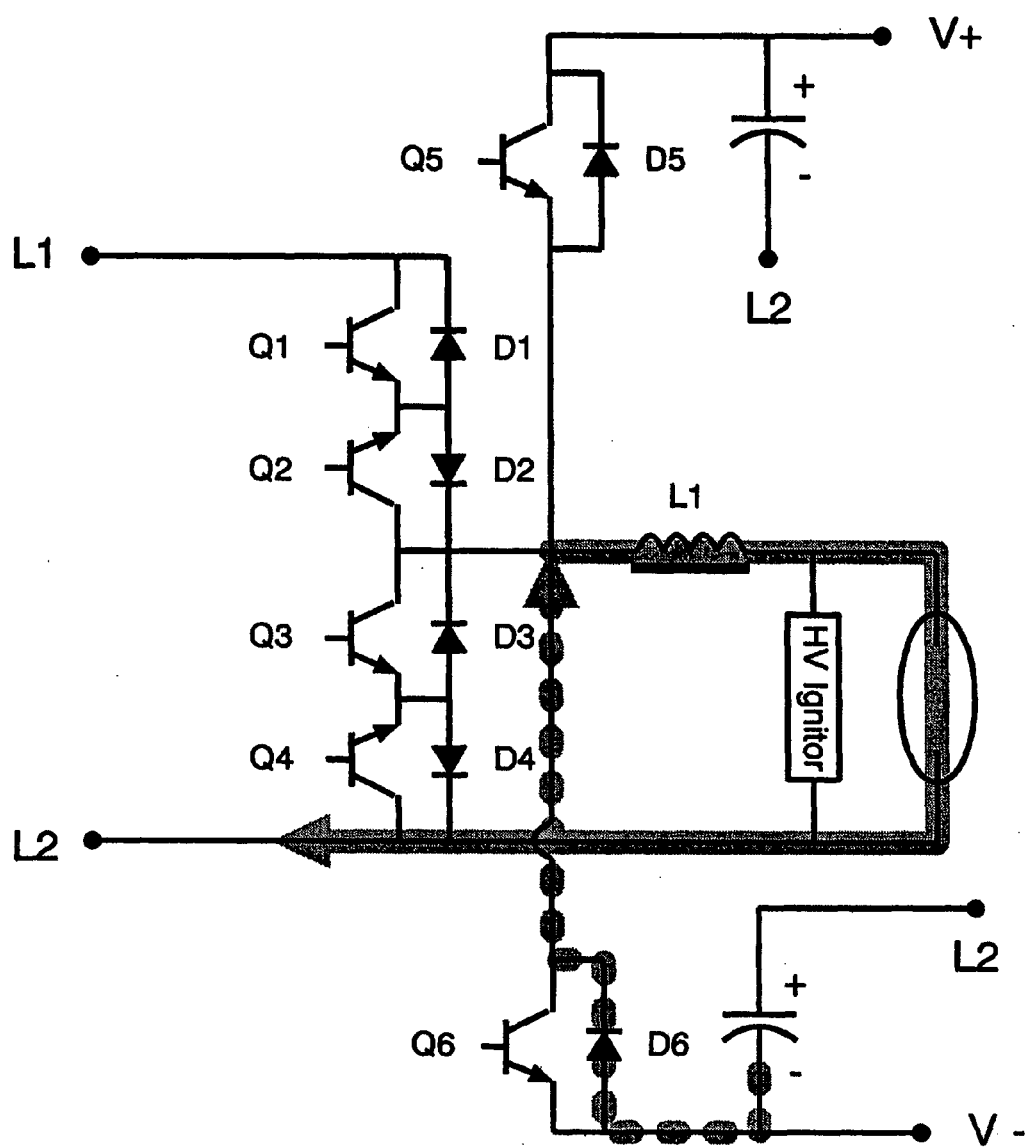

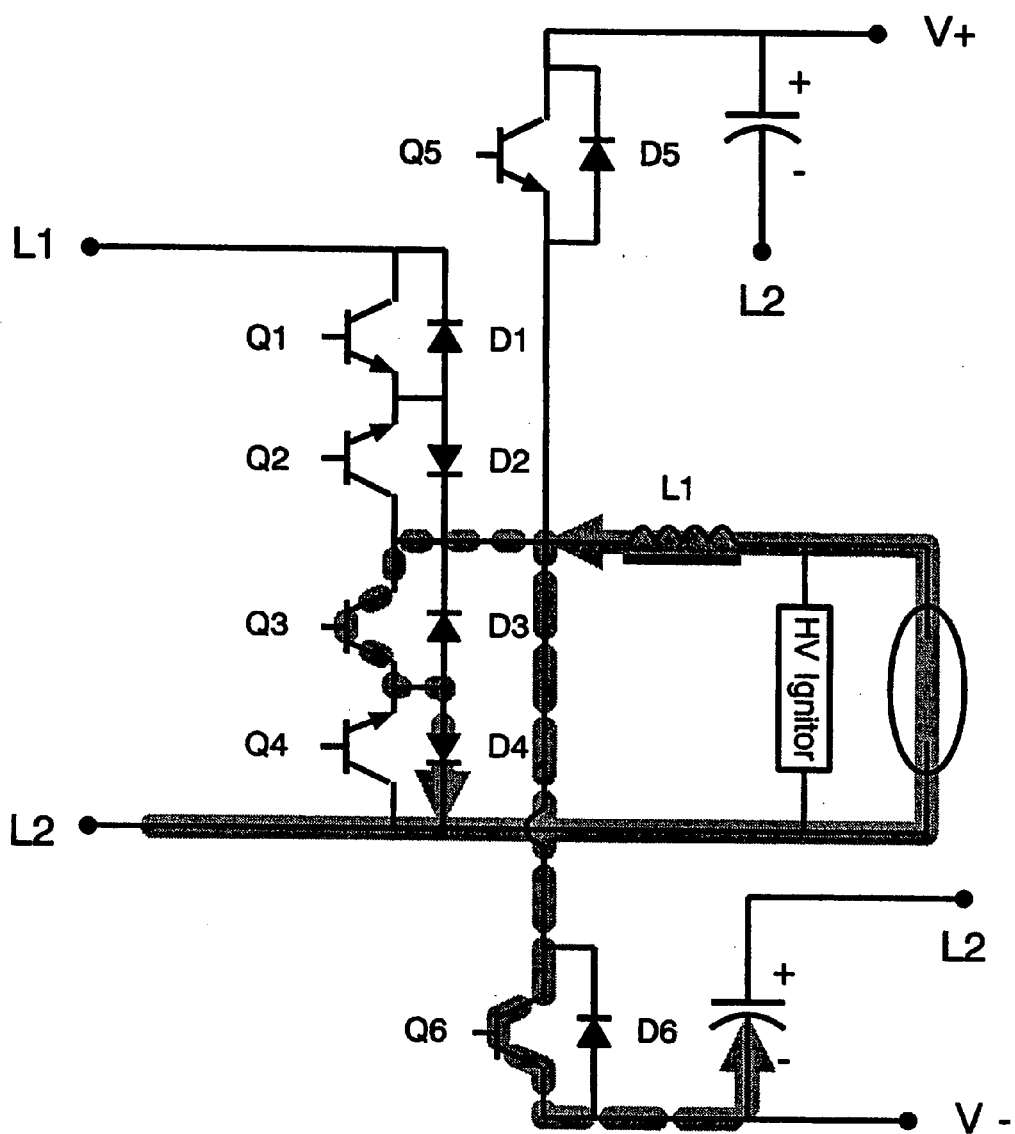

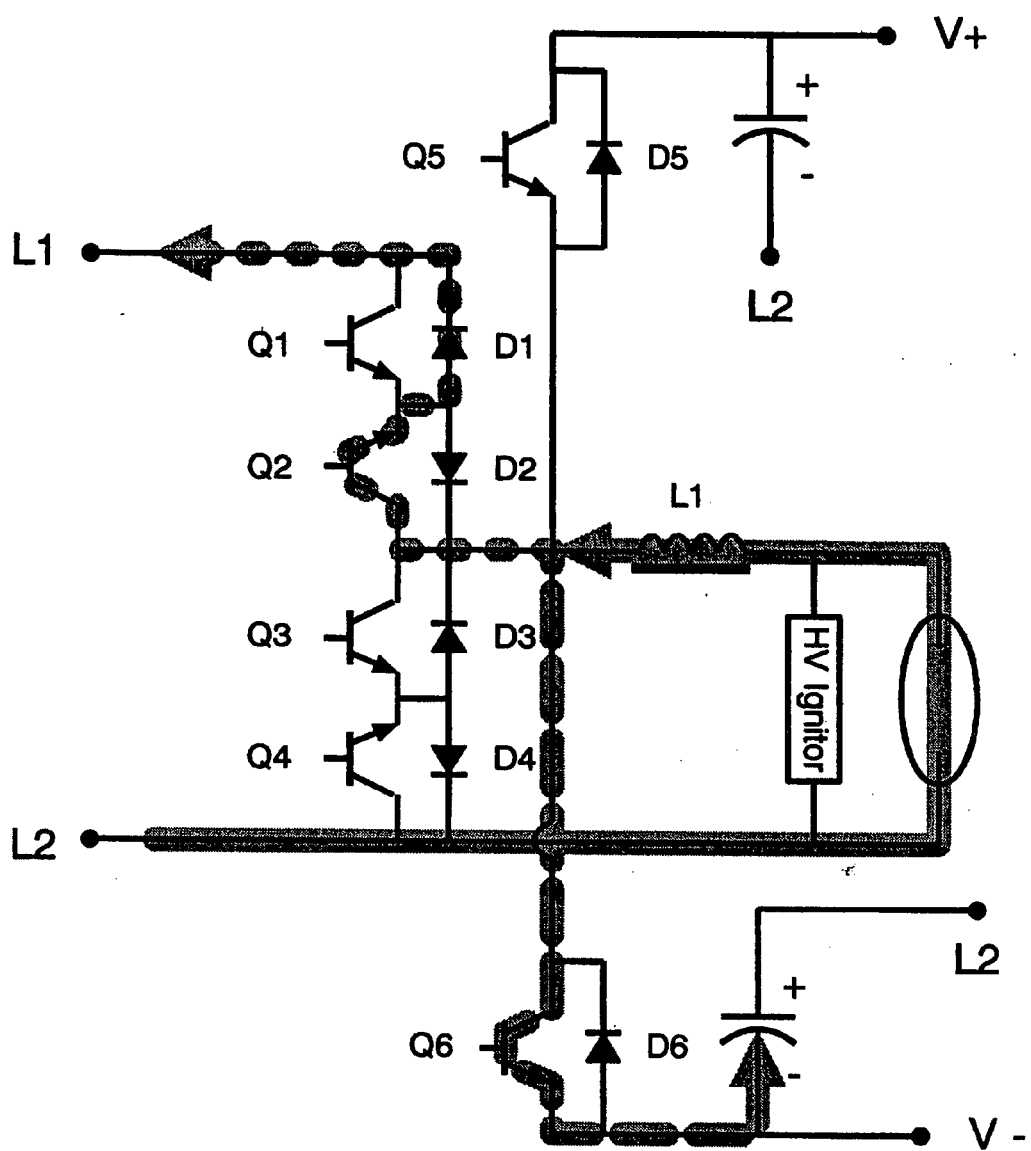

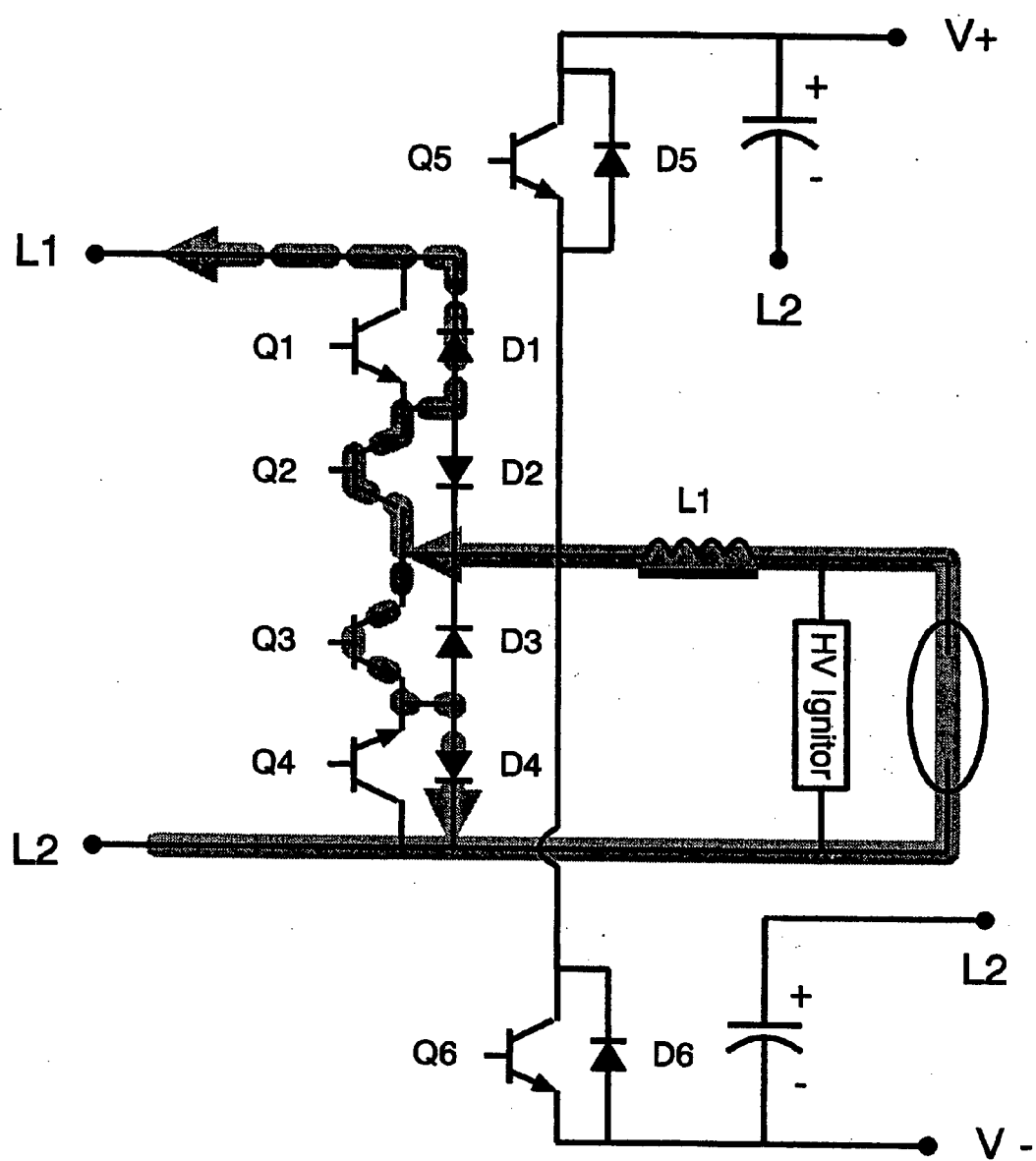

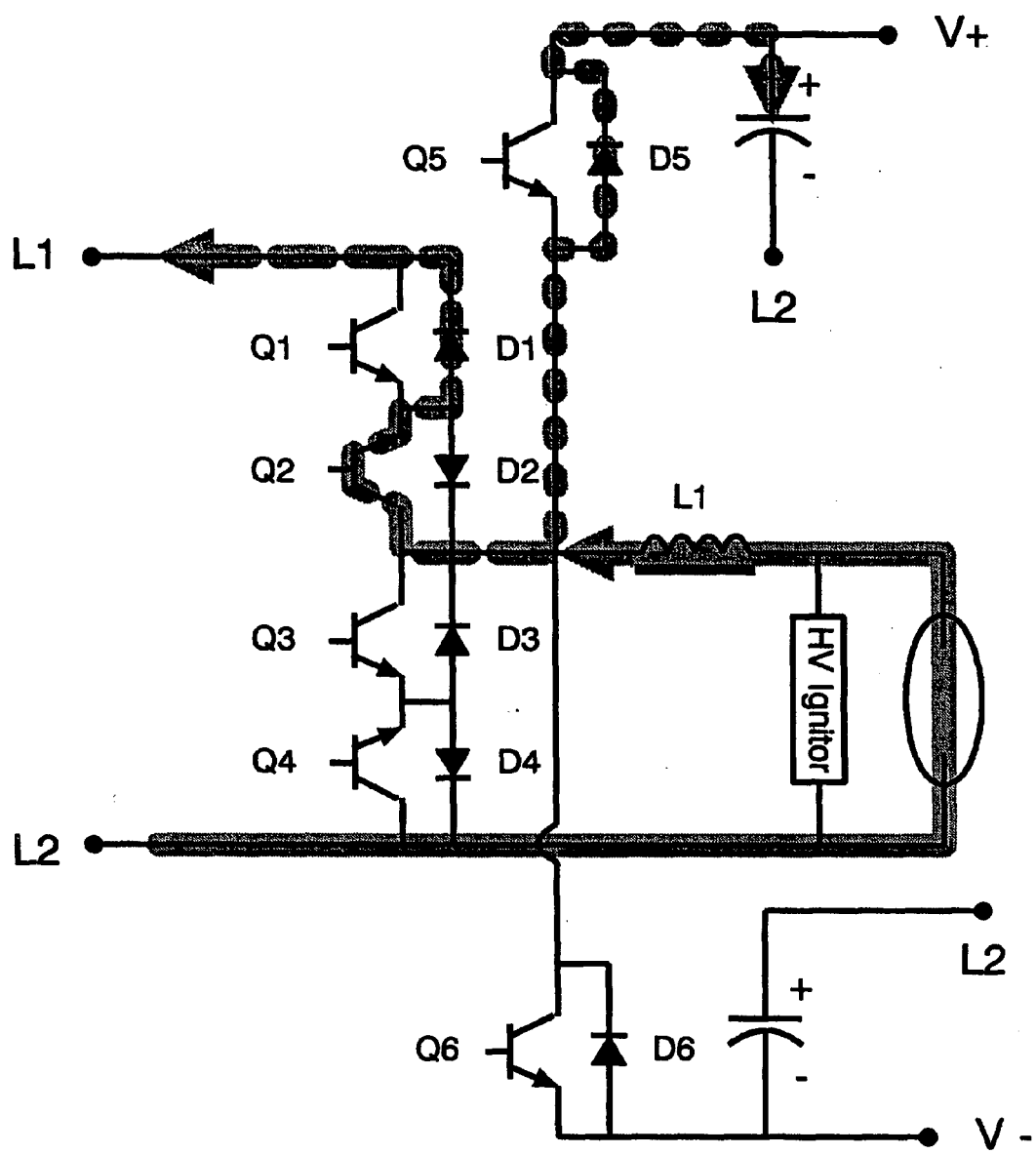

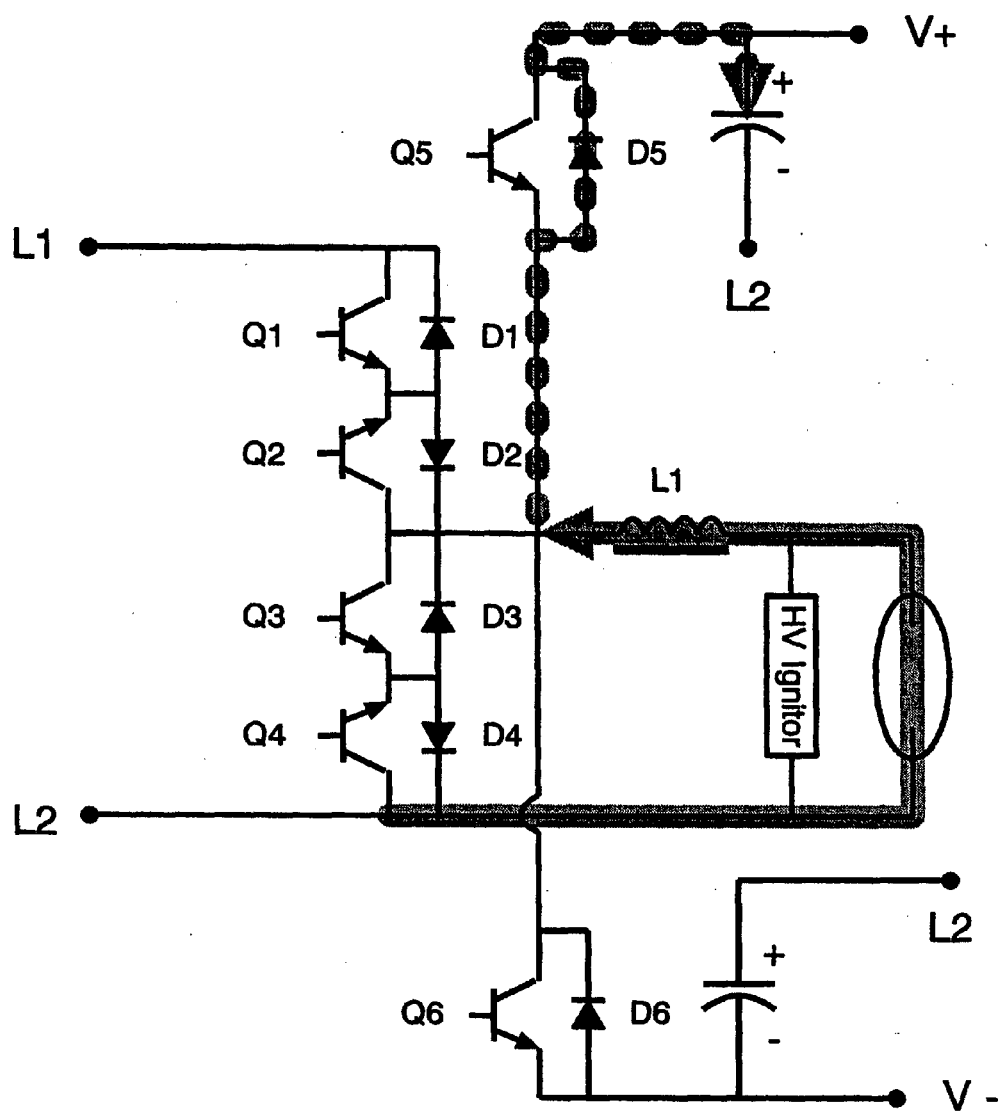

We claim:

1. A ballast comprising:
   a single common converter circuit that operates in a split mode operation,
   wherein said single common converter circuit employs a plurality of switch modes to successively modulate one or more of a plurality of switches and diodes;
   wherein said single common converter circuit can operate as an inverter, a direct converter, or both an inverter and a direct converter;
   wherein when AC power, DC power, or both types of power are provided to the ballast, a substantially square AC wave and current output is provided from the ballast; and
   wherein said ballast is used in conjunction with one or more hydrargyrum medium-arc iodide (HMI) lamps.

* * * * *